(12) United States Patent
Lee et al.

(10) Patent No.: US 12,014,105 B2
(45) Date of Patent: Jun. 18, 2024

(54) ELECTRONIC DEVICE INCLUDING FLEXIBLE DISPLAY AND METHOD FOR OPERATING THE SAME

(71) Applicant: SAMSUNG ELECTRONICS CO., LTD., Suwon-si (KR)

(72) Inventors: Jookwan Lee, Suwon-si (KR); Yongjin Kwon, Suwon-si (KR); Myunghoon Kwak, Suwon-si (KR); Raetae Kim, Suwon-si (KR); Yangwook Kim, Suwon-si (KR); Jihea Park, Suwon-si (KR); Hyunju Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/837,808

(22) Filed: Jun. 10, 2022

(65) Prior Publication Data

US 2022/0405037 A1    Dec. 22, 2022

Related U.S. Application Data

(63) Continuation of application No. PCT/KR2022/007700, filed on May 30, 2022.

(30) Foreign Application Priority Data

Jun. 10, 2021 (KR) .................. 10-2021-0075398
Sep. 24, 2021 (KR) .................. 10-2021-0126607

(51) Int. Cl.
 *G06F 3/14* (2006.01)
 *G09G 3/00* (2006.01)

(52) U.S. Cl.
 CPC ............ *G06F 3/1454* (2013.01); *G09G 3/035* (2020.08); *G09G 2354/00* (2013.01); *G09G 2370/16* (2013.01)

(58) Field of Classification Search
 CPC .. G09G 3/1454; G09G 3/035; G09G 2370/16; G09G 2354/00
 See application file for complete search history.

(56) References Cited

U.S. PATENT DOCUMENTS

2005/0040962 A1* 2/2005 Funkhouser ............ G09F 9/301
                                                                340/815.4
2006/0061555 A1* 3/2006 Mullen ................ H04M 1/0268
                                                                345/169

(Continued)

FOREIGN PATENT DOCUMENTS

KR    10-2016-0086717 A    7/2016
KR    10-2016-0101600          8/2016

(Continued)

OTHER PUBLICATIONS

Search Report dated Aug. 31, 2022 in counterpart International Patent Application No. PCT/KR2022/007700.

(Continued)

*Primary Examiner* — Shaheda A Abdin
(74) *Attorney, Agent, or Firm* — Nixon & Vanderhye P.C.

(57) ABSTRACT

According to various embodiments, there may be provided an electronic device comprising: a housing, a flexible display having a resizable region visible to an outside of the housing by at least a portion being moved from the inside to the outside of the housing, a communication circuit configured to enable transmitting or receiving data to or from an external electronic device, at least one sensor configured to identify a size of a region where the flexible display is visible to the outside of the housing, a memory, and at least one processor, wherein the at least one processor is configured to: control the display to display a first content on first region of the flexible display visible to the outside of the housing, establish communication connection with an external electronic device through the communication circuit, (Continued)

transmit, based on the establishing of the communication connection, first information on the first content to the external electronic device through the communication circuit so that the external electronic device displays the first content, when a second region where the flexible display located inside the housing is visible to the outside of the housing, display second content on a third region including the first region and the second region, based on at least one value obtained using the at least one sensor, identify second information on the second content, to be transmitted to the external electronic device, based on the obtained at least one value, and transmit the identified second information to the external electronic device through the communication circuit so that the external electronic device displays the second content.

19 Claims, 30 Drawing Sheets

(56) References Cited

U.S. PATENT DOCUMENTS

| | | | | |
|---|---|---|---|---|
| 2012/0206319 | A1* | 8/2012 | Lucero | H04N 21/41407 345/1.3 |
| 2012/0210217 | A1* | 8/2012 | Abbas | H04N 5/14 715/716 |
| 2013/0027289 | A1 | 1/2013 | Choi et al. | |
| 2013/0201208 | A1* | 8/2013 | Cho | G06F 3/0488 345/619 |
| 2013/0210488 | A1* | 8/2013 | Lee | H04N 21/4312 455/557 |
| 2014/0253416 | A1 | 9/2014 | Stahl et al. | |
| 2016/0239250 | A1 | 8/2016 | Kim et al. | |
| 2017/0255442 | A1* | 9/2017 | Kim | G06F 1/1616 |
| 2018/0367836 | A1 | 12/2018 | Shikhare | |
| 2021/0012751 | A1 | 1/2021 | An et al. | |
| 2021/0116965 | A1 | 4/2021 | Jung et al. | |
| 2022/0391085 | A1* | 12/2022 | Noh | G06F 3/04815 |

FOREIGN PATENT DOCUMENTS

| | | |
|---|---|---|
| KR | 10-2017-0102634 | 9/2017 |
| KR | 10-2019-0110318 | 9/2019 |
| KR | 10-2020-0075809 | 6/2020 |
| KR | 10-2021-0044975 A | 4/2021 |

OTHER PUBLICATIONS

Written Opinion dated Aug. 31, 2022 in counterpart International Patent Application No. PCT/KR2022/007700.

* cited by examiner

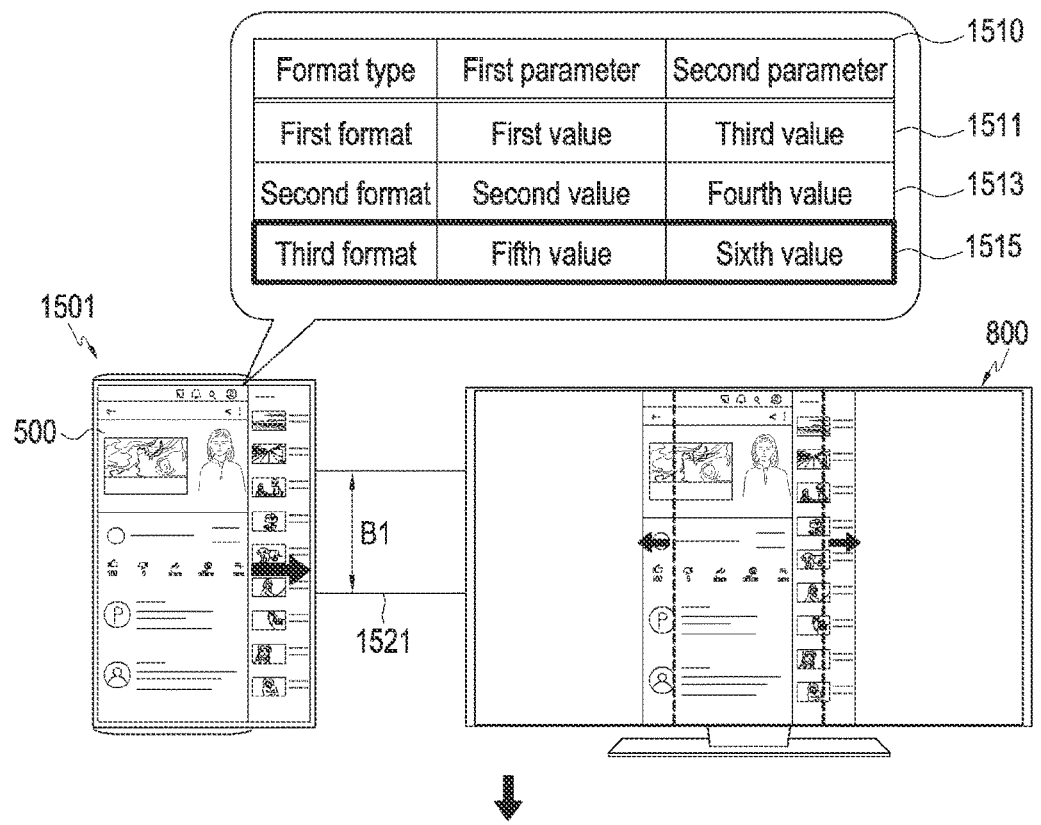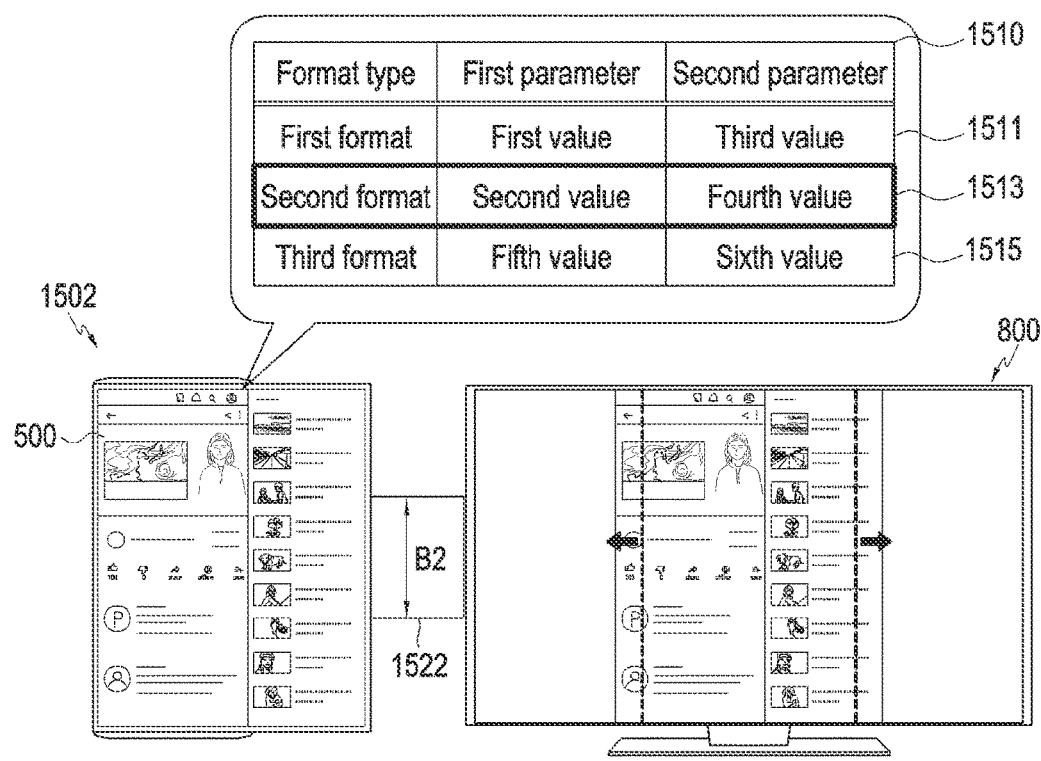
FIG.15A

ELECTRONIC DEVICE INCLUDING FLEXIBLE DISPLAY AND METHOD FOR OPERATING THE SAME

CROSS-REFERENCE TO RELATED APPLICATIONS

This application is a continuation of International Application No. PCT/KR2022/007700 designating the United States, filed on May 30, 2022, in the Korean Intellectual Property Receiving Office and claiming priority to Korean Patent Application No. 10-2021-0075398, filed on Jun. 10, 2021, in the Korean Intellectual Property Office, and to Korean Patent Application No. 10-2021-0126607, filed on Sep. 24, 2021, in the Korean Intellectual Property Office, the disclosures of all of which are incorporated by reference herein in their entireties.

BACKGROUND

Field

The disclosure relates to an electronic device and, for example, to an electronic device including a flexible display and a method for operating the same.

Description of Related Art

In line with increasing demands for mobile communication and high degree of integration of electronic devices, electronic devices (for example, mobile communication terminals) may have improved portability and improved convenience in connection with using multimedia functions and the like. For example, displays integrated with touch screen functions may replace conventional mechanical (button-type) keypads such that electronic devices can become compact while retaining input device functions. For example, by removing mechanical keypads from electronic devices, the electronic devices may have improved portability. In another embodiment, if the display is expanded as much as the area from which the mechanical keypad is removed, the electronic device including a touch screen function may provide a larger screen than an electronic device including the mechanical keypad, even if both devices have the same size and weight.

In connection with using web serving or multimedia functions, it may be more convenient to use an electronic device that outputs a larger screen. Electronic devices may be equipped with larger displays to output larger screens, but in view of portability of electronic devices, there may be restrictions on expanding the display size. In an embodiment, a display using organic light-emitting diodes may both provide a larger screen and secure portability of the electronic device. For example, a display (or an electronic device equipped therewith) using organic light-emitting diodes may implement stable operations in spite of a considerably small thickness, and may be mounted on an electronic device in a foldable, bendable, or rollable manner.

An electronic device may include a structure such that the area of an exposed region of a flexible display can be expanded or reduced. For example, an electronic device may include a structure, in which at least a part of a flexible display is disposed, and which can make reciprocating movements, and may include a structure (for example, entrance) formed such that another part of the display contained in the electronic device can be withdrawn and/or inserted. If the area of the flexible display is expanded or reduced while the electronic device transmits video data regarding contents displayed on the flexible display of the electronic device to an external electronic device using a wireless display technology (for example, Miracast, AirPlay, WiDi, or DIAL), contents displayed on the flexible display may be changed. However, the electronic device may be unable to perform an operation of updating the region of the flexible display, which is to be displayed wirelessly, in response to expansion or reduction of the flexible display, thereby failing to transmit video data regarding newly displayed contents to the external electronic device. This may degrade the quality of the wireless display operation because the screen displayed on the external electronic device appears discontinuous. In addition, the expanded area of the flexible display may increase the area of contents displayed on the flexible display, thereby increasing the amount of data processed by the electronic device or transmitted to the external electronic device, and increasing the burden on operating the wireless display. In addition, expansion or reduction of the area of the flexible display may cause unintended wireless display of video data regarding new contents by the external electronic device, thereby degrading convenience of the wireless display user.

An electronic device and a method for operating the same, according to various embodiments, may update a region to be displayed wirelessly in response to reduction of expansion of the area of an exposed region of a flexible display and may transmit video data regarding newly displayed contents to an external electronic device, thereby maintaining or improving the quality of wireless display operations.

In addition, an electronic device and a method for operating the same, according to various embodiments, may adjust the value of a parameter related to wireless display when the area of a flexible display is expanded such that the amount of data processed by the electronic device or transmitted to an electronic device is reduced, thereby lessening the burden on operating the wireless display.

In addition, an electronic device and a method for operating the same, according to various embodiments, may enable the user to select parts to be displayed wirelessly among contents displayed on a flexible display such that contents intended by the user are solely displayed wirelessly by an external electronic device, thereby improving user convenience.

SUMMARY

Various embodiments may provide an electronic device including: a housing, a flexible display having a resizable region visible to the outside of the housing, a communication circuit configured to enable transmitting or receiving data to or from an external electronic device, at least one sensor configured to identify a size of a region where the flexible display is visible to the outside of the housing, a memory, and at least one processor, wherein the at least one processor is configured to: display first content on a first region of the flexible display visible to the outside of the housing, establish communication connection with an external electronic device through the communication circuit, transmit, based on the establishing of the communication connection, first information on the first content to the external electronic device through the communication circuit so that the external electronic device displays the first content, when a second region where the flexible display located inside the housing is visible to the outside of the housing, display second content on a third region including the first region and the second region, based on at least one value obtained using the at least one sensor, identify second information on the second content, which is to be transmitted to the external electronic device, based on the obtained at least one value, and transmit the identified second information to the external electronic device through the communication circuit so that the external electronic device displays the second content.

Various embodiments may provide a method for operating an electronic device, the method including: displaying first content on a first region of a flexible display having a resizable region visible to the outside of a housing, establishing communication connection with an external electronic device through a communication circuit of the electronic device, transmitting, based on the establishing of the communication connection, first information on the first content to the external electronic device through the communication circuit so that the external electronic device displays the first content, displaying, when a second region where the flexible display located inside the housing is visible to the outside of the housing, second content on a third region including the first region and the second region, based on at least one value obtained using at least one sensor of the electronic device, identifying second information on the second content, which is to be transmitted to the external electronic device, based on the obtained at least one value, and transmitting the identified second information to the external electronic device through the communication circuit so that the external electronic device displays the second content.

Various embodiments may provide an electronic device including: a housing, a flexible display having a resizable region visible to the outside of the housing, a communication circuit configured to enable transmitting or receiving data to or from an external electronic device, at least one sensor configured to identify a size of a region where the flexible display is visible to the outside of the housing, and at least one processor, wherein the at least one processor is configured to: identify, based on an identified value using the at least one sensor, at least one first parameter related to the area of the flexible display visible to the outside, identify a value for at least one second parameter related to a video quality and a specified region of the flexible display and a value for at least one third parameter related to video transmission, based on the identified at least one first parameter, obtain video data based on the value for the at least one second parameter by encoding a content corresponding to the specified region, and transmit the video data based on the value for the at least one third parameter to the external electronic device through the communication circuit.

Technical solutions according to various embodiments are not limited to the above-mentioned technical solutions, and other technical solutions not mentioned herein will be clearly understood from the disclosure and the accompanying drawings by those skilled in the art.

Various embodiments may provide an electronic device and a method for operating the same, wherein a region to be displayed wirelessly is updated in response to reduction of expansion of the area of an exposed or visible region of a flexible display, and video data regarding newly displayed contents is transmitted to an external electronic device, thereby maintaining or improving the quality of wireless display operations.

In addition, various embodiments may provide an electronic device and a method for operating the same, wherein the value of a parameter related to wireless display is adjusted when the area of a flexible display is expanded such that the amount of data processed by the electronic device or transmitted to an external electronic device is reduced, thereby lessening the burden on operating the wireless display.

In addition, various embodiments may provide an electronic device and a method for operating the same, wherein the user is enabled to select parts to be displayed wirelessly among contents displayed on a flexible display such that contents intended by the user are solely displayed wirelessly by an external electronic device, thereby improving user convenience.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 15A is a view illustrating an operation of changing a parameter of an electronic of which a display is implemented to be withdrawn in a transverse direction according to various embodiments;

DETAILED DESCRIPTION

Figure 1A:
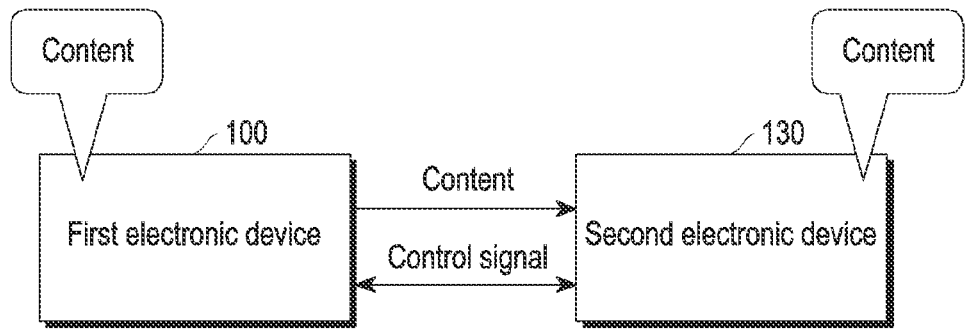
FIG. 1A is a view illustrating an example of electronic devices performing wireless display according to various embodiments.
Figure 1B:
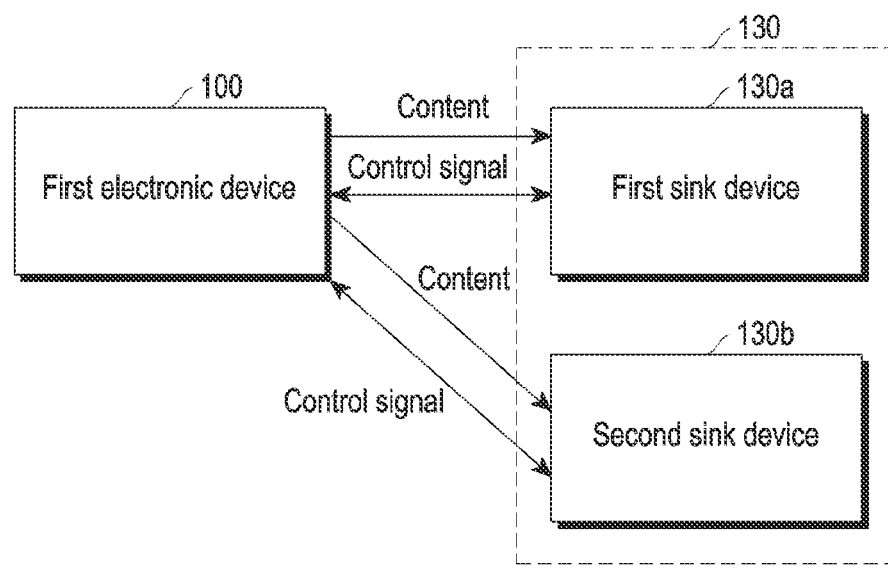
FIG. 1B is a view illustrating an example of electronic devices performing wireless display according to various embodiments.

FIG. 1A is a view illustrating an example of electronic devices performing wireless display according to various embodiments. FIG. 1B is a view illustrating an example of electronic devices performing wireless display according to various embodiments.

According to various embodiments, one electronic device (for example, the first electronic device 100) may transfer a content to another electronic device and cause the another electronic device to render (or display) a content (for example, a video, image, and/or sound). The content which will be described below may include an execution screen of an application or a graphic object (for example, an object in units of view). For example, the electronic devices (for example, the first electronic device 100 and the second electronic device 130) may be devices supporting, to provide, and without limitation, a wireless display service (or a mirroring service), mirror cast (or Wi-Fi display (WFD)) standardized by Alliance, Airplay developed by a manufacturer, Wireless display (WiDi), DIAL, or the like. The electronic devices (for example, the first electronic device 100 and the second electronic device 130) may respectively configure a specific session for providing a wireless display service, based on the technologies (for example, mirror cast, Airplay, WiDi, and DIAL). Hereinafter, for convenience of description, it will be described with an example of devices supporting mirror cast. However, the description below will be applied to other technologies (for example, and without limitation, Airplay, WiDi, and DIAL) as well. For example, the information (for example, information related to a type of the first electronic device (for example, resolution information, screen ratio information, and identification information)) and a message for changing a value for a parameter (for example, resolution and a frame rate) related to wireless display) to be described below, transmitted and/or received between the first electronic device 100 and the second electronic device 130 may be transmitted and/or received as well between other devices supporting other technologies.

According to various embodiments, the first electronic device 100 may be a source device for wirelessly transmitting a content defined by mirror cast (or WFD standard) and the second electronic device 130 may be a sink device for displaying the wirelessly received content. Referring to FIG. 1A, the first electronic device 100 (for example, a source device) and the second electronic device 130 (for example, the sink device) may be communicatively connected to each other for transmitting and/or receiving predetermined information (for example, a message for controlling a parameter (for example, resolution and a frame rate) related to a video stream, an audio stream, and/or wireless display). In addition, referring to FIG. 1B, the first electronic device 100 (for example, the source device) and multiple second electronic devices 130 (for example, a first sink device 130a and a second sink device 130b) may be communicatively connected to each other for transmitting and/or receiving predetermined information. For example, the source device and the sink device may be connected to each other through one of connectivity schemes from among a Wi-Fi P2P (for example, P2P Wi-Fi direct) and a tunneled direct link service (TDLS). However, the scheme is not limited to the aforementioned example, and the source device and the sink device may be connected to each other through various connection schemes such as a local area network (LAN), a wide area network (WAN), a wireless LAN (WLAN), a wireless broadband (Wibro), a CDMA, a WCDMA, a near field communication (NFC). The communication connectivity configuration may be set according to operations for configuring a WFD session and the description thereof will be given below with reference to FIG. 2. According to an embodiment, the source device may obtain and/or encode a content currently displayed on a display to produce a video stream (or, video data) and transmit the video stream to the sink device based on a communication connection. The source device may display, on a display, the video produced by decoding the received video stream. In an embodiment, the source device may obtain and/or encode an audio content to produce an audio stream and transmit the audio stream to enable the sink device to output an audio. In addition, in an embodiment, the source device and the sink device may transmit and/or receive, to/from each other, a message for controlling (or, for negotiating) at least one parameter (for example, resolution and a frame rate) related to a video stream and/or an audio stream.

According to various embodiments, the first electronic device 100 (for example, the source device) may be a type of electronic device of which an area of a display for displaying a content is variable. In an embodiment, the first electronic device 100 (for example, the source device) may be a type of electronic device including a structure in which an area of a display exposed or visible (herein, the terms "exposed", "visible", "visually exposed" or the like may be used interchangeably to denote that the display is visible) to the outside is changeable (for example, a rollable electronic device). The rollable electronic device may be a type of electronic device including a flexible display of which at least a portion is able to be inserted into the first electronic device 100 (for example, the source device) and of which an area exposed to the outside is changeable according to insertion and/or withdrawal of the flexible display. In an embodiment, the first electronic device 100 (for example, the source device) may be a foldable electronic device and have a variable area to which a content is displayed according to change of a folding state. For example, the foldable electronic device may be an electronic device having a flexible display and a foldable hinge structure, or an electronic device having multiple displays and a hinge structure for enabling changes of angles between each display. For example, in a case of the foldable electronic device including a flexible display of an out-folding way, as the folding angle is changed while the electronic device displays the content on one region of the flexible display, the content may be displayed to another region of the display. In an embodiment, the source device may include multiple devices and an area of a display for displaying a content may be variable according to the number of the devices. When the area for displaying a content is changed, the first electronic device 100 (for example, the source device) may update a region for obtaining a content, and obtain a content on the updated region to produce a video stream. A more detailed description thereof will be given below with reference to FIG. 10, FIG. 11A and FIG. 11B. The first electronic device 100 (for example, the source device) may store, in the first electronic device 100 in advance, information (for example, identification information) that the electronic device is a type having the variable area of a display for displaying content, and transmit the information to the second electronic device 130 (for example, the sink device) when performing an operation for wireless display.

According to various embodiments, the first electronic device 100 (for example, the source device) may include various types of electronic devices. For example, the first electronic device 100 (for example, the source device) may include, and without limitation, a smart terminal (for example, a smart phone and PDA), a TV set, a display device, a laptop PC, a tablet PC, a wearable device (for example, a head-mounted display and a smart watch), or the like. By way of example, the source device may be a rollable mobile phone or a rollable TV. Hereinafter, an operation for configuring a WFD session between the first electronic device 100 (for example, the source device) and the second electronic device 130 (for example, the sink device) according to various embodiments will be described.

Figure 2:
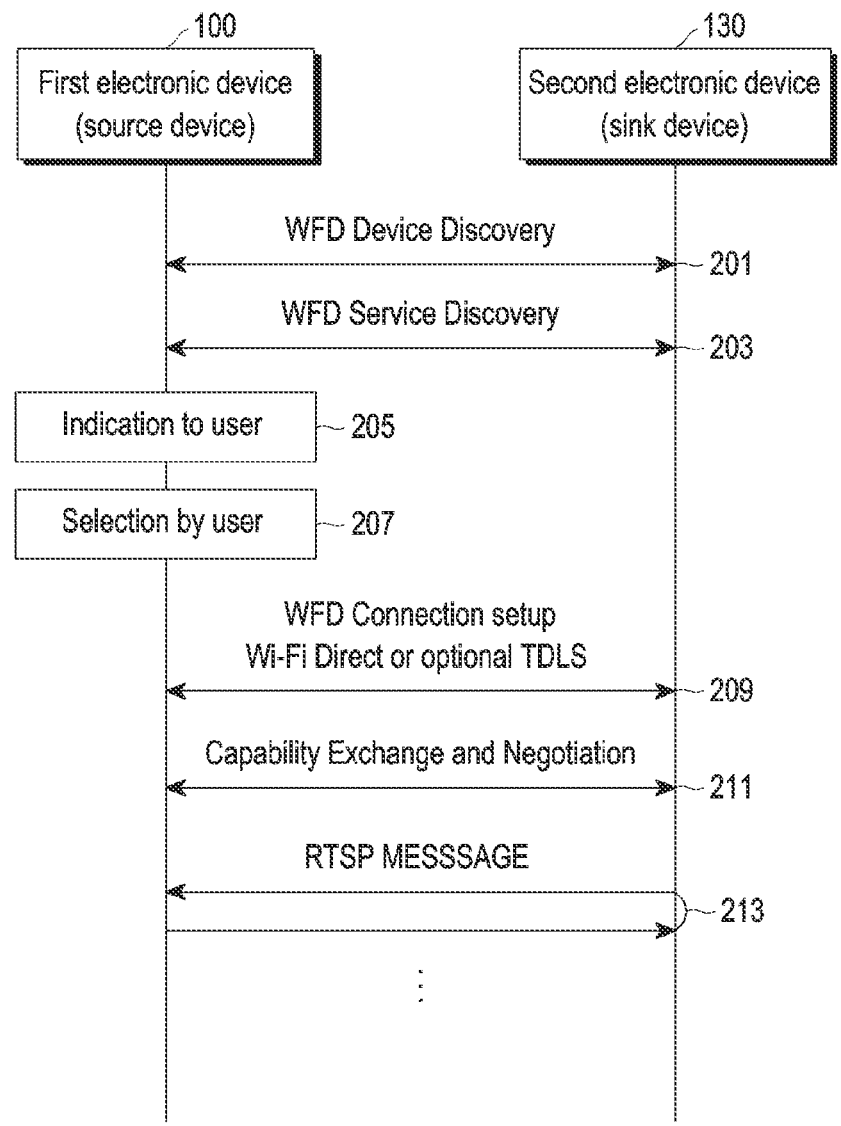
FIG. 2 is a view illustrating an example of an operation of a first electronic device and a second electronic device supporting a mirror casting according to various embodiments.

FIG. 2 is a view illustrating an operation of a first electronic device 100 and a second electronic device 130 for supporting a mirror casting according to various embodiments.

Referring to FIG. 2, the first electronic device 100 and the second electronic device 130 may perform at least one of WFD device discovery 201, WFD service discovery 203, WFD connection setup 209, or capability exchange and negotiation 211. The WFD service discovery 203 may be selectively performed or may not be performed. After the capability exchange and negotiation 211 is completed, the first electronic device 100 may transmit, to the second electronic device 130, a stream data (for example, video data (or video stream) and audio data (or audio stream)). Hereinafter, the procedure of operations will be described. However, the operations not to be described below may be implemented as those disclosed in "Wi-Fi Display Technical Specification" and/or "Wi-Fi Peer-to-Peer (P2P) Technical Specification Wi-Fi Direct Service Addendum", and therefore the detailed description will be omitted.

First, the WFD device discovery 201 will be described.

According to various embodiments, in the WFD device discovery 201, the first electronic device 100 (for example, the source device) may identify a device for a WFD, that is the second electronic device 130 (for example, the sink device) through the WFD device discovery.

According to various embodiments, the first electronic device 100 (for example, the source device) may transmit a probe request frame including a WFD information element (IE) to the second electronic device 130 (for example, the sink device), and the second electronic device 130 (for example, the sink device) may transmit, in response to the probe request frame, a probe response frame including a WFD IE to the first electronic device 100 (for example, the source device). The WFD IE may be an information element including information such as a device type and a device state. When the WFD device (for example, the first electronic device 100 and the second electronic device 130) is associated with an infrastructure AP and operated as a Wi-Fi P2P device, the prove request frame may include a P2P information element in addition to the WFD IE. The probe response frame as a response to the probe request frame may be transmitted through a channel through which the probe request frame is received and may include both of the P2P IE and the WFD IE.

Hereinafter, the WFD service discovery 203 will be described. The WFD service discovery may be selectively performed.

According to various embodiments, in the WFD service discovery 203, discovery for a mutual service capability of the first electronic device 100 (for example, the source device) and the second electronic device 130 (for example, the sink device) having performed the WFD device discovery may be performed. For example, when the first electronic device 100 (for example, the source device) transmits a service discovery request frame including information on WFD capability, the second electronic device 130 (for example, the sink device) may transmit a service discovery response frame including information on WFD capability in response to the service discovery request frame.

According to various embodiments, in order to perform the WFD service discovery, the probe request frame and the probe response frame used for the WFD device discovery may include information indicating whether the WFD device has a capability for supporting service discovery.

Hereinafter, the WFD connection setup 209 will be described.

According to various embodiments, in the WFD connection setup 209, the first electronic device 100 (for example, the source device) which has performed the WFD device discovery 201 and selectively performed the WFD service discovery 203 may select a WFD device for WFD connection setup. For example, the first electronic device 100 (for example, the source device) may indicate to a user 205 information about the discovered second electronic device 130 (for example, the sink device), and may receive an input of selection by a user 207 to select a WFD device for WFD connection setup, based on the indication. After the WFD device is selected, the first electronic device 100 (for example, the source device) may use one connectivity scheme from among a Wi-Fi P2P and a tunneled direct link service (TDLS) for communication connection. The WFD devices may determine a connectivity scheme based on information about preferred connectivity and an associated basic service set identifier (BSSID) subelement transferred with the WFD information element.

In an embodiment, when the communication connection between the first electronic device 100 (for example, the source device) and the second electronic device 130 (for example, the sink device) is performed based on the Wi-Fi P2P, an access point (AP) may be common or different to the first electronic device 100 (for example, the source device) and the second electronic device 130 (for example, the sink device). Alternatively, the AP may not exist.

In an embodiment, when the communication connection between the first electronic device 100 (for example, the source device) and the second electronic device 130 (for example, the sink device) is performed using a TDLS link, the first electronic device 100 (for example, the source device) and the second electronic device 130 (for example, the sink device) may need to maintain the connection to the identical access point (AP).

According to various embodiments, when the first electronic device 100 is a type of electronic device with a variable area of a display (for example, a rollable device and a foldable device), the first electronic device 100 (for example, the source device) may transmit, to the second electronic device 130 (for example, the sink device), information related to a device type of the first electronic device 100 during performing at least one of the WFD device discover, the WFD service discovery, or the WFD connection setup. The information related to the type of the first electronic device 100 may include resolution information, screen ratio information, or identification information. The identification information may indicate a type of the first electronic device 100. Based on the reception of the information related to the device type, the second electronic device 130 (for example, the source device) may decode, when the first electronic device 100 changes a parameter related to wireless display (for example, a parameter related to video quality (for example, resolution, a frame rate, color depth) and a parameter related to the transmission (for example: a bit rate)), received video data based on the changed parameter.

Hereinafter, the capability exchange and negotiation 211 will be described.

According to various embodiments, the WFD capability exchange and negotiation is performed after the WFD connection setup between the WFD devices, and a message may be exchanged (for example, real-time streaming protocol (RTSP) message exchange 213) during the corresponding process. The first electronic device 100 (for example, the source device) and the second electronic device 130 (for example, the sink device) may exchange, through the WFD capacity exchange and negotiation, at least a piece of information from among a mutually supportable codec, profile information of a codec, level information of a codec, and resolution information. The WFD capacity exchange and negotiation may be performed by exchanging messages using a real time streaming protocol (RTSP). In addition, a parameter set defining an audio/video payload during the WFD session may be determined. The WFD capacity exchange and negotiation may be performed by exchange of RTSP M1 to RTSP M4 messages to be described below. In an embodiment, during the WFD capacity exchange and negotiation, the first electronic device 100 (for example, the source device) may transmit, to the second electronic device 130 (for example, the sink device), information related to the device type of the first electronic device 100 (for example, at least one piece of resolution information, screen rate information, or identification information). Accordingly, as described above, when the first electronic device 100 (for example, the source device) changes a parameter related to wireless display (for example, a parameter related to video quality (for example, resolution, a frame rate, color depth) and a parameter related to the transmission (for example: a bit rate)), the second electronic device 130 (for example, the sink device) may decode the received video data based on the changed parameter.

According to various embodiments, 1) the first electronic device 100 (for example, the source device) may transmit an RTSP M1 request message for starting RTSP and WFD capacity negotiation. The RTSP M1 message may include a RTSP OPTIONS request for determining a set of RTSP methods supported by the second electronic device 130 (for example, the sink device). 2) The second electronic device 130 (for example, the sink device) having received the RTSP M1 request message may transmit an RTSP M1 response message in which RTSP methods supported thereby are enumerated. 3) Thereafter, the second electronic device 130 (for example, the sink device) may transmit an RTSP M2 request message for determining a set of RTSP methods supported by the first electronic device 100 (for example, the source device). 4) When the RTSP M2 request message is received, the first electronic device 100 (for example, the source device) may respond with an RTSP M2 response message in which the RTSP methods supported thereby are enumerated. 5) The first electronic device 100 (for example, the source device) may transmit an RTSP M3 request message (RTSP GET_PARAMETER request message) indicating a list of WFD capabilities desired to know. 6) When the RTSP M3 request message is received, the second electronic device 130 (for example, the sink device) may respond with an RTSP M3 response message (RTSP GET_PARAMETER response message). 7) Based on the RTSP M3 response message, the first electronic device 100 (for example, the source device) may determine an optimum parameter set used during the WFD session and transmit, to the second electronic device 130 (for example, the sink device), an RTSP M4 request message (RTSP SET_PARAMETER request message) including the determined parameter set. 8) When the RTST M4 request massage is received, the second electronic device 130 (for example, the sink device) may transmit an RTSP M4 response message (RTSP SET_PARAMETER response message). 9) The first electronic device 100 (for example, the source device)/the second electronic device 130 (for example, the sink device) having performed the WFD capacity and negotiation may establish the WFD session. In detail, the first electronic device 100 (for example, the source device) may transmit an RTSP SET_parameter request message (RTSP M5 Trigger SETUP request) to the second electronic device 130 (for example, the sink device). 10) The second electronic device 130 (for example, the sink device) may transmit, in response to the RTSP SET parameter request message, an RTSP M5 response message. 11) When the RTST M5 message including the trigger parameter SETUP is successfully exchanged, the second electronic device 130 (for example, the sink device) may transmit an RTSP SETUP request message (RTSP M6 request) to the first electronic device 100 (for example, the source device). 12) When RTSP M6 request message is received, the first electronic device 100 (for example, the source device) may respond with an RTSP SETUP response message (RTSP M6 response). Successful establishment of the RTSP session may be indicated through configuration of a state code of the RTSP M6 response message. 13) After successful exchange of the RTSP M6 messages, the second electronic device 130 (for example, the sink device) may transmit, to the source device, an RTSP PLAY request message (RTSP M7 request message) for informing that RTS stream reception is ready. 14) The first electronic device 100 (for example, the source device) may respond with an RTSP PLAY response message (RTSP M7 response message). Successful establishment of the WFD session may be indicated based on a state code of the RTSP PLAY response message.

According to various embodiments, after the WFD session is established, the first electronic device 100 (for example, the source device) may transmit, to the second electronic device 130 (for example, the sink device), an RTSP M3 request message (RTSP GET_PARAMETER request message) for obtaining capability with respect to at least one RTSP parameter supported by the second electronic device 130 (for example, the sink device), an RTSP M4 request message for configuring at least RTSP parameter value corresponding to the WFD session to capacity renegotiate between the first electronic device 100 (for example, the source device) and the second electronic device 130 (for example, the sink device) for AV (audio/video) format update, an RTSP M5 request message triggering the second electronic device 130 (for example, the sink device) to transmit an RTSP PAUSE request message (RTSP M9 request message), an RTSP M12 request message indicating that the first electronic device 100 (for example, the source device) enters WFD standby mode, an RTSP M14 request message for selecting an input type, an input device, and other parameters used in a user input back channel (UIBC), RTSP M15 request message for enabling or disabling the user input back channel (UIBC), or the like. According to various embodiments, RTSP messages may be exchanged according to an event (for example, withdrawal of the display of the electronic device) causing the change of parameters, and the description thereof will be given below. The second electronic device 130 (for example, the sink device) having received the RTSP request messages described above from the first electronic device 100 (for example, the source device) may respond with an RTSP response message. Thereafter, the second electronic device 130 (for example, the sink device) may transmit, to the first electronic device 100 (for example, the source device), an RTSP M7 request message (RTSP PLAY request message) for starting (or restarting) of audio/video streaming, an RTSP M9 request message (RTSP PAUSE request message) for stopping of audio/video streaming transmitted from the first electronic device 100 (for example, the source device) to the second electronic device 130 (for example, the sink device), an RTSP M10 request message for requesting of the first electronic device 100 (for example, the source device) to change an audio rendering device, an RTSP M11 request message for indicating a change of active connector type, an RTSP M12 request message for indicating that the second electronic device 130 (for example, the sink device) enters a WFD standby mode, an M13 request message for requesting the first electronic device 100 (for example, the source device) to instantaneous decoding refresh (IDR), RTSP M14 request message for selecting an input type, an input device, and other parameters used in a UIBC, RTSP M15 request message for enabling or disabling the UIBC, or the like. The first electronic device 100 (for example, the source device) having received the RTSP request messages described above from the second electronic device 130 (for example, the sink device) may respond with an RTSP response message.

When the WFD session is established to start the audio/video streaming, the first electronic device 100 (for example, the source device) and the second electronic device 130 (for example, the sink device) may proceed audio/video streaming using a codec supported commonly thereby. The use of a codec commonly supported by the first electronic device 100 (for example, the source device) and the second electronic device 130 (for example, the sink device) may ensure mutual interoperability.

According to various embodiments, with a change in area of a display as a trigger condition, the first electronic device 100 (for example, the source device) may transmit, to the second electronic device 130 (for example, the sink device), an RTSP message (for example, the RTSP M4 request message) for changing a value of a wireless display-relating parameter (for example, a parameter related to video quality (for example, resolution, a frame rate, and color depth) and a parameter related to transmission (for example, a bit rate)). The RTSP message may include information (for example, index indicating a parameter value or index indicating a format having a value of the corresponding parameter) indicating a value of a parameter (for example, a parameter related to video quality (for example, resolution, a frame rate, and color depth) and a parameter related to transmission (for example, a bit rate)) changed in the first electronic device 100 (for example, the source device). Renegotiation with respect to a value of a parameter is performed, based on the RTSP message, and the second electronic device 130 (for example, the sink device) may transmit an RTSP response message (for example, the RTSP M4 response message) to the first electronic device 100 (for example, the source device). The first electronic device 100 (for example, the source device) may produce video data with a changed value of a parameter, based on the RTSP response message (for example, the RTSP M4 response message) and transmit the same. The second electronic device 130 (for example, the sink device) may decode the video data, based on the changed value of the parameter value to obtain and display a content. Hereinafter, in the case that the first electronic device 100 (for example, the source device) is implemented as a rollable electronic device, an example of the rollable electronic device (hereinafter, an electronic device 300) will be described.

Figure 3A:
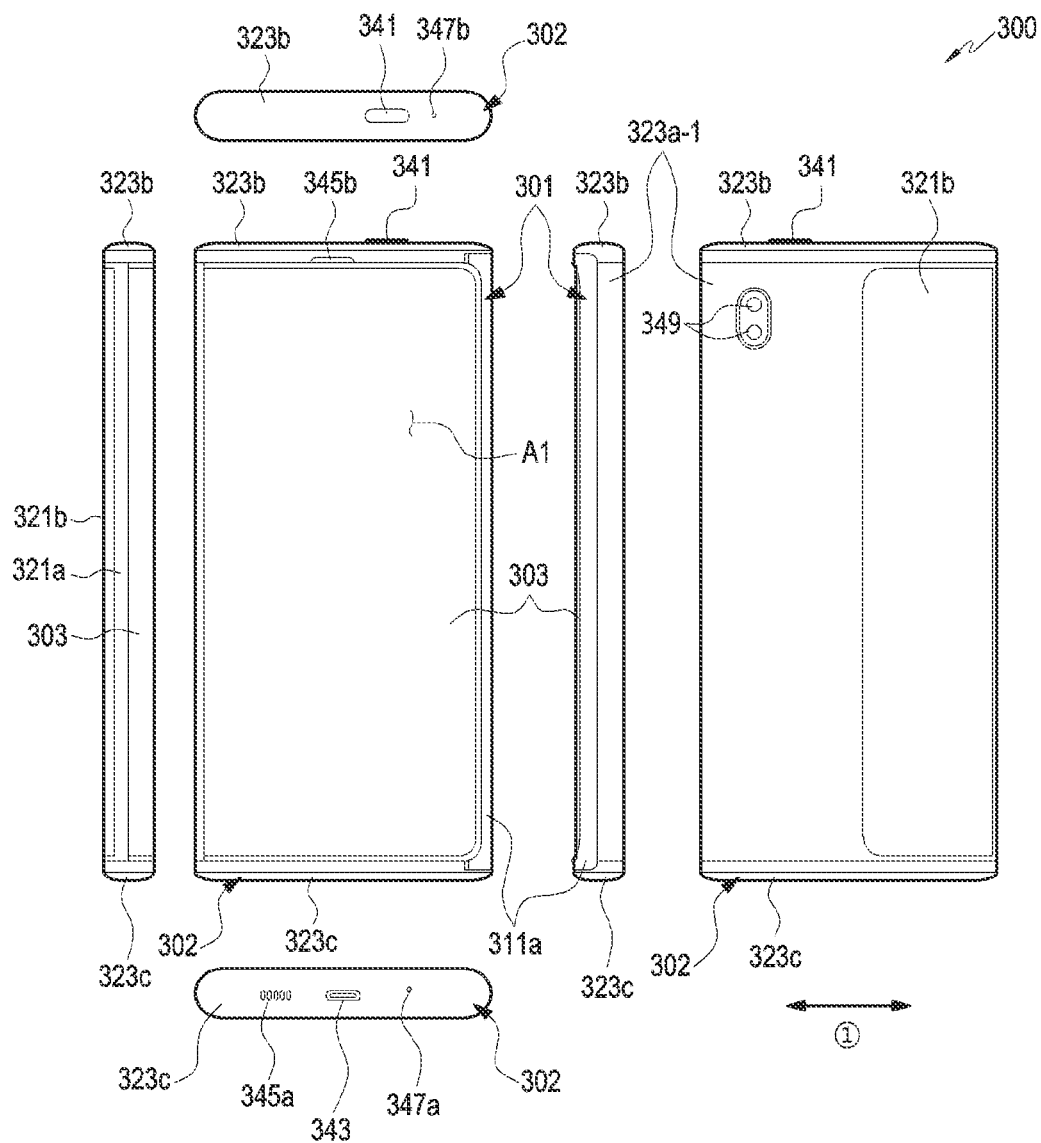
FIG. 3A is a view illustrating an electronic device according to various embodiments disclosed herein, showing a state in which a portion (for example, a portion of a second region) of a flexible display is received in a second structure.
Figure 3B:
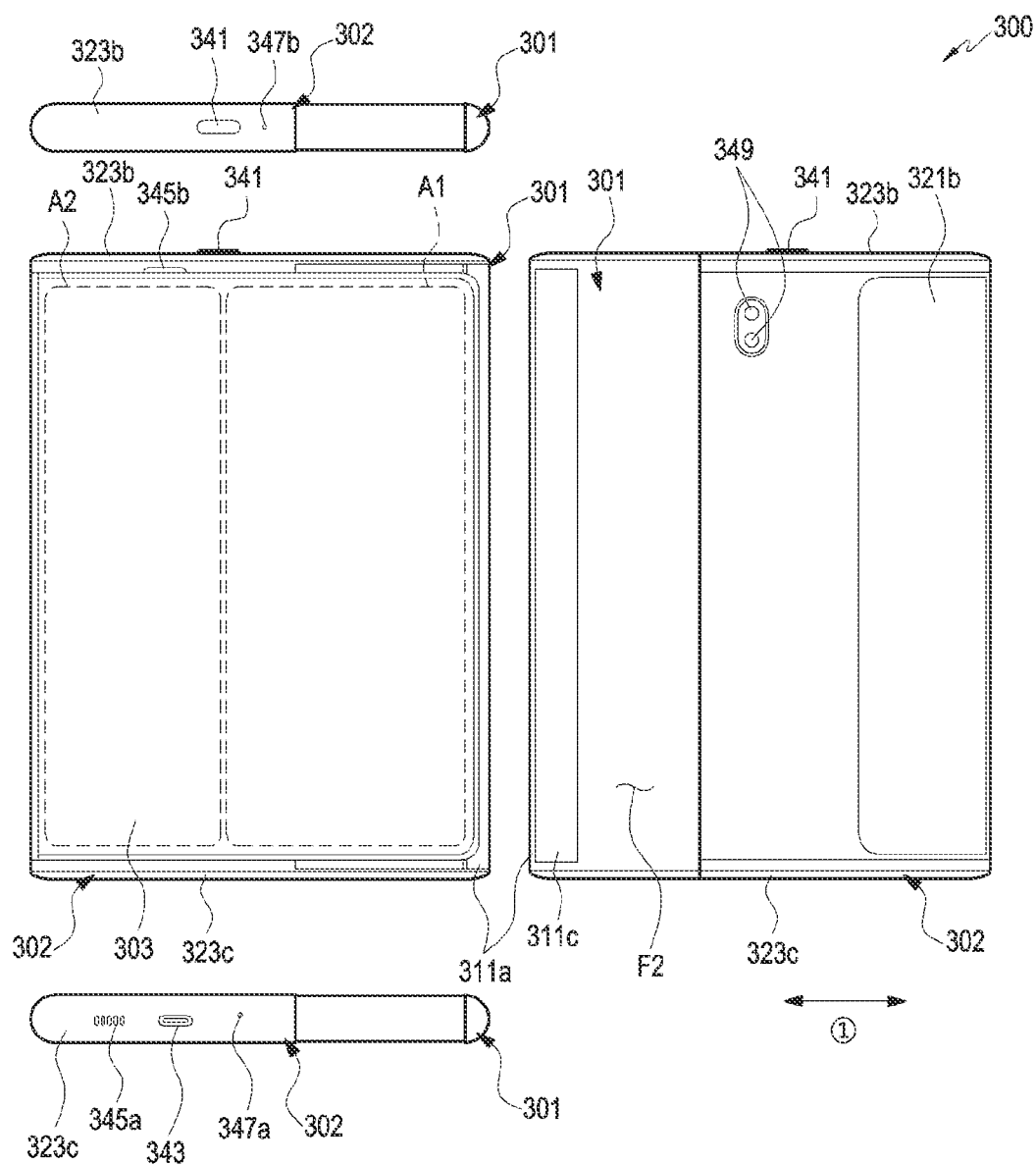
FIG. 3B is a view illustrating an electronic device according to various embodiments disclosed herein, showing a state in which most portion of a flexible display is visually exposed to the outside of a second structure.

FIG. 3A is a view illustrating an electronic device 300 according to various embodiments disclosed herein, showing a state in which a portion (for example, a portion of a second region A2) of a flexible display 303 is received in a second structure 302. FIG. 3B is a view illustrating an electronic device 300 according to various embodiments disclosed herein, showing a state in which most portion of a flexible display 303 is visually exposed to the outside of a second structure 302.

The state shown in FIG. 3A may be defined as a state in which a first structure 301 is closed with respect to the second structure 302, and the state shown in FIG. 3B may be defined as a state in which the first structure 301 is open with respect to the second structure 302. According to embodiments, the "closed state" or "open state" may be defined as a state in which the electronic device is closed or open. The electronic device 300 may include the first structure 301 and the second structure 302 disposed to be movable in the first structure 301. In an embodiment, it may be understood as a structure that the first structure 301 is slidably disposed on the second structure 302 in the electronic device 300. According to an embodiment, the first structure 301 between the closed state and the open state may be reciprocatively disposed in a direction shown with reference to the second structure 302, for example, in a direction indicated with arrow ①.

According to various embodiments, the first structure 301 may be referred to as a first housing, a slide part, a slide housing, or a slide plate, and reciprocatively disposed on the second structure 302. In an embodiment, the second structure 302 may be referred to as, for example, a second housing, a main part, or a main housing, and may receive various electric or electronic components such as a circuit board (for example, the printed circuit board 325 in FIG. 3C) or a battery (for example, the battery 327 in FIG. 3C). A portion (for example, a first region A1) of the flexible display 303 may be seated in the first structure 301. In an embodiment, according to moving (for example, sliding) with respect to the first structure 301 and the second structure 302, another portion (for example, the second region A2) of the flexible display 303 may be received (for example, a slide-in operation) inside the second structure 302 or exposed (for example, a slide-out operation) to the outside of the second structure 302.

According to various embodiments, the first structure 301 may include a first plate 311*a* (for example, a slide plate) and include a first surface F1 (see FIG. 3C) formed by including at least a portion of the first plate 311*a* and a second surface F2 facing away from the first surface F1. According to an embodiment, the second structure 302 may include a second plate 321*a* (see FIG. 3C) (for example, a rear case), a first lateral wall 323*a* extending from the second plate 321*a*, a second lateral wall 323*b* extending from the first lateral wall 323*a* and the second plate 321*a*, a third lateral wall 323*c* extending from the first lateral wall 323*a* and the second plate 321*a* and parallel with the second lateral wall 323*b*, and/or a rear plate 321*b* (for example, a rear window). In an embodiment, the second later wall 323*b* and the third later wall 323*c* may be formed substantially perpendicular to the first lateral wall 323*a*. According to an embodiment, the second plate 321*a*, the first lateral wall 323*a*, the second lateral wall 323*b*, and the third lateral wall 323*c* may be formed to be open at one side (for example, a front face) so as to receive (or surround) at least a portion of the first structure 301. For example, the first structure 301 in a state of being at least partially surrounded may be coupled to the second structure 302 and slide while being guided by the second structure 302 in a direction parallel with the first surface F1 or the second surface F2, for example, in a direction indicated by arrow ①.

According to various embodiments, the second lateral wall 323*b* or the third lateral wall 323*c* may be omitted.

According to an embodiment, the second plate 321*a*, the first lateral wall 323*a*, the second lateral wall 323*b*, and/or the third lateral wall 323*c* may be formed as separate structures and coupled or combined together. The rear plate 321*b* may be coupled to surround at least a portion of the second plate 321*a*. In an embodiment, the rear plate 321*b* may be substantially integrally formed with the second plate 321*a*. According to an embodiment, the second plate 321*a* or the rear plate 321*b* may cover at least a portion of the flexible display 303. For example, the flexible display 303 may be at least partially received inside the second structure 302, and the second plate 321*a* or the rear plate 321*b* may cover at least a portion (for example, a portion of the second region A2) of the flexible display 303 received inside the second structure 302.

According to various embodiments, the first structure 301 may move to the open state or the closed state with respect to the second structure 302 in a first direction (for example, ① direction) parallel with the second plate 321*a* (for example, the rear case) and the second lateral wall 323*b*, and the first structure 301 may move to be positioned at a first distance from the first lateral wall 323*a* (for example, a first lateral wall part 323*a*-1) in the closed state and at a second distance larger than the first distance from the first lateral wall 323*a* (for example, a first lateral wall part 323*a*-1) in the open state. In an embodiment, in the closed state, the first structure 301 may be positioned to surround a portion of the first lateral wall 323*a* (for example, the first lateral wall part 323*a*-1).

According to various embodiments, the electronic device 300 may include a flexible display 303, a key input device 341, a connector hole 343, an audio module 345*a*, 345*b*, 347*a*, or 347*b*, or a camera module 349. Although not shown, the electronic device 300 may further include an indicator (for example, an LED device) or various sensor modules.

According to various embodiments, the flexible display 303 may include a first region A1 and a portion of a second region A2. In an embodiment, the first region A1 may substantially extend across at least a portion of the first surface F1 to be disposed on the first surface F1. The second region A2 may extend from the first region A1 and according to sliding of the first structure 301, a portion of the second region A2 may be interposed (or inserted) or received inside the second structure 302, or may be visually exposed (or withdrawn) to the outside the second structure 302. As will be described below, at least a portion of the second region A2 may move while being substantially guided by a roller 351 (see FIG. 3C) mounted to the second structure 302 to be received inside or exposed to the outside of the second structure 302. For example, while the first structure 301 slides, a portion of the second region A2 may be transformed to have curved shape at a position corresponding to the roller 351.

According to various embodiments, when viewed from above the first plate 311*a* (for example, a slide plate), as the first structure 301 moves from the closed state to the open state, the second region A2 may be gradually exposed to the outside of the second structure 302 and may form a substantially planar surface with the first region A1. The flexible display 303 may be combined to or disposed adjacent to a touch sensing circuit, a pressure sensor for measuring a strength (pressure) of a touch, and/or a digitizer for detecting a magnetic field-type stylus pen. In an embodiment, the second region A2 may be at least partially received inside the second structure 302 and even in a state (for example, the closed state) shown in FIG. 3A, a portion of the second region A2 may be visually exposed to the outside. In an embodiment, regardless of the closed state or the open state, the visually exposed portion of the second region A2 may be positioned on the roller 351 and the portion of the second region A2 may maintain a curved shape at the position corresponding to the roller 351. For example, as will be described below, a portion of the second region A2, which is not covered by a back cover (for example, the back cover 401 in FIG. 4B and FIG. 4B to be described below) in the closed state of the electronic device 300 may be exposed to the outside and have a curvature corresponding to the roller 351.

The key input device 341 may be disposed on the second lateral wall 323b or the third lateral wall 323c of the second structure 302. In consideration of the appearance or use state, the electronic device 300 may be produced to omit the described key input device 341 or to further include one or more key input devices. In an embodiment, the electronic device 300 may include a key input device not described above, for example, a home key button or a touch pad disposed around the home key button. According to another embodiment, at least a portion of the key input device 341 may be disposed on a region of the first structure 301.

According to various embodiments, the connector hole 343 may be omitted according to an embodiment, and may include a connector (for example, a USB connector) for transmitting or receiving power or data with an external electronic device. Although not shown, the electronic device 300 may include multiple connector holes 343, and a portion of the multiple connector holes 343 may function as a connector hole for transmitting or receiving an audio signal with an external electronic device. In the described embodiment, the connector hole 343 is disposed on the third lateral wall 323c, but it should be noted that the disclosure is not limited thereto. For example, the connector hole 343 or an additional connector hole not shown in the drawing may be disposed on the first lateral wall 323a or the second lateral wall 323b.

According to various embodiments, the audio module 345a, 345b, 347a, or 347b may include a speaker hole 345a or 345b or a microphone hole 347a or 347b. One of the speaker hole 345a and 345b may be provided as a receiver hole for calling and the other one may be provided as an external speaker hole. A microphone for obtaining a sound from the outside may be disposed in the microphone hole 347a and 347b and in an embodiment, multiple microphones may be arranged to detect a direction of a sound. In an embodiment, the speaker hole 345a and 345b and the microphone hole 347a and 347b may be implemented into one hole and a speaker may be included without a speaker hole 345a and 345b (e.g.: piezo speaker). According to an embodiment, the speaker hole indicated with reference numeral "345b" may be disposed on the first structure 301 to be used as a receiver hole for calling and the speaker hole (for example, an external speaker hole) indicated with reference numeral "345a" or the microphone hole 347a and 347b may be disposed on the second structure 302 (for example, one of the lateral walls 323a, 323b, and 323c).

The camera module 349 may be provided on the second structure 302 and may photograph a subject in a direction opposite to the first region A1 of the flexible display 303. The electronic device 300 may include multiple camera modules 349. For example, the electronic device 300 may include a wide angle camera, a telephoto camera, or a close-up camera, and may include, according to an embodiment, an infrared projector and/or an infrared receiver to measure a distance to a subject. The camera module 349 may include one or more of lenses, an image sensor, and/or an image signal processor. Although not shown, the electronic device 300 may further include a camera module (for example, a front camera) for photographing a subject in a direction identical to the first region A1 of the flexible display 303. For example, the front camera may be disposed adjacent to the first region A1 or at a position overlapping the flexible display 303, and when disposed at a position overlapping the flexible display 303, may photograph a subject through the flexible display 303.

According to various embodiments, the indicator (not shown) of the electronic device 300 may be disposed on the first structure 301 or the second structure 302 and may include a light-emitting diode to provide state information of the electronic device 300 in a form of visual signal. The sensor module (not shown) of the electronic device 300 may generate an electrical signal or a data value corresponding to an internal operation state or external environment state of the electronic device 300. The sensor module may include, for example, a proximity sensor, a fingerprint sensor, or a biosensor (for example, an iris/face recognition sensor or an HRM sensor). In another embodiment, the sensor module may further include at least one from among, for example, a gesture sensor, a gyro sensor, an air pressure sensor, a magnetic sensor, an acceleration sensor, a grip sensor, a color sensor, an infrared (IR) sensor, a temperature sensor, a humidity sensor, or an illuminance sensor.

Figure 3C:
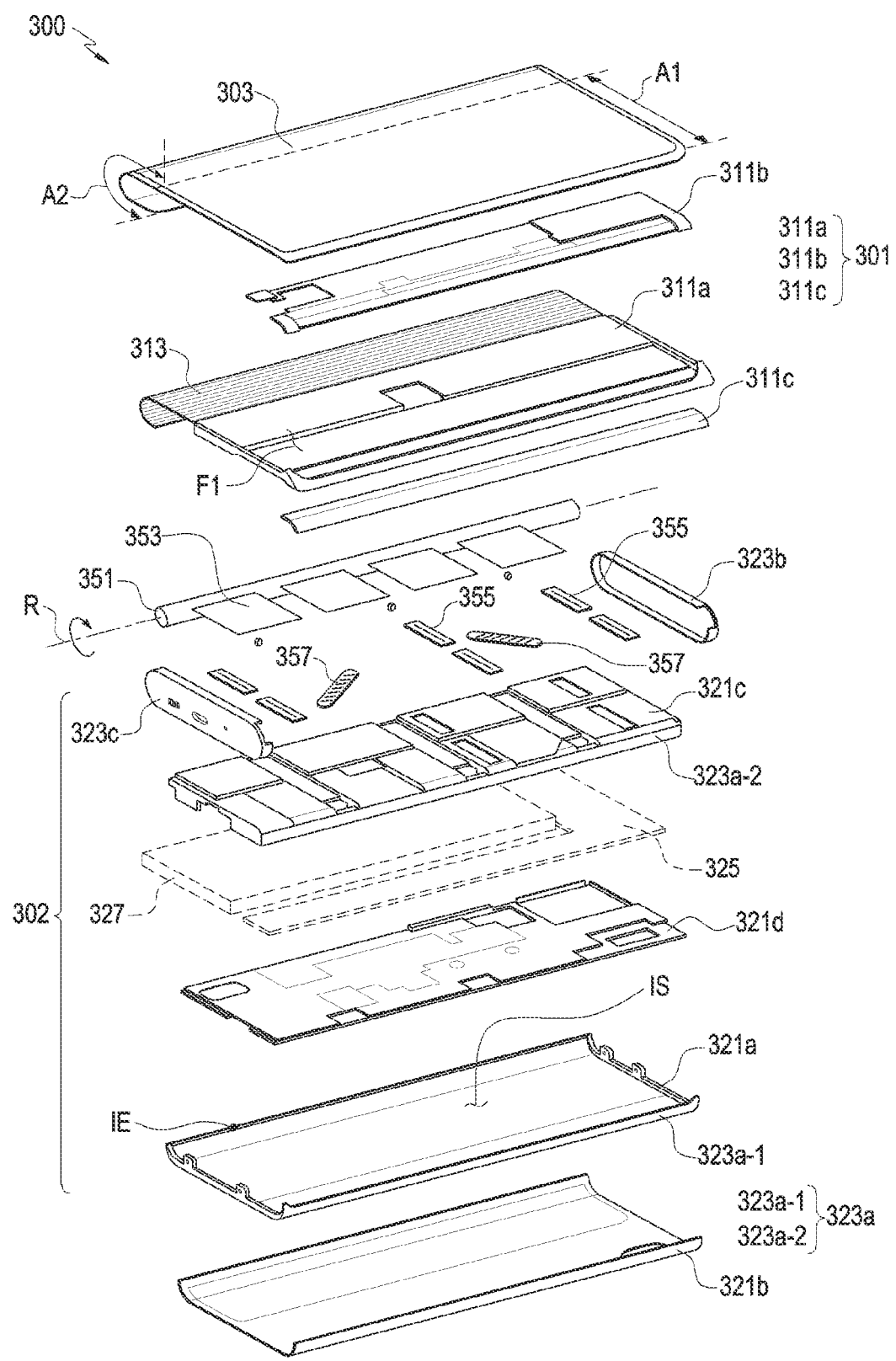
FIG. 3C is an exploded perspective view illustrating an electronic device (for example, the electronic device in FIG. 3A or FIG. 3B) according to various embodiments disclosed herein.

FIG. 3C is an exploded perspective view illustrating an electronic device (for example, the electronic device 300 in FIG. 3A or FIG. 3B) according to various embodiments disclosed herein.

Referring to FIG. 3C, the electronic device 300 may include a first structure 301, a second structure 302 (for example, a housing), a flexible display 303 (for example, the flexible display), a guide member (for example, a roller 351), and/or a multi-joint hinge structure 313. A portion (for example, the second region A2) of the flexible display 303 may be received in the inside (for example, a gap or space indicated with "IS") of the second structure 302 while being guided by the roller 351.

According to various embodiments, the first structure 301 may include a first plate 311a (for example, a slide plate), and a first bracket 311b and/or a second bracket 311c mounted to the first plate 311a. The first structure 301, for example, the first plate 311a, the first bracket 311b and/or the second bracket 311c may be formed of a metal material and/or a nonmetal (for example, a polymer) material. The first plate 311a may be mounted to the second structure 302 (for example, the housing) to linearly reciprocate in a direction (for example, arrow ① direction in FIG. 3A) while being guided by the second structure 302. In an embodiment, the first bracket 311b may be coupled to the first plate 311a to form a first surface F1 of the first structure 301 together with the first plate 311a. The first region A1 of the flexible display 303 may be substantially mounted to the first surface F1 to be maintained in a planar shape. The second bracket 311c may be coupled to the first plate 311a to form a second surface F2 of the first structure 301 together with the first plate 311a. According to an embodiment, the first bracket 311b and/or the second bracket 311c may be integrally formed with the first plate 311a. This may be appropriately designed in consideration of an assembly structure or a manufacturing process of a product thus manufactured. The first structure 301 or the first plate 311a may be coupled to the second structure 302 to be slidably movable with respect to the second structure 302.

According to various embodiments, the multi-joint hinge structure 313 may include multiple bars or rods arranged parallel with a rotation shaft R of the roller 351, and the multiple bars may be arranged along a direction perpendicular to the rotation shaft R, for example, a direction along which the first structure 301 slides. In an embodiment, the multi-joint hinge structure 313 may be connected to one end of the first structure 301 to move with respect to the second structure 302 according to the sliding of the first structure 301. For example, the multi-joint hinge structure 313 in a closed state (for example, the state shown in FIG. 3A) may be substantially received inside (or inserted inside) the second structure 302 and in an open state (for example, the state shown in FIG. 3B), may be extracted to the outside (or withdrawn to the outside) of the second structure 302. In an embodiment, even in the closed state, a portion of the multi-joint hinge structure 313 may not be received inside the second structure 302. For example, in the closed state, a portion of the multi-joint hinge structure 313 may be positioned outside the second structure 302 to correspond to the roller 351. In an embodiment, the multiple bars may extend in a straight line to be disposed substantially parallel with the rotation shaft R of the roller 351 and arranged along a direction substantially perpendicular to the rotation shaft R, for example, along a direction in which the first structure 301 slides.

According to various embodiments, the bars of the multi-joint hinge structure 313 may orbit around another bar adjacent thereto while maintaining a parallel state with other bars adjacent thereto. Accordingly, the multi-joint hinge structure 313 may form a curved surface at a position facing the roller 351 according to the sliding of the first structure 301 and maintain a planar surface at a portion not facing the roller 351. In an embodiment, the second region A2 of the flexible display 303 may be mounted to or supported by the multi-joint hinge structure 313, and in the open state (for example, the state shown in FIG. 3B), may be visually exposed to the outside of the second structure 302 together with the first region A1. In the state in which the second region A2 is exposed to the outside of the second structure 302, the multi-joint hinge structure 313 may maintain a substantially planar surface and thus support or maintain the second region A2 to be flat.

According to various embodiments, the second structure 302 (for example, the housing) may include a second plate 321a (for example, the rear case), a rear plate 321b, a third plate 321c (for example, the front case), and a support member 321d. In an embodiment, the electronic device 300 may further include a support member (not shown). The support member may divide, for example, a gap or space in which a portion of the flexible display 303 is received and a space in which a printed circuit board 321d is disposed. The second plate 321a, for example, the rear case may be disposed in a direction opposite to the first surface F1 of the first plate 311a and may substantially provide the second structure 302 or the external shape of the electronic device 300. In an embodiment, the second structure 302 may include a first lateral wall 323a, a second lateral wall 323b extending from the second plate 321a and substantially perpendicular to the first lateral wall 323a, and a third later wall 323c extending from the second plate 321a, substantially perpendicular to the first lateral wall 323a, and parallel with the second lateral wall 323b. In an embodiment described in the drawing, the second lateral wall 323b and the third lateral wall 323c are exemplified to be formed as components separate from the second plate 321a and mounted or assembled to the second plate 321a, but may be integrally be formed with the second plate 321a. In an embodiment, the second structure 302 may receive a near field wireless communication antenna, a wireless charging antenna, or a magnetic secure transmission (MST) antenna in a space not overlapping the multi-joint hinge structure 313.

According to various embodiments, the rear plate 321b may be coupled to an outer surface of the second plate 321a, and according to an embodiment, may be integrally formed with the second plate 321a. In an embodiment, the second plate 321a may be formed of a metal or polymer material and the rear plate 321b may be formed of a material such as a metal, glass, a synthetic resin, or ceramic, and thus providing an ornament effect of the appearance of the electronic device 300. According to an embodiment, the second plate 321a and/or the rear plate 321b may be formed of a material through which light may at least partially penetrate. In an embodiment, in a state in which a portion (for example, the second space A2) of the flexible display 303 is received inside the second structure 302, at least a portion of the second region A2 may be disposed to correspond to at least a portion of the second plate 321a and/or the rear plate 321b, which is formed of a material enabling light penetration. For example, being received inside the second structure 302, the flexible display 303 may output a screen using at least a portion of the second region A2, and a user may recognize the output screen through the at least a portion having a light-penetrable material of the second plate 321a and/or the rear plate 321b.

According to various embodiments, the third plate 321c may be formed of a metal or polymer material, and coupled to the second plate 321a (for example, the rear case), the first lateral wall 323a, the second lateral wall 323b, and/or the third lateral wall 323c to form an inner space of the second structure 302. According to an embodiment, the third plate 321c may be referred to as a "front case", and the first structure 301, for example, the first plate 311a may slide in a state of substantially facing the third plate 321c. In an embodiment, the first lateral wall 323a may be formed by combining a first lateral wall part 323a-1 extending from the second plate 321a and a second lateral wall part 323a-2 formed at one side edge of the third plate 321c. In another embodiment, the first lateral wall part 323a-1 may be coupled to surround one side edge of the third plate 321c, that is, the second lateral wall part 323a-2, and in this case, the first lateral wall part 323a-1 itself may form the first lateral wall 323a.

According to various embodiments, a support member 321d (not shown) may be disposed between the second plate 321a and the third plate 321c, and may have a planar shape made of a metal or polymer material. The support member 321d may provide an electromagnetic shielding structure in the inner space of the second structure 302 or enhance the mechanical stiffness of the second structure 302. In an embodiment, when being received inside the second structure 302, a portion (for example, the second region A2) of the multi-joint hinge structure 313 and/or the flexible display 303 may be positioned in a space between the second plate 321a and the support member.

According to various embodiments, the printed circuit board 325 may be disposed in a space between the third plate 321c and the support member 321d. By way of example, by the support member 321d, the printed circuit board 325 may be received in a space in the second structure 302 separate from a space in which a portion of the multi-joint hinge structure 313 and/or the flexible display 303 is received. A processor, a memory, and/or an interface may be mounted to the printed circuit board 325. The processor may include, for example, one or more of a central processing device, an application processor, a graphic process device, an image signal processor, a sensor hub processor, or a communication processor.

According to various embodiments, a battery 327 may be disposed in a space between the third plate 321c and the support member 321d. In the same or similar manner as the printed circuit board 325, the battery 327 may be received in a space in the second structure 302 separate from a space in which a portion of the multi-joint hinge structure 313 and/or the flexible display 303 is received.

The memory may include, for example, a transitory memory or a non-transitory memory.

The interface may include, for example, a high definition multimedia interface (HDMI), a universal serial bus (USB) interface, a SD card interface, and/or an audio interface. The interface may electrically or physically connect, for example, the electronic device 300 to an external electronic device, and may include a USB connector, an SD card/MMC connector, or an audio connector.

According to various embodiments, the flexible display 303 is a flexible display based on an organic light-emitting diode and may be at least partially curved while generally maintaining a planar shape. In an embodiment, the first region A1 of the flexible display 303 may be mounted or attached to the first surface F1 of the first structure 301 and maintained in a substantially planar shape. The second region A2 may extend from the first region A1 and may be supported by or attached to the multi-joint hinge structure 313. By way of example, the second region A2 may be extended (or withdrawn to the outside) along a sliding direction of the first structure 301, received inside (or inserted inside) the second structure 302 together with the multi-joint hinge structure 313, and transformed to at least partially form a curved shape along the transformation of the multi-joint hinge structure 313.

According to various embodiments, the sliding of the first structure 301 on the second structure 302 may cause an area of the flexible display 303 visually exposed to the outside to be changed. The electronic device 300 (for example, the processor) may change a region of the flexible display 303 activated based on an area of the flexible display 303 visually exposed to the outside. For example, in the open state or in the middle of the closed state and the open state, the electronic device 300 may activate a region visually exposed to the outside of the second structure 302 among total area of the flexible display 303. In the closed state, the electronic device 300 may activate the first region A1 of the flexible display 303 and deactivate the second region A2. In the closed state, when there is no user input for a predetermined amount of time (for example, 30 seconds or two minutes), the electronic device 300 may deactivate whole region of the flexible display 303. In an embodiment, in the state in which the whole region of the flexible display 303 is deactivated, as occasion demands (for example, notification according to user setting, or notification of unanswered call or message arrival), the electronic device 300 may activate a region of the flexible display 303 to provide visual information through the portion formed of a light-penetrable material of the second plate 321a and/or the rear plate 321b.

According to various embodiments, in the open state (for example, the state shown in FIG. 3B), substantially the whole region (for example, the first region A1 and the second region A2) of the flexible display 303 may be visually exposed to the outside and the first region A1 and the second region A2 may be disposed to form a planar surface. In an embodiment, even in the open state, a portion (for example, one end portion) of the second region A2 may be disposed to correspond to the roller 351 and the portion of the second area A2 corresponding to the roller may be maintained in a curved shape. For example, in various embodiments disclosed herein, even when it is mentioned that "in the open state, the second region A2 is disposed to form a planar surface", a portion of the second region A2 may be maintained in a curved shape, and similarly, even when it is mentioned that "in the closed state, the multi-joint hinge structure 313 and/or the second region A2 is received inside the second structure 302", a portion of the multi-joint hinge structure 313 and/or the second region A2 may be positioned outside the second structure 302.

According to various embodiments, a guide member, for example, the roller 351 may be rotatably mounted to the second structure 302 at a position adjacent to one side edge of the second structure 302 (for example, the second plate 321a). For example, the roller 351 may be disposed adjacent to an edge (for example, the portion with reference numeral "IE") of the second plate 321a parallel with the first lateral wall 323a. Although reference numeral is not imparted, another lateral wall may extend from an edge of the second plate 321a adjacent to the roller 351, and the lateral wall adjacent to the roller 351 may be substantially parallel with the first lateral wall 323a. In an embodiment, the lateral wall of the second structure 302 adjacent to the roller 351 may be formed of a light-penetrable material, and a portion of the second area A2 in a state of being received in the second structure 302 may provide visual information through a portion of the second structure 302. "May be disposed adjacent to" may referred to as being disposed spaced apart within 5 mm. For example, the roller 351 may be disposed spaced apart within 5 mm from an edge (for example, with reference numeral "IE") of the second plate 321a parallel with the first lateral wall 323a.

According to various embodiments, the roller 351 may have one end rotatably coupled to the second lateral wall 323b and the other end rotatably coupled to the third lateral wall 323c. For example, the roller 351 may be mounted to the second structure 302, and may rotate around a rotation shaft R substantially perpendicular to a sliding direction (for example, arrow ① direction in FIG. 3A or FIG. 3B) of the first structure 301. The rotation shaft R may be disposed substantially parallel with the first lateral wall 323a and positioned far from the first lateral wall 323a, for example, at one side edge of the second plate 321a. In an embodiment, a space formed between the outer circumferential surface of the roller 351 and an inner surface of an edge of the second plate 321a may provide an entrance for the multi-joint hinge structure 313 or the flexible display 303 to enter the inside of the second structure 302.

However, without limitation to the above, the electronic device 300 may not include the roller 351 and may include a guide member and/or a guide structure for guiding the flexible display 303 instead of the roller 351. In an embodiment, the electronic device 300 may include, as the guide member and/or the guide structure, a member (not shown, hereinafter, referred to as a fixation member) having one end fixedly disposed on the second lateral wall 323b and the other end fixedly disposed on the third lateral wall 323c. The fixation member may include an outer circumferential surface having a predetermined curvature. The second region A2 of the flexible display 303 may be supported by the outer circumferential surface of the fixation member and guided to be withdrawn outside or inserted inside. Hereinafter, for the convenience of the description, the case that the electronic device 301 includes the roller 351 will be described.

According to various embodiments, when the flexible display 303 is transformed to a curved shape, the roller 351 may restrain excessive transformation of the flexible display 303 by maintaining a curvature of the flexible display 303 to a predetermined level. "The excessive transformation" may referred to as being deformed to have an excessively small curvature so that a pixel or a signal wire included in the flexible display 303 is damaged. By way of example, the flexible display 303 may be moved or transformed while being guided by the roller 351 and protected from being damaged due to excessive transformation. In an embodiment, the roller 351 may rotate while the multi-joint hinge structure 313 or the flexible display 303 is inserted into or withdrawn from the second structure 302. By way of example, the rotation of the roller 351 may retain or prevent friction between the multi-joint hinge structure 313 (or the flexible display 303) and the second structure 302 so as to facilitate an operation of inserting/withdrawing the multi-joint hinge structure 313 (or the flexible display 303) from the second structure 302.

According to various embodiments, the electronic device 300 may include multiple support sheets 353. For example, each of the support sheets 353 may be formed of a substance including a material having flexibility and a predetermined degree of elasticity, for example, an elastic body such as silicone or rubber, and mounted or attached to the roller 351 to be selectively wound around the roller 351 as the roller 351 rotates. In an embodiment, one or more of each of the support sheets 353 may be arranged (for example, four) along a direction of the rotation shaft R of the roller 351. For example, the multiple support sheets may be mounted to the roller 351 to have a predetermined interval with other support sheets and extended along a direction perpendicular to the rotation shaft R. In another embodiment, one support sheet may be mounted or attached to the roller 351 and the number, the size, or the shape of the support sheets 353 may be appropriately changed depending on an actually manufactured product. In an embodiment, the support sheets 353 may be wound around the roller 351 as the roller 351 rotates, or may deviate from the roller 351 to be spread out in flat shape between the flexible display 303 and the third plate 321c. In another embodiment, each of the support sheets 353 may be referred to as a "support belt", an "auxiliary belt", a "support film", or an "auxiliary film".

According to various embodiments, the electronic device 300 may further include a guide rail 355 or rails and/or an actuating member 357 or members. The guide rail(s) 355 may be mounted to the second structure 302, for example, third plate 321c and guide sliding of the first structure 301 (for example, the first plate 311a or a slide slate). The actuating member(s) 357 may include a spring or a spring module providing an elastic force in a direction to move opposite ends thereof away from each other, and one end of the actuating member(s) 357 may be rotatably supported by the second structure 302 and the other end thereof may be rotatably supported by the first structure 301.

According to various embodiments, when the first structure 301 slides, the opposite ends of the actuating member(s) 357 may be positioned closest to each other (hereinafter, the "closest point") at a position between the closed state and the open state. By way of example, in a section between the closest point and the closed state, the actuating member(s) 357 may provide an elastic force to the first structure 301 in a direction moving toward the closed state, and in a section between the closest point and the open state, the actuating member(s) 357 may provide an elastic force to the first structure 301 in a direction moving toward the open state. Hereinafter, various examples of the electronic device 300 described above with reference to FIG. 3A to FIG. 3C will be described.

Figure 4A:
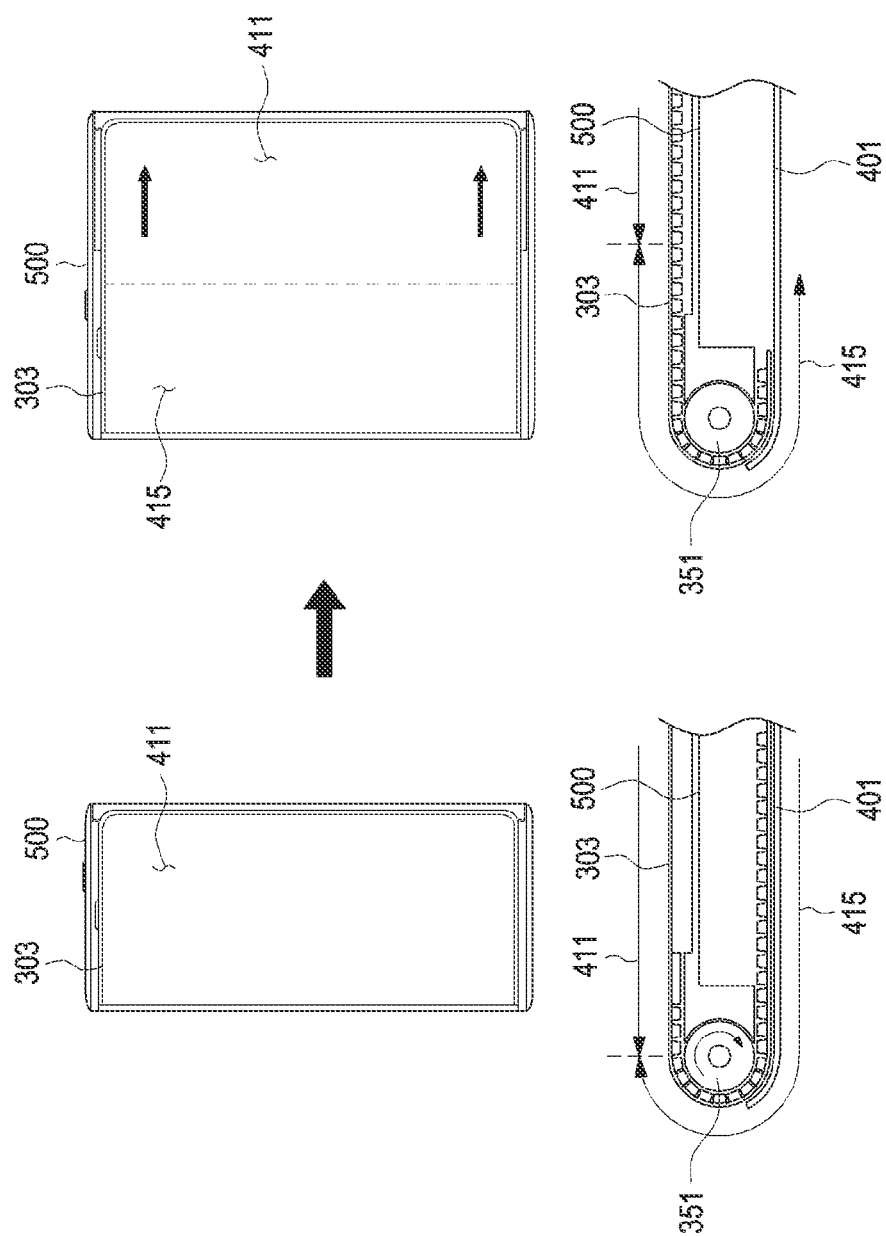
FIG. 4A is a view illustrating one example of a structure for enabling a flexible display of an electronic device according to various embodiments to be inserted or withdrawn.
Figure 4B:
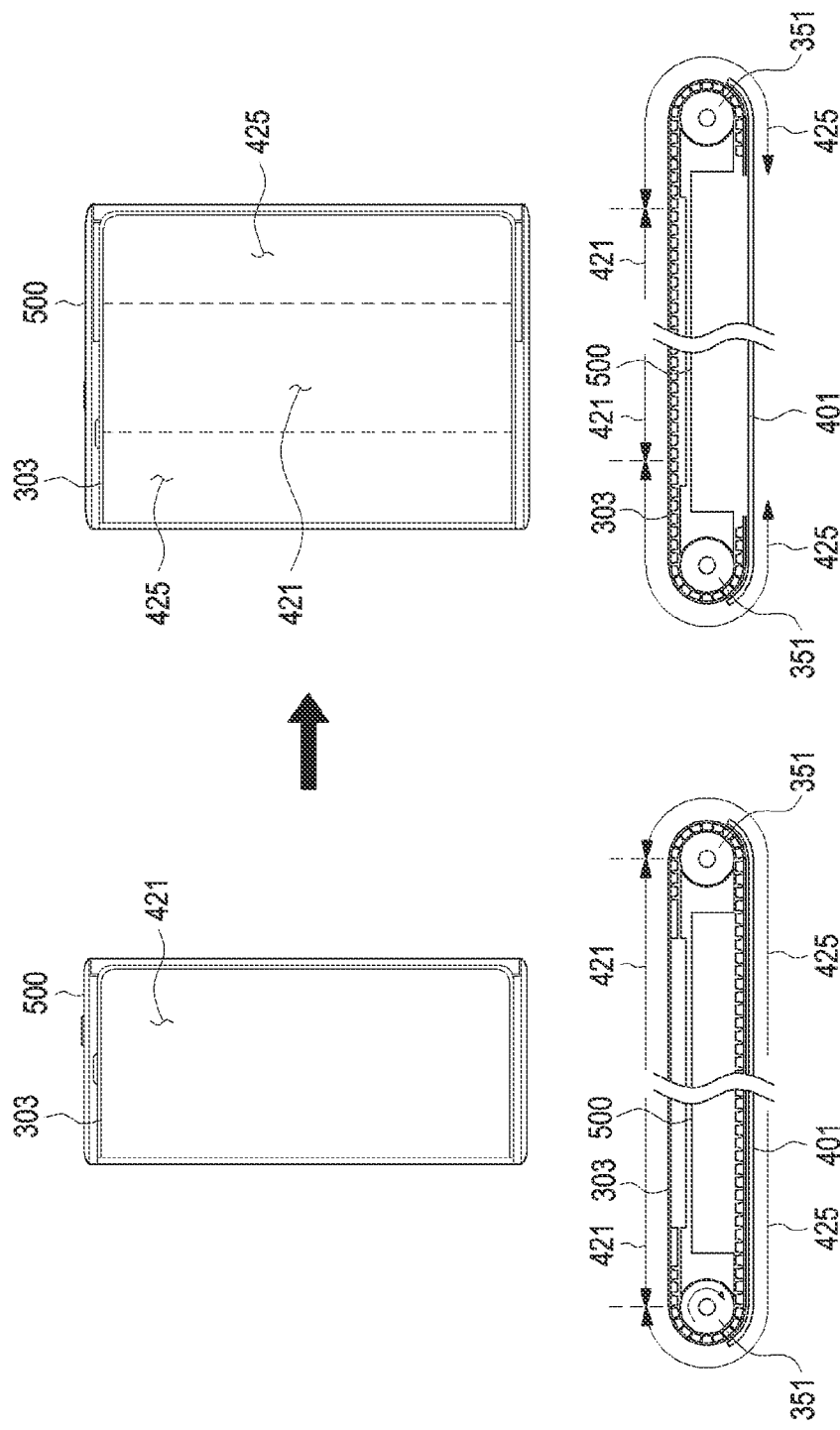
FIG. 4B is a view illustrating another example of a structure for enabling a flexible display of an electronic device to be inserted or withdrawn according to various embodiments.
Figure 4C:
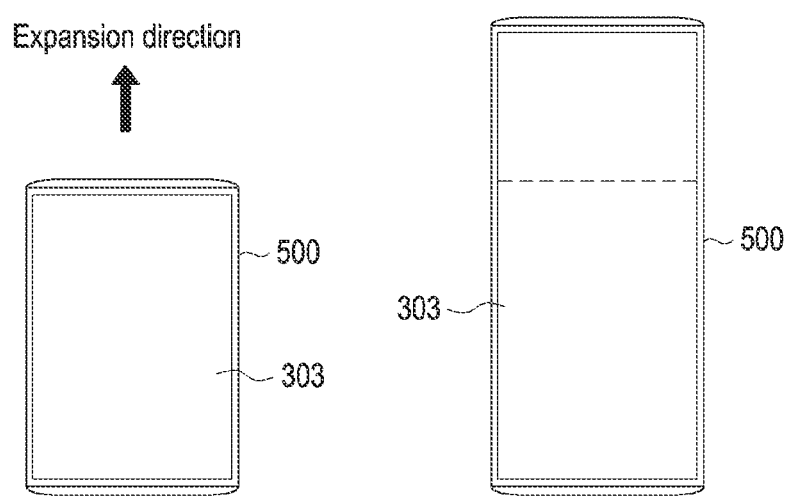
FIG. 4C is a view illustrating still another example of a structure for enabling a flexible display of an electronic device to be inserted or withdrawn according to various embodiments.

FIG. 4A is a view illustrating one example of a structure for enabling a flexible display 303 of an electronic device 300 to be inserted or withdrawn according to various embodiments. FIG. 4B is a view illustrating another example of a structure for enabling a flexible display 303 of an electronic device 300 to be inserted or withdrawn according to various embodiments. FIG. 4C is a view illustrating still another example of a structure for enabling a flexible display 303 of an electronic device 300 to be inserted or withdrawn according to various embodiments.

According to various embodiments, the electronic device 300 may include a structure for enabling the flexible display 303 to be inserted or withdrawn in at least one direction. For example, the electronic device 300 may include at least one roller (for example, the roller 351 shown in FIG. 3A to FIG. 3C) provided at a position corresponding at least one direction and at least one structure (for example, the first structure 301 shown in FIG. 3A to FIG. 3C) capable of reciprocating by means of rotation of at least one roller and having a portion (for example, the first region A1 shown in FIG. 3A to FIG. 3C) of the flexible display 303 disposed therein. The rotation of the roller 351, which will be described below, may be performed by a movement device (for example, the movement device 530 in FIG. 5). As a predetermined region (for example, the second region A2 shown in FIG. 1 to FIG. 3) of the flexible display 303 is received or exposed according to the reciprocating of the at least one structure, an area of the flexible display 303 may be expanded or reduced on at least one side portion thereof. Alternatively, without limitation to what is described, as described above, the structure of the electronic device 300 may include a fixation member, instead of the roller 351, for enabling the display 303 to be inserted or withdrawn.

Hereinafter, an example of the structure of the electronic device 300 will be described.

For example, the electronic device 300 may include a structure for causing the flexible display 303 to be inserted or withdrawn in a direction. For example, referring to FIG. 4A, the electronic device 300, as shown with reference to FIG. 3A to FIG. 3C, may use the roller 351 provided on one side (for example, left side or right side (not shown)) to cause the first structure 301 to reciprocate (for example, moving in the other direction or moving in one direction), and thereby the flexible display 303 may be withdrawn in the other direction (for example, right side) or inserted in one direction (for example, left side). Accordingly, the flexible display may be inserted or withdrawn in a transverse direction. Referring to FIG. 4C, as the first structure 301 reciprocates (for example, moving in an upper direction or moving in a lower direction) using the roller 351 provided on one side (for example, lower side or upper side), the flexible display 303 may be withdrawn in the other direction (for example, upper side) or inserted in one direction (for example, lower side). Accordingly, the flexible display may be inserted or withdrawn in a longitudinal direction. As the flexible display 303 is withdrawn, at least a portion of a received region 415 and an exposed region 411 before the flexible display 303 is withdrawn may be exposed to the outside (for example, the outside not covered by the back cover 401 and/or the second structure 102).

For another example, the electronic device 300 may include a structure for causing the flexible display 303 to be inserted or withdrawn in at least two directions. Referring to FIG. 4B, the electronic device 300 may use a roller provided on one side and the rollers 351 provided on the other side to cause the structures having the flexible display 303 seated therein to reciprocate (for example, moving in the other direction or moving in one direction), and thus the flexible display 303 may be expanded in one direction from one side and expanded in the other direction from the other side. As the flexible display 303 is withdrawn, at least a portion of a received region 425 and an exposed region 421 before the flexible display 303 is withdrawn may be exposed to the outside (for example, the outside not covered by the back cover 401 and/or the second structure 102).

Without limitation to what is described above, the structure (for example, the first structure 301 and the roller 351) for enabling the area of the flexible display 303 to be expanded or reduced may be disposed multiple portions of the electronic device 300 and the flexible display 303 may be expanded or reduced in directions corresponding to the multiple portions.

In addition to the described examples, control operations of the electronic device 300 to be described below may be applied to various electronic devices having various types of structures which enables a display to be inserted thereto and/or withdrawn therefrom, as well. Hereinafter, an example of configuration of the first electronic device 100 (for example, the source device) (hereinafter, the electronic device 500) according to various embodiments will be described. Since the description of the electronic device 2001 in FIG. 20 to be described later may be applied to the description of the first electronic device 100 (for example, the source device), an overlapping description will be omitted.

Figure 5:
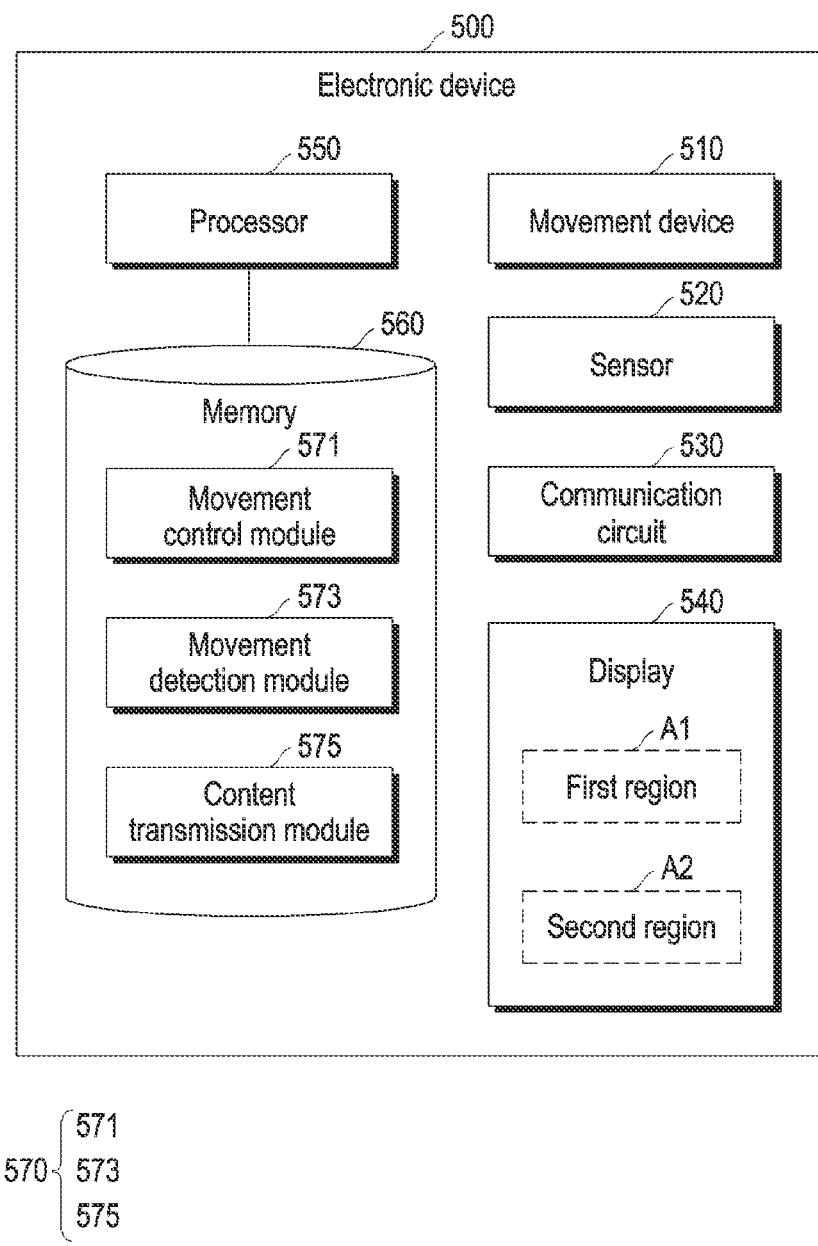
FIG. 5 is a block diagram illustrating one example of a configuration of a first electronic device (for example, a source device) according to various embodiments.

FIG. 5 is a block diagram illustrating one example of a configuration of an electronic device 500 according to various embodiments. According to various embodiments, FIG. 5 will be further described with reference to FIG. 6 and FIG. 7.

Figure 6:
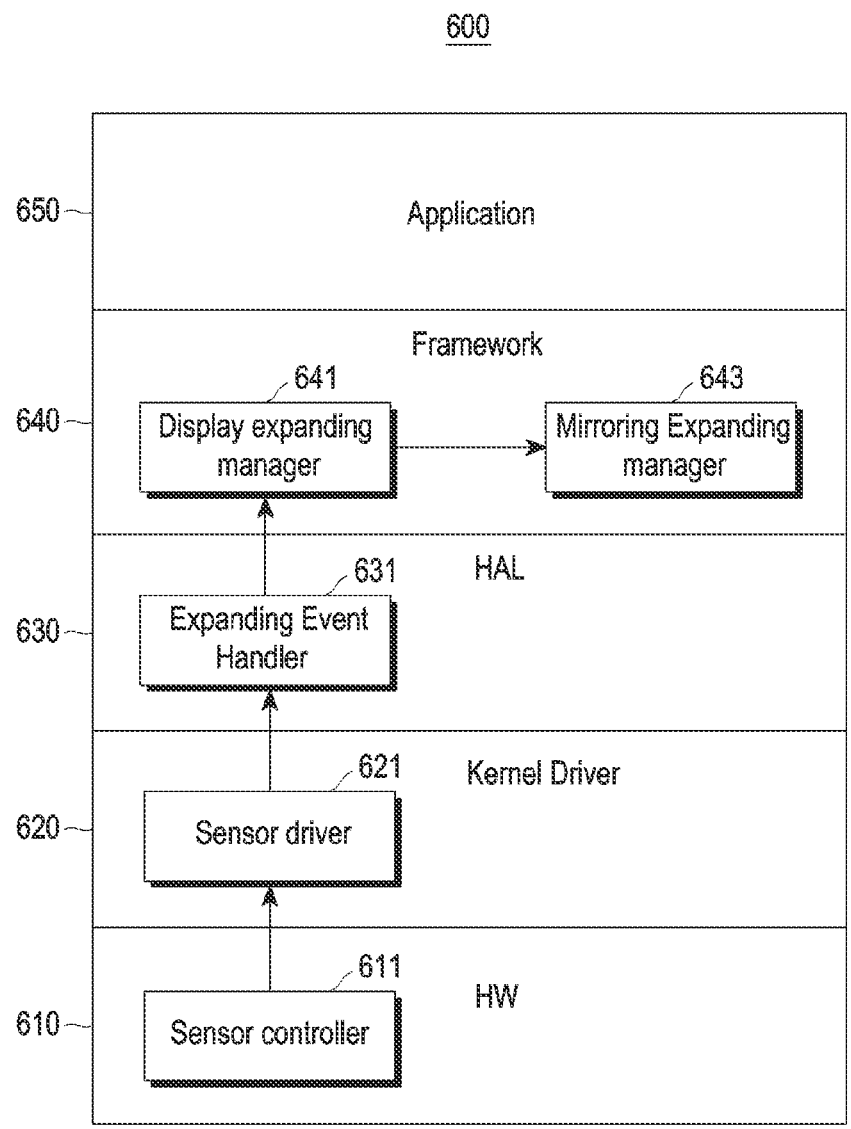
FIG. 6 is a view illustrating an example of a configuration of hardware and software of a first electronic device (hereinafter, an electronic device) according to various embodiments.
Figure 7:
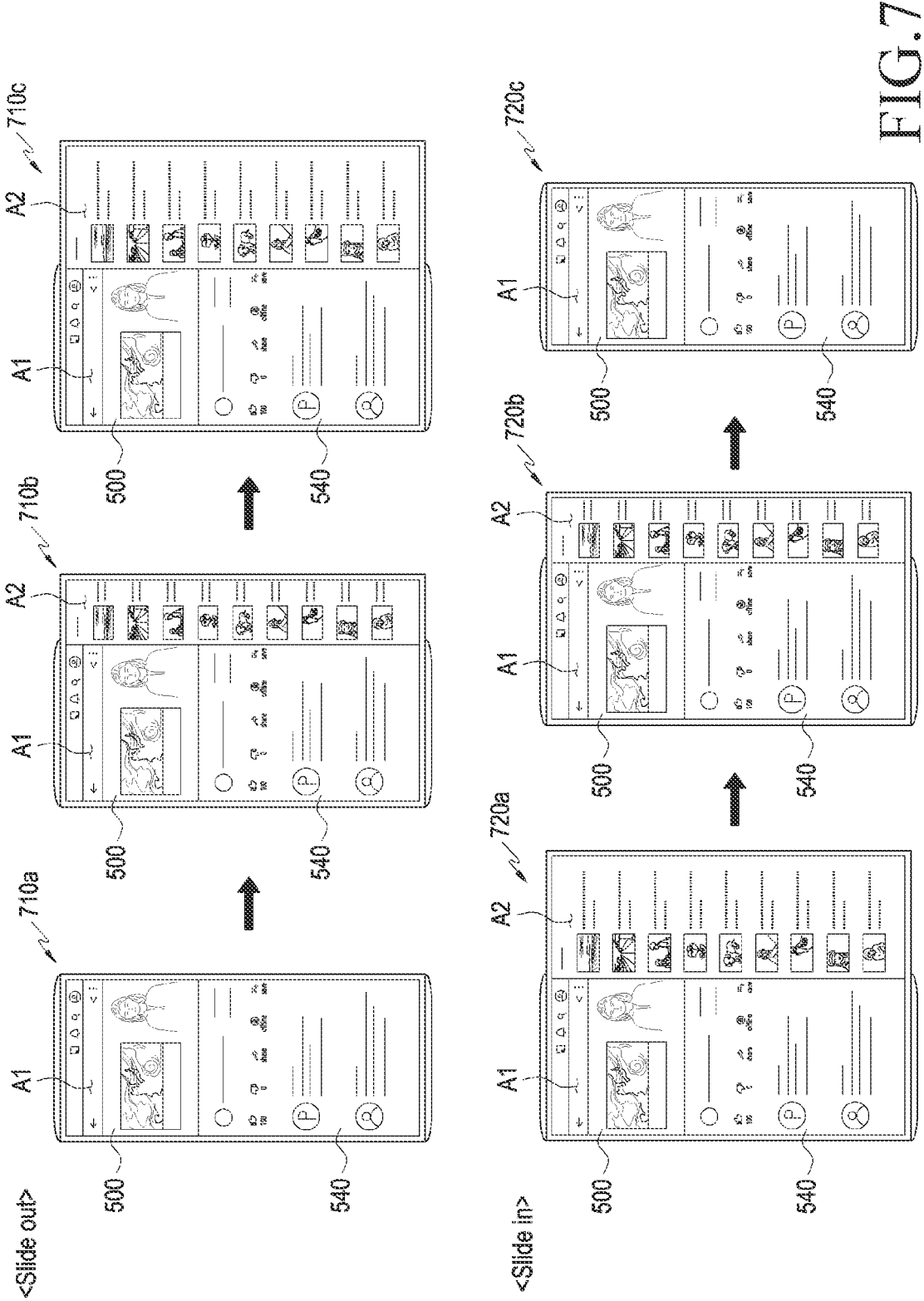
FIG. 7 is a view illustrating an example of a content displayed on a display according to sliding in and/or sliding out according to various embodiments.

FIG. 6 is a view illustrating an example of a configuration of hardware and software of an electronic device 500 according to various embodiments. FIG. 7 is a view illustrating an example of a content displayed on a display according to slide in and/or slide out according to various embodiments.

According to various embodiments, the electronic device 500 may include, as shown in FIG. 5, a movement device (e.g., including a motor) 510, a sensor 520, a communication circuit 530, a display 540 (for example, the flexible display 303 in FIG. 3 to FIG. 4), a processor (e.g., including processing circuitry) 550, and a memory 560 including a movement control module (e.g., including executable program instructions) 571, a movement detection module (e.g., including executable program instructions) 573, and a content transmission module (e.g., including executable program instructions) 575. Without limitation to the configuration shown in FIG. 5, the electronic device 500 may be implemented to include more components or fewer components. For example, the electronic device 500 may be implemented to include components of an electronic device 2001 to be described below with reference to FIG. 20.

An example of the movement device 510 will be described below.

According to various embodiments, the movement device 510 may include devices for sliding the display 540 (or the first structure 301 or the first plate 301a). For example, the movement device 510 may include a motor for rotating the roller 351 described above in one direction (for example, a clockwise direction or a counterclockwise direction). The movement device 510 may include, in addition to the motor, various devices for rotating roller 351 to slide the display 540 (or the first structure 301 or the first plate 301a). Without limitation to what is described above, the electronic device may include, instead of the roller 351, a guide member and/or a guide structure (for example, a fixation member) for guiding the display 540.

According to various embodiments without limitation to what is described above, as described above, the display 540 may be manually slid by a user (for example, pulling the display 540 (or the first structure 301 or the first plate 301a) in a first direction (for example, direction ①) or in a second direction opposite to the first direction). In this case, the movement device 501 may not be implemented.

Hereinafter, an example of the sensor 520 will be described. The sensor 520 may include at least one sensor.

According to various embodiments, the sensor 520 may sense, when the display 540 (or the first structure 301 or the first plate 311a) slides, the slide of the display 540 and return an electrical value (for example, a current value and/or a voltage value) according to a state of the sliding. The processor 550 to be described below may obtain the electrical value and identify a state related to the sliding. For example, the state related to the sliding may include at least one of start of end of sliding of the display 540, a state related to the electronic device 500 according to sliding (for example, the open state, the closed state, or the intermediate state), or a distance of sliding. As an example, the sensor 520 may be implemented as a sensor (for example, an image sensor or an optical sensor) for detecting a predetermined content (for example, RGB color) displayed on a partial region of a received portion of the display 540, identify, when the display 540 moves, a change of a detected state of the predetermined content (for example, the content is moved or the content is not displayed), and return an electrical value indicating the start of the sliding. Here, when the sliding ends, the electronic device 500 may display a predetermined content on a partial region of a received portion of the display 540 and the second 520 may detect a displayed content again and return an electrical value indicating the end of sliding. As another example, the sensor 520 may include a sensor for detecting an electromagnet configured to attach when the sliding of the display 540 starts or ends, and return an electrical value indicating the start or end when the sliding starts or ends. As another example, the sensor 520 may be implemented as a sensor (for example, a pressure sensor, a resistance sensor, and the like) for detecting a dielectric configured to move during the sliding of the display 540, and return an electrical value indicating a sliding distance, based on a moving distance of the dielectric. Without limitation to the examples described above, instead of receiving a value from the sensor 520, the electronic device 500 may identify a state related to the sliding of the display 540 described above, based on a signal configured to control a motor for rotating a roller (for example, 351) of a movement control module 571 to be described below.

According to various embodiments, the sensor 520 may include types of sensors for obtaining various information other than a state (for example, a grip state or holding state) of the electronic device 500. For example, the sensor 520 may include a grip sensor. The electronic device 500 may identify whether the electronic device 500 is gripped using the grip sensor. For example, the sensor 520 may include an acceleration sensor (for example, a six-axis sensor). The electronic device 500 may detect an arranged state of the electronic device 500 using the acceleration sensor, and detect whether the electronic device 500 is disposed on an object according to the arrangement state.

Hereinafter, an example of the display 540 will be described below. The description overlapping the description about the flexible display 303 described above with reference to FIG. 3 to FIG. 4 and the description about a display module 2060 to be described below with reference to FIG. 20 will be omitted.

According to various embodiments, the display 540 may display at least one content (for example, an application execution screen and various types of media contents such as videos and images). As shown in FIG. 7, an area of the display 540 exposed to the outside of the electronic device 510 may be changed according to the withdrawal (for example, slide-out) or insertion (for example, slide-in) of the display 540. Accordingly, a first content 710a or 720a may be displayed on a first region A1 of the display 540, and when the display 540 is withdrawn or inserted, a second content 710b and 720b and a third content 710c and 720c may be displayed on the first region A1 and at least a portion of a second region A2. In other words, the content displayed on the display having a changed area may be distinguished by an ordinal number (for example, a first and a second). The first content and the second content respectively displayed on the display 540 before and after the withdrawal of the display 540 may correspond to each other or may be different from each other. In an embodiment, an application installed and/or stored in the electronic device 500 may be implemented to display an execution screen corresponding to an area (or a parameter to be described below) of the display 540. For example, the execution screen of the predetermined application may be changed to have an area corresponding to the area of the display 540. As an example, the predetermined application may be configured to display a first execution screen in a maximally withdrawn state and a second execution screen in a maximally inserted state, in a state (or a state for providing a function) of the display 540. Referring to FIG. 7, a graphic user interface included in the first execution screen may be different from a graphic user interface included in the second execution screen. As an example, in a case of a video-providing application, an execution screen including a screen providing a video and a comment list screen is provided in a state that the display 540 is inserted, and an execution screen including a screen for providing a video list as well as a screen providing a video and a comment list screen is provided in a state that the display 540 is withdrawn. In an embodiment, a size of a video displayed on the display 540 may be re-sized to correspond to an area of the display 540 according to an area change of the display 540. Alternatively, not being limited to what is described above, even when the area of the display 540 is changed, the area of the video may be maintained to be displayed on the display 540. In this case, an execution screen of a new application may be displayed on a withdrawn region of the display 540. As described above, the application implemented to provide an execution screen corresponding to an area of the display 540 may include information (for example, resizable information) indicating that the corresponding function (for example, providing an execution screen corresponding to an area) is available.

Hereinafter, an example of the communication circuit 530 will be described.

According to various embodiments, the communication circuit 530 may configure communication connection with an external electronic device (for example, the second electronic device 130 (for example, the sink device)), and may transmit information and/or data to the second electronic device 130 (for example, the sink device), or receive information and/or data from the second electronic device 130 (for example, the sink device). For example, the communication circuit 530, as described above, may be a communication circuit (or communication module) implemented to support a Wi-Fi P2P connectivity scheme and a TDLS connectivity scheme, with no limitation thereto, and may be implemented to support various connectivity schemes such as a communication module to be described with reference to FIG. 20, and thus an overlapping description will be omitted.

Hereinafter, an example of the processor 550 will be described. The processor 250 may include various processing circuitry including, for example, and without limitation, at least one of an application processor (AP), a central processing unit (CPU), a graphic processing unit (GPU), a display processing unit (DPU), a neural processing unit (NPU), or the like. An operation of the processor 550 to be described below may be performed according to execution of modules 570 (for example, a movement control module, a movement detection module, and a content transmission module 575) stored in the memory 560. For example, at least a portion of the modules 570 (for example, the movement control module 571, the movement detection module 573, and the content transmission module 575) may be implemented (for example, executed) by software, a firmware, or a combination of at least two thereof (e.g., executable program instructions). For example, the modules may be implemented as a form of an application, a program, a computer code, instructions, a routine, or a process which are executed by the processor 550. Accordingly, when the modules 570 are executed by the processor 550, the modules 570 may cause the processor 550 to perform operations related to the module (or functions provided by the module). Therefore, the description that a predetermined module performs an operation may be understood as that the processor 550 performs the corresponding operation according to the predetermined module being executed. Alternatively, the modules 570 may be implemented as a portion of a predetermined application. With no limitation to what is described and/or shown above, each module may be implemented as hardware (for example, a processor and a control circuit) separate from the processor 550.

Hereinafter, an example of an operation based on each of modules 570 (for example, the movement control module 571, the movement detection module 573, and the content transmission module 575) executed by the processor 550 according to various embodiments will be described.

Firstly, the movement control module 571 will be described.

According to various embodiments, the movement device 571 may control the display 540 (or the first structure 301 or the first plate 311a) of the electronic device 500 to slide. For example, the movement control module 571 may control the movement device 510 described above (for example, a motor) to be driven and the roller 351 to rotate in a direction so as to cause the display 540 to slide. For example, when the movement control module 571 causes the roller 351 to rotate in a first direction (for example, a counterclockwise direction), the display 540 may slide-out, when the roller 351 is caused to rotate in a second direction (for example, a clockwise direction), the display 540 may slide-in, and when the roller 351 is caused to rotate in the first direction and then rotate in the second direction, the display 540 may slide-out and then slide-in. The distance of the sliding (for example, sliding-out or sliding-in) of the display 540 may be limited (for example, 40 mm) according to control of the movement control module 571. For example, the maximum distance of sliding-out is a distance by which the first structure 301 is maximally exposed to the outside through the second structure 302 from the state of being received in the second structure 302, and may be determined by at least one of the width of the first structure 301 or the width of the second structure 302. For another example, the maximum distance of sliding-in is a distance by which the first structure 301 is received inside the second structure 102 from the state in which the first structure 301 is maximally exposed to the outside through the second structure 302, and may be determined by at least one of the width of the first structure 301 or the width of the second structure 302 as well. By way of example, as the at least one of the width of the first structure 301 or the width of the second structure 302 increases, the first structure 301 may slide a longer distance while being guided (or supported) by an inner bottom surface of the second structure 302 when the first structure 301 slides (for example, slide-out or slide-in).

According to various embodiment, the movement control module 571 may control the display 540 to be slid, based on occurrence of a predetermined event. For example, the predetermined event may include identifying execution and/or running of the specified application and a user input (for example, identifying selection of an icon, and identifying physical pressing of a key) for causing the sliding of the display 540.

According to various embodiments, the movement control module 571 may control the display 540 (or the first structure 301 or the first plate 311a) to slide (for example, slide-out and slide-in) at a specified speed. For example, the movement control module 571 may control the movement device 510 (for example, the motor) to move the display 540 at a speed (for example, 40 mm/sec) for moving the maximum distance (for example, 40 mm) for a preconfigured time (for example, 1 sec). The speed is not limited thereto, and may be configured, reconfigured, and/or changed to various values. For another example, the movement control module 571 may control the display 540 to slide at a speed determined based on various information (for example, external illuminance). By way of example, the movement control module 571 may control the display 540 to move at a lower speed when the external illuminance is low.

However, the disclosure is not limited to what is described, as previously described, the display 540 may be slid by being pulled by a user. Even in this case, the control operation of the electronic device 500 disclosed herein may be applied. For example, while the display 540 of the electronic device 500 is being pulled by a user, an operation of recognizing a hovering value in a specified region of the display 540 and limiting the movement of the display 540 based on the recognized value (for example, an operation of limiting the movement of the first structure 101 to prevent and/or reduce the display from being pulled) may be performed.

Hereinafter, the movement detection module 573 will be described.

According to various embodiments, the movement detection module 573 may detect, based on a value obtained by the sensor 520 described above, a sliding state (for example, whether sliding starts or whether sliding ends) or a sliding distance of the display 540 (or the first structure 301 or the first plate 311a). In addition, the movement detection module 573 may recognize a parameter related to a region of the display 540 and changed according to the sliding of the display 540. In an embodiment, the parameter may include an area (or a length of a region in a direction (for example, the direction in which the display is inserted or withdrawn (for example, the horizontal direction or X direction))) of a region of the display 540 exposed to the outside. For example, the movement detection module 573 may identify the sliding distance of the display 540 and calculate an area corresponding to the identified sliding distance. The movement detection module 573 may add the calculated area to an area before the display 540 slides so as to identify an area of the currently exposed area of the display 540. In an embodiment, the parameter may include a rate (for example, an expansion rate) of an exposed region and a received region of the display 540. For example, the movement detection module 573 may identify a sliding distance of the display 540, and compare the identified sliding distance and the maximum sliding distance of the display 540 to identify a rate of the exposed region and the received region of the display 540. In an embodiment, the parameter may include a currently withdrawn distance (or inserted distance) of the display 540. For example, the movement detection module 573 may identify the sliding distance of the display 540 to identify a withdrawn distance of the display 540. A scan rate control module 565 may determine, based on the parameter related to the identified region of the display 540, a scan rate to be configured on the region of the display 540, and the description thereof will be given below.

Hereinafter, an example of the content transmission module 575 will be described.

Figure 10:
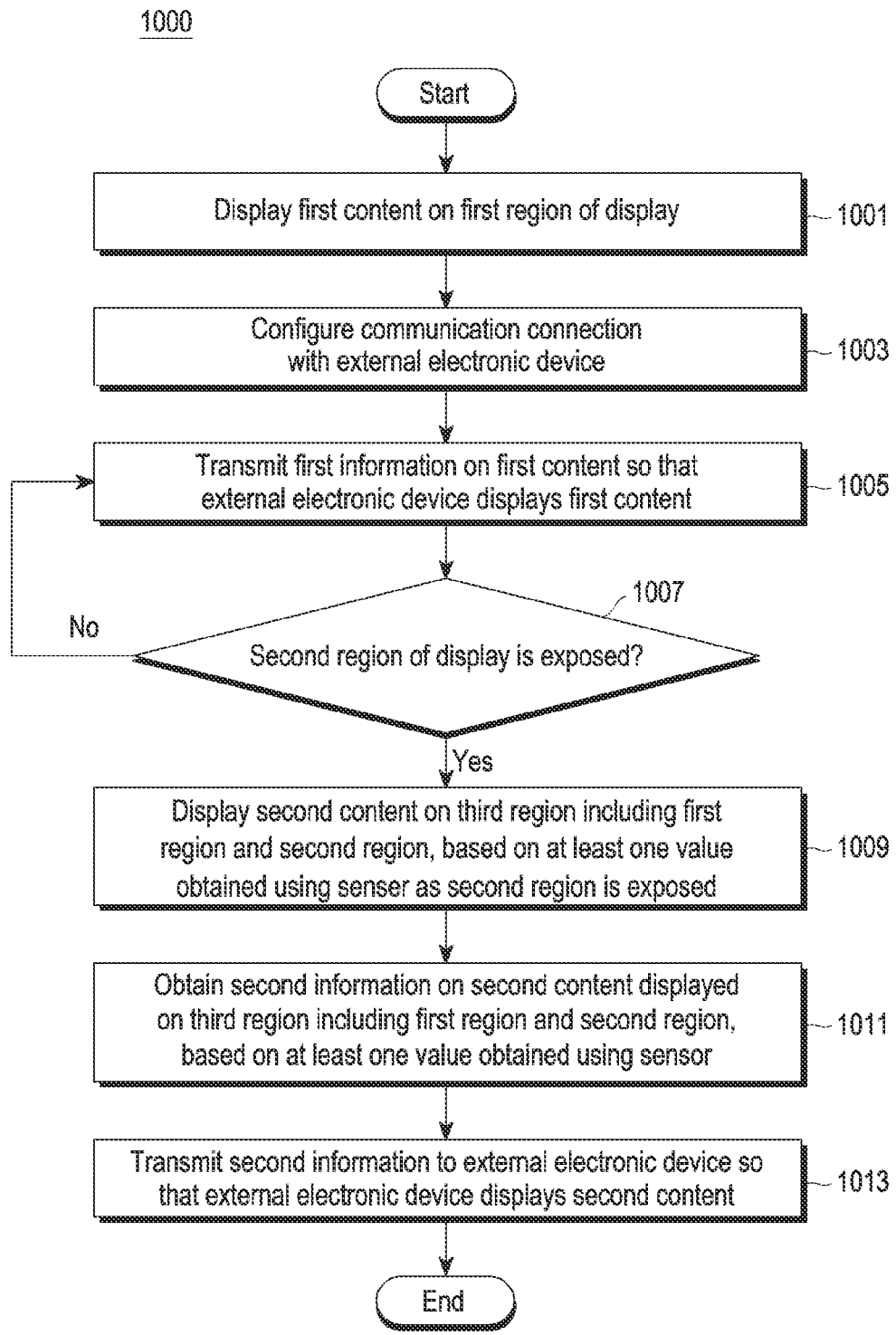
FIG. 10 is a flowchart illustrating an example of an operation of an electronic device according to various embodiments.
Figure 11A:
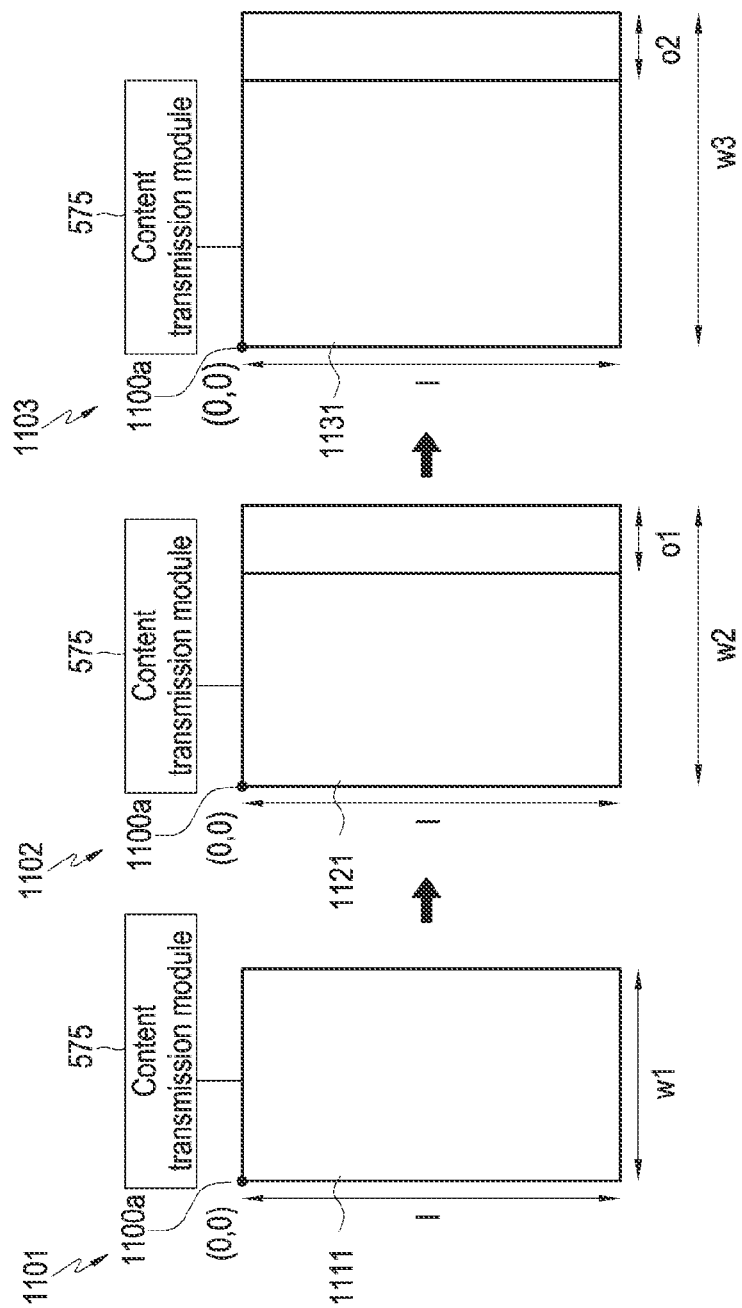
FIG. 11A is a view illustrating an example of an operation of updating information on a region of a display to be wirelessly displayed of an electronic device according to various embodiments.
Figure 11B:
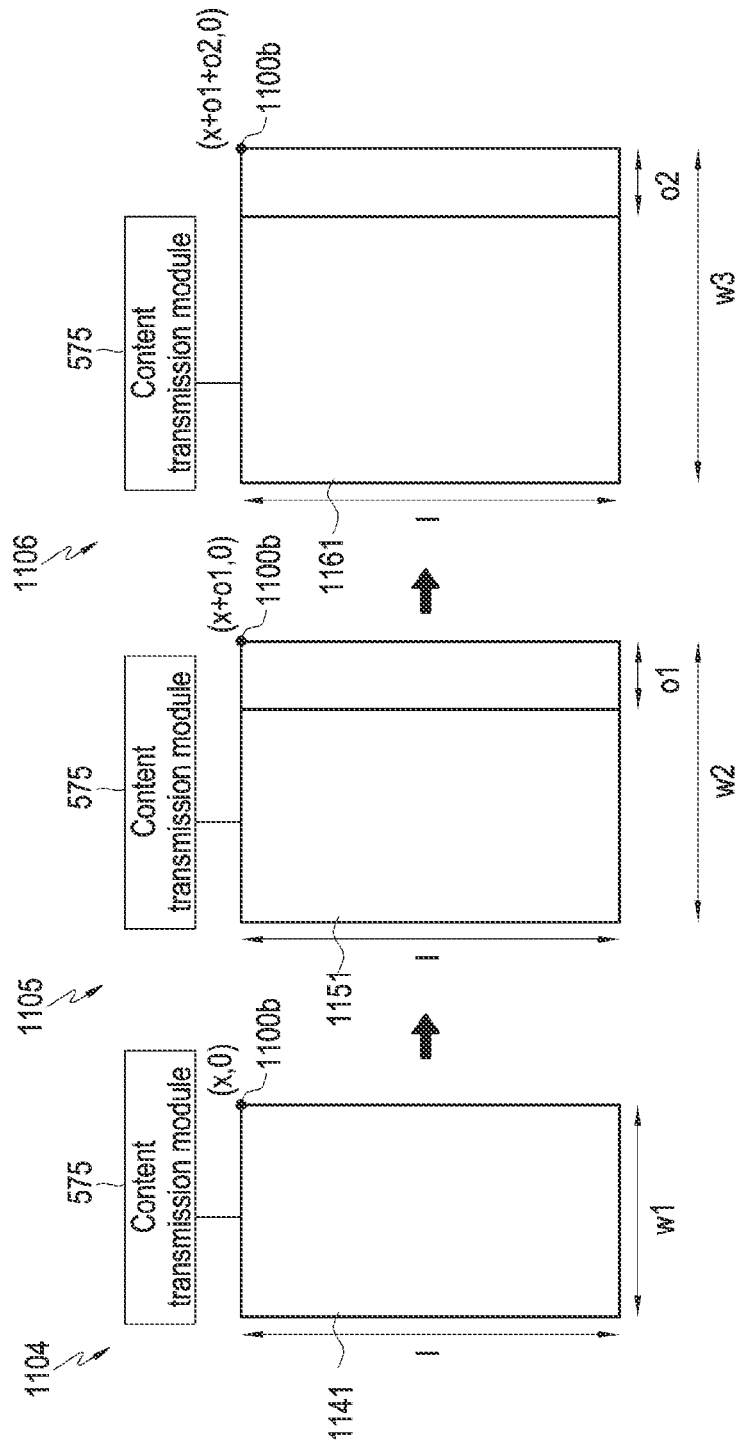
FIG. 11B is a view illustrating another example of an operation of updating information on a region of a display to be wirelessly displayed of an electronic device according to various embodiments.

According to various embodiments, the content transmission module 575 may identify a region to be wirelessly displayed and process a content displayed on the region to be wirelessly displayed into video data so as to transmit the same to an external electronic device (for example, the second electronic device 130 (for example, the sink device)). For example, the content transmission module 575 may update information (or region information) (for example, reference coordinates, width, and length) related to a region according to the withdrawal of the display 540 as shown in FIGS. 10, 11A and 11B. For another example, the content transmission module 575 may obtain a content displayed on the updated region and encode the obtained content to produce video data. For another example, the content transmission module 575 may adjust a value of a parameter related wireless displaying (for example, a parameter related to video quality and a parameter related to video transmission) according to the withdrawal of the display 540. The operation of the content transmission module 575 will be described in detail below.

Hereinafter, referring to FIG. 6, an example (600) of software of the electronic device 500 implemented to include components described above modules (for example, the movement control module 571, the movement detection module 573, and the content transmission module 575) will be described.

According to various embodiments, referring to FIG. 6, the electronic device may include a hardware layer (HW) 610 including a controller (e.g., sensor controller 611) for controlling various hardware devices (for example, the display 540, at least one sensor 520), a kernel driver layer 620 including a driver for driving various hardware devices (for example, the display 540, and sensor 520), a hardware abstraction layer 630 including programs (for example, a input dispatcher and an event hub) for collecting and analyzing data received through the kernel driver layer, a framework 640 including various managers, and an application layer (Apps) 650 in which various applications are executed. Without limitation to what is shown and/or described, the software of the electronic device 500 may be implemented as a well-known technique, and thus an overlapping description will be omitted.

According to various embodiments, the movement detection module 573 may be implemented as an expanding event handler 631 implemented in the hardware abstraction layer 630 and a display expanding manager 641 implemented in the framework layer 640. The expanding event handler 631 may obtain a value sensed the sensor (for example, 520) which is returned from a sensor controller 611 through a sensor driver 621 of the kernel driver layer 620, and transfer information related to the value to the display expanding manager 641. The display expanding manager 641 may obtain a parameter related to an area of the display 540, based on the received information, and provide the same to other components.

According to various embodiments, the content transmission module 643 may be implemented as a mirroring expanding manager 643 implemented on the framework layer 640. The mirroring expanding manager 643 may update a region to be wirelessly displayed, based on the parameter related to the area of the display 540 received from the display expanding manager 641, obtain a content of the updated region, and produce video data from the same. In addition, the mirroring expanding manager 643 may adjust a value of a parameter related to wireless displaying, based on the received parameter related to the area of the display 540.

Hereinafter, an example of an operation of an electronic device 500 according to various embodiments will be described.

According to various embodiments, when a content displayed on the display 540 is changed as a first housing moves (for example, slide-out or slide-in) while performing an operation for causing an external electronic device 800 (for example, the second electronic device 130 in FIG. 1 to FIG. 2) to display the content, the electronic device 500 (for example, the first electronic device 100 in FIG. 1 to FIG. 2) may transmit information on the changed content to the external electronic device 800 (for example, the second electronic device 130 in FIG. 1 to FIG. 2) so as to cause the external electronic device 800 (for example, the second electronic device 130 in FIG. 1 to FIG. 2) to display the changed content.

Figure 8:
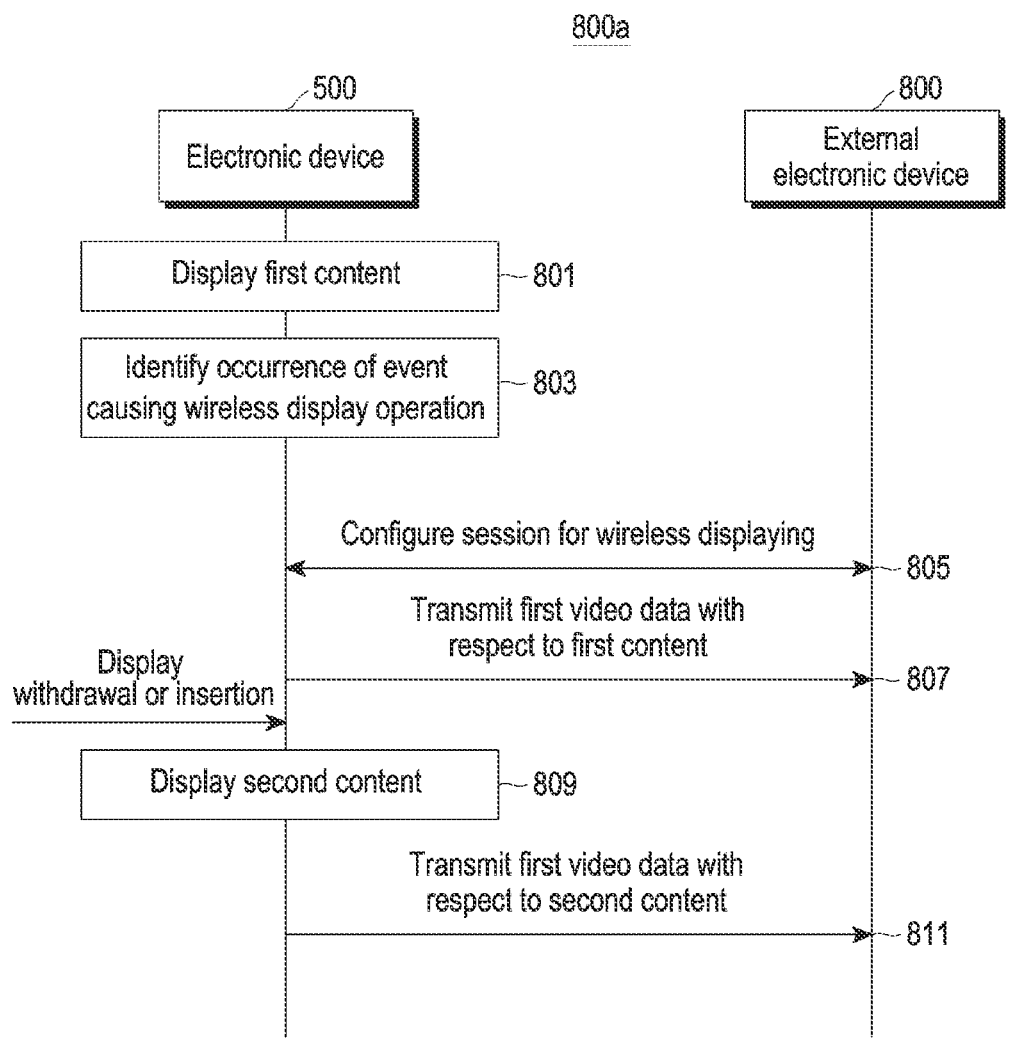
FIG. 8 is a flowchart illustrating an example of an operation of a first electronic device and a second electronic device according to various embodiments.

FIG. 8 is a flowchart 800*a* illustrating an example of an operation of an electronic device 500 (for example, the first electronic device 100 in FIG. 1 to FIG. 2) and an external electronic device 800 (for example, the second electronic device 130 in FIG. 1 to FIG. 2) according to various embodiments. According to various embodiments, the operations shown in FIG. 8 are not limited to the described order and may be performed in various orders. In addition, according to various embodiments, more operations or the fewer operations than the operations shown in FIG. 6 may be performed. Hereinafter, FIG. 8 will be described with reference to FIG. 9A and FIG. 9B.

Figure 9A:
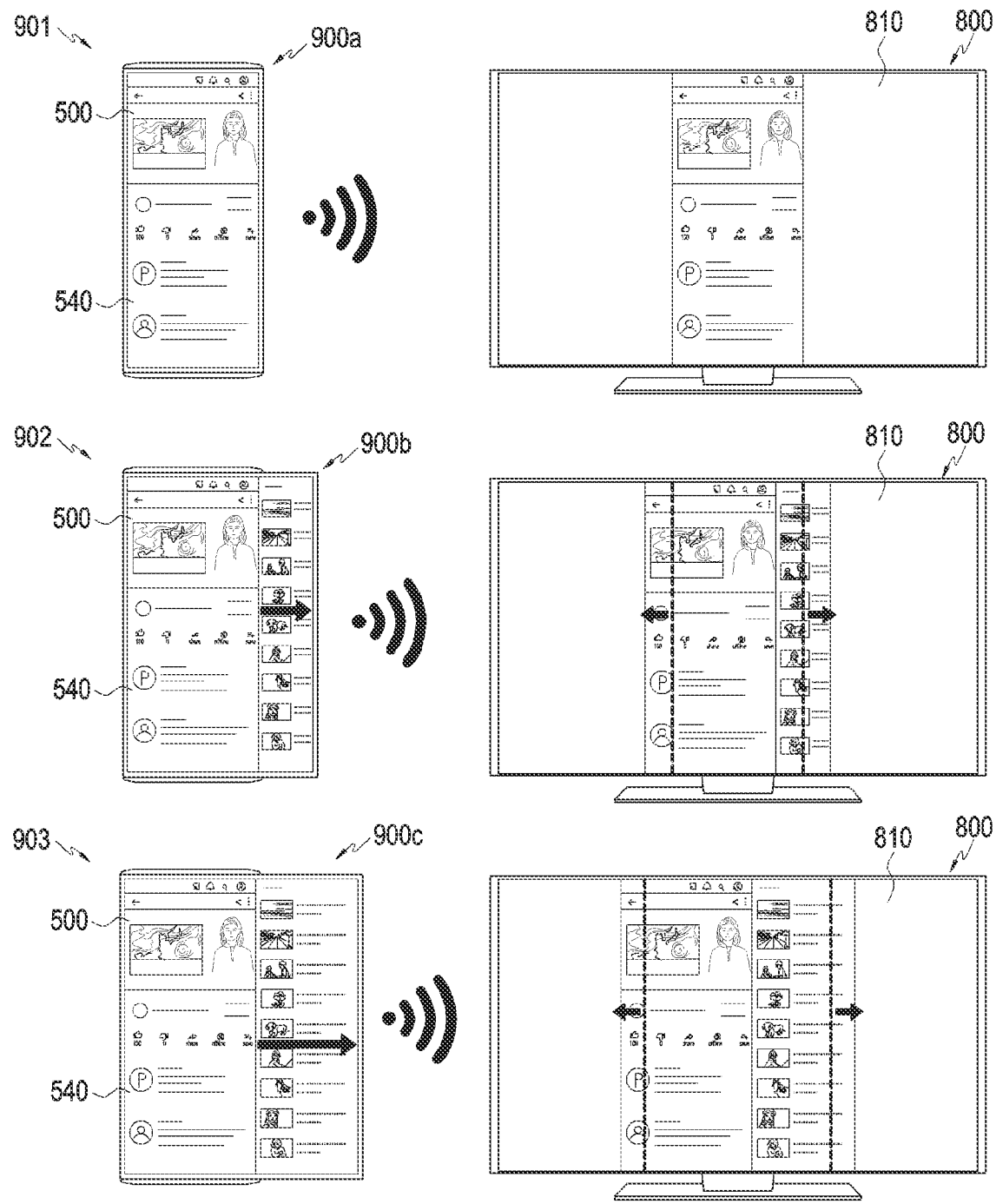
FIG. 9A is a view illustrating an example of a wireless display operation of a first electronic device and a second electronic device when a display is inserted or withdrawn in a transverse direction according to various embodiments.
Figure 9B:
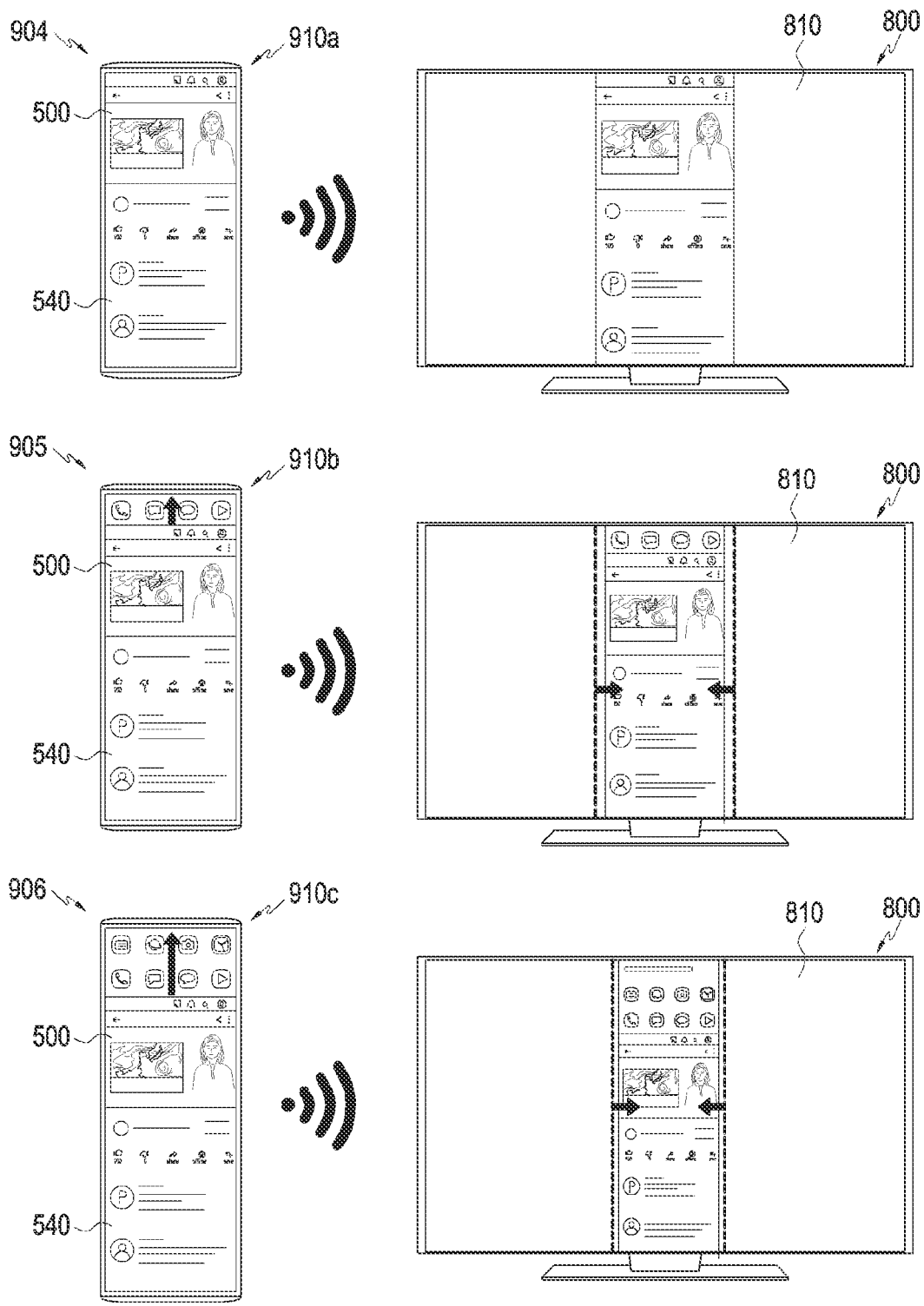
FIG. 9B is a view illustrating an example of a wireless display operation of a first electronic device and a second electronic device when a display is inserted or withdrawn in a longitudinal direction according to various embodiments.

FIG. 9A is a view illustrating a wireless display operation of an electronic device 500 (for example, the first electronic device 100 in FIG. 1 to FIG. 2) and an external electronic device 800 (for example, the second electronic device 130 in FIG. 1 to FIG. 2) when a display 540 is inserted or withdrawn in a transverse direction according to various embodiments. FIG. 9B is a view illustrating a wireless display operation of an electronic device 500 (for example, the first electronic device 100 in FIG. 1 to FIG. 2) and an external electronic device 800 (for example, the second electronic device 130 in FIG. 1 to FIG. 2) when a display 540 is inserted or withdrawn in a longitudinal direction according to various embodiments.

According to various embodiments, the electronic device 500 (for example, the first electronic device 100 in FIG. 1 to FIG. 2) may display a first content 900*a* and 910*a* in operation 801 and may identify an occurrence of an event causing a wireless display operation in operation 803. For example, the electronic device 500 (for example, the first electronic device 100 in FIG. 1 to FIG. 2) in which the display 540 is implemented to be capable of being inserted or withdrawn in the transverse direction as shown in 901 in FIG. 9A (for example, the electronic device in FIG. 4A) and the electronic device 500 (for example, the first electronic device 100 in FIG. 1 to FIG. 2) in which the display 540 is implemented to be capable of being inserted or withdrawn in the longitudinal direction as shown in 904 in FIG. 9B (for example, the electronic device in FIG. 4B) may display the first content 900*a* and 910*a* in a state in which the display 540 is maximally inserted (for example, the closed state). The content may include an execution screen of at least one application executed in a foreground mode. Alternatively, not being limited to what is described and/or shown, the electronic device 500 (for example, the first electronic device 100 in FIG. 1 to FIG. 2) may also display a content in a state in which at least a portion of the region (for example, the second region (for example, the second region A2)) of the display 540 implemented to be capable of being received in the electronic device 500 is partially or entirely exposed (for example, the open state).

According to various embodiments, the electronic device 500 (for example, the first electronic device 100 in FIG. 1 to FIG. 2) may configure communication connection with the external electronic device 800 (for example, the second electronic device 130 in FIG. 1 to FIG. 2) to display the content, based on technologies for supporting wireless displaying services (for example, mirror cast, Airplay, WiDi, and DIAL). In an embodiment, during displaying the first content 900*a* and 910*a*, the electronic device 500 (for example, the first electronic device 100 in FIG. 1 to FIG. 2) may receive, as an event for causing the wireless display operation, an input for configuring a WFD session with the discovered external electronic device 800 (for example, the second electronic device 130 in FIG. 1 to FIG. 2). For example, the electronic device 500 (for example, the first electronic device 100 in FIG. 1 to FIG. 2), as shown in FIG. 2, may perform WFD device discovery and/or WFD service discovery, and based thereon, may discover the external electronic device 800 (for example, the second electronic device 130 in FIG. 1 to FIG. 2) for performing the operation as the discovered sink device. The electronic device 500 (for example, the first electronic device 100 in FIG. 1 to FIG. 2) may display information on the discovered external electronic device 800 (for example, the second electronic device 130 in FIG. 1 to FIG. 2), receive an input from a user for configuring the WFD session with the external electronic device 800 (for example, the second electronic device 130 in FIG. 1 to FIG. 2), and based on the input, continuously perform WFD connection setup and capability exchange and negotiation. In another embodiment, the electronic device 500 (for example, the first electronic device 100 in FIG. 1 to FIG. 2) may display information on the discovered external electronic device 800 (for example, the second electronic device 130 in FIG. 1 to FIG. 2) in a manner similar to the mirror cast, based on other technologies (for example, mirror cast, Airplay, WiDi, and DIAL), and when the discovered external electronic device 800 (for example, the second electronic device 130 in FIG. 1 to FIG. 2) is selected by a user, an operation for configuring the WFD session with the external electronic device 800 (for example, the second electronic device 130 in FIG. 1 to FIG. 2) based on other technologies may be performed. The operation of configuring a session, based on other technologies (for example, mirror cast, Airplay, WiDi, and DIAL) is a well-known technology and therefore the detailed description will be omitted.

According to various embodiments, the electronic device 500 (for example, the electronic device 100 in FIG. 1 to FIG. 2) may configure a session for wireless displaying in operation 805. For example, the electronic device 500 (for example, the first electronic device 100 in FIG. 1 to FIG. 2) may complete configuring the session supported by technologies for supporting wireless displaying services (for example, Airplay, WiDi, and DIAL) and configure communication connection with the external electronic device 800 (for example, the second electronic device 130 in FIG. 1 to FIG. 2).

According to various embodiments, the electronic device 500 (for example, the first electronic device 100 in FIG. 1 to FIG. 2), as described above with reference to FIG. 2, may transmit, to the second electronic device 130 (for example, the sink device), information related to a device type of the first electronic device 100 during performing at least one of the WFD device discover, the WFD service discovery, the WFD connection setup, or the capacity exchange and negotiation. The information related to the type of the first electronic device 100 may include resolution information, screen ratio information, or identification information. The identification information may indicate the type of the first electronic device 100. Based on the reception of the information related to the device type, the second electronic device 130 (for example, the source device) may decode, when the first electronic device 100 changes a parameter related to wireless display (for example, a parameter related to video quality (for example, resolution, a frame rate, color depth) and a parameter related to the transmission (for example: a bit rate)), received video data based on the changed parameter.

According to various embodiments, the electronic device 500 (for example, the first electronic device 100 in FIG. 1 to FIG. 2) may transmit first video data with respect to the first content 900a and 910a in operation 807. For example, the electronic device 500 (for example, the first electronic device 100 in FIG. 1 to FIG. 2) may obtain a content being displayed on a first region (for example, A1) of the display 540 as shown in 901 of FIGS. 9a and 904 of FIG. 9B, and may transmit video data (or video stream) with respect to the obtained content to the external electronic device 800 (for example, the second electronic device 130 in FIG. 1 to FIG. 2). The electronic device 500 (for example, the first electronic device 100 in FIG. 1 to FIG. 2) may obtain a content being displayed on the first region (for example, A1) of the display 540. The electronic device 500 (for example, the first electronic device 100 in FIG. 1 to FIG. 2), in order to display the first content 900a and 910a on the first region (for example, A1) of the display 540, may obtain the first content 900a and 910a stored in the memory (or buffer), or obtain the first content 900a and 910a from a configuration (for example, a surface flinger) of the framework or an application. The electronic device 500 (for example, the first electronic device 100 in FIG. 1 to FIG. 2) may encode the obtained first content 900a and 910a and produce video data (or a video stream) using a specified codec (for example, H.264 and MPEG-2). The electronic device 500 may transmit the produced data to the external electronic device 800 and the external electronic device 800 may display the first content on a display 810 of the external electronic device 800, based on the received video data. The external electronic device 800 may decode the received video data, based on the information (for example, a value for a parameter related to the video quality, and screen ratio) received from the electronic device 500. The decoded first content 900a may have a screen ratio corresponding to the screen ratio of the electronic device 500 and a value for a parameter related to the video quality. Here, the external electronic device 800 may arrange and display the decoded first content 900a at the center of the display 810 of the external electronic device 800 as shown in FIG. 9A and FIG. 9B, but having no limitation thereto, and the decoded first content 900a may be positioned at various positions.

Without limitation to what is described and/or shown, the electronic device 500 (for example, the first electronic device 100 in FIG. 1 to FIG. 2) may transmit, together with the video data with respect to the first content 900a and 910a, audio data (or an audio stream) with respect to a sound corresponding to the current first content 900a and 910a to the external electronic device 800 (for example, the second electronic device 130 in FIG. 1 to FIG. 2).

According to various embodiments, the electronic device 500 (for example, the first electronic device 100 in FIG. 1 to FIG. 2) may display a second content when the display is 540 inserted or withdrawn in operation 809, and transmit a second data with respect to the second contents in operation 811. For example, the electronic device 500 (for example, the first electronic device 100 in FIG. 1 to FIG. 2) may display a content 900b and 900c on at least a portion of the second region A2 and the first region A1 of the display as the display 540 is withdrawn in the transverse direction as shown in FIG. 9A, or display a content 910b and 910c as the display 540 is withdrawn in the longitudinal direction as shown in FIG. 9B. As described above, as shown in FIG. 9A, an execution screen corresponding to the current area of the existing application may be displayed on a region (for example, at least a portion of the second region A2) of the display 540 expanded according to the withdrawal of the display 540 (for example, a video list screen of the video application is displayed on the withdrawn region) or as shown in FIG. 9B, a new application execution screen (for example, a configuration application screen) may be displayed. The electronic device 500 (for example, the first electronic device 100 in FIG. 1 to FIG. 2) may obtain an updated (or changed) content 900b, 900c, 910b, and 910c, produce video data from the same, and transmit the generated video data to the external electronic device 800. As shown in 902 to 903 in FIGS. 9a and 905 to 906 in FIG. 9B, based on the updated information (for example, a value for a parameter related to the updated video quality and the undated screen ratio) received from the electronic device 500, the external electronic device 800 may decode the received video data and display the content 900b, 900c, 910b, and 910c thus obtained on the display. An overlapping description will be omitted. Therefore, as the changed content 900b, 900c, 910b, and 910c is displayed, a blank area of the display 810 of the external electronic device 800 without a content displayed thereon may be reduced.

According to various embodiments, as shown in FIG. 9A and FIG. 9B, a continuously updated content as the display 540 is withdrawn as described above will be wirelessly displayed on the external electronic device 800. In this case, the electronic device 500 may update a mirroring region based on the satisfaction of a specified condition (for example, periodically) and control the updated content to be wirelessly displayed. The description thereof will the given below with reference to FIG. 10 to FIG. 11. Alternatively, when the withdrawal of the display 540 is completed in a state in which the display 540 is not maximally withdrawn, the content displayed on a region in a state in which the region of the display 540, which is exposed to the outside according to the withdrawal of the display 540 is maintained may be wirelessly displayed on the external electronic device 800. (For example, performing an operation in a free-stop state)

However, without limitation to what is described and/or shown, the operation of producing and transmitting the video data with respect to the content 900b, 900c, 910b, and 910c updated (or changed) according to the withdrawal of the display 540 by the electronic device 500 (for example, the first electronic device 100 in FIG. 1 to FIG. 2) may be applied to an operation of producing and transmitting video data with respect to a content updated (or changed) according to the insertion of the display 540 of the electronic device 500 (for example, the first electronic device 100 in FIG. 1 to FIG. 2), and thus an overlapping description will be omitted.

Hereinafter, an example of an operation of an electronic device 500 according to various embodiments will be described.

According to various embodiments, when an area of the display 540 exposed to the outside is changed according to the movement (for example, slide-out or slide-in) of the first housing while a session for wireless displaying is configured, the electronic device 500 (for example, the first electronic device 100 in FIG. 1 to FIG. 2) may update information on a region (or region information) of the display 540 to be wirelessly displayed. The electronic device 500 (for example, the first electronic device 100 in FIG. 1 to FIG. 2) may obtain a content, based on the updated region, and process (for example, encoding) the obtained content to produce video data.

FIG. 10 is a flowchart 1000 illustrating an example of an operation of an electronic device according to various embodiments. According to various embodiments, the operations shown in FIG. 10 are not limited to the described order and may be performed in various orders. In addition, according to various embodiments, more operations or the fewer operations than the operations shown in FIG. 10 may be performed. Hereinafter, FIG. 10 will be described with reference to FIG. 11A and FIG. 11B.

FIG. 11A is a view illustrating an example of an operation of updating information on a region of a display 540 to be wirelessly displayed of an electronic device according to various embodiments. FIG. 11B is a view illustrating another example of an operation of updating information on a region of a display 540 to be wirelessly displayed of an electronic device according to various embodiments.

According to various embodiments, the electronic device 500 (for example, the first electronic device 100 in FIG. 1 to FIG. 2) may display a first content on a first region (for example, A1) of the display 540 in operation 1001. For example, as shown in 1101 in FIG. 11A and 1104 in FIG. 11B, the electronic device 500 (for example, the first electronic device 100 in FIG. 1 to FIG. 2) may display the first content in a state in which the display 540 is maximally inserted (for example, the closed state). The first content may include an execution screen of at least one application executed in a fore-ground mode. Alternatively, not being limited to what is described and/or shown, the electronic device 500 (for example, the first electronic device 100 in FIG. 1 to FIG. 2) may also display a content in a state in which at least a portion of the region (for example, the second region (for example, A2)) of the display 540 implemented to be capable of being received in the electronic device is partially or entirely exposed (for example, the open state). Operation 1001 of the electronic device 500 is performed as operation 801 of the electronic device 500 as described above, and thus an overlapping description will be omitted.

According to various embodiments, the electronic device 500 (for example, the first electronic device 100 in FIG. 1 to FIG. 2) may configure communication connection with the external electronic device 800 (for example, the second electronic device 130 in FIG. 1 to FIG. 2) in operation 1003, may transmit first information on the first content so that the external electronic device 800 (for example, the second electronic device 130 in FIG. 1 to FIG. 2) displays the first content in operation 1005. For example, the electronic device 500 may perform an operation of configuring a session for wireless displaying, based on technologies (for example, mirror cast, Airplay, WiDi, and DIAL) for wireless displaying, and based on the performing of the operation, may configure communication connection with the external electronic device. When the electronic device 500 uses mirror cast, the operation of configuring a session for wireless displaying may include the WFD device discover, the WFD service discovery, the WFD connection setup, or the capacity exchange and negotiation, and an overlapping description thereof will be omitted.

According to various embodiments, the electronic device 500 (for example, the content transmission module 575) may identify, when the operation of configuring a session is completed, a region of the display 540 to be wirelessly displayed (or obtain information on a region (or region information)), obtain a content corresponding (or displayed) to the identified region, and obtain video data with respect to the obtained content. In an embodiment, referring to FIG. 11A and FIG. 11B, the electronic device 500 (for example, the content transmission module 575) may obtain information on reference coordinates 1100a and 1100b defining a region to be wirelessly displayed, a width w1, w2, and w3, and a height l), and obtain a content displayed on the region corresponding to the obtained information (for example, the reference coordinates 1100a and 1100b, the width w1, w2, and w3, and the height l. The reference coordinates 1100a and 1100b may be configured as the coordinates of a vertex (for example, (0,0)) of the upper left corner of the region as shown in FIG. 11A or the coordinates) of a vertex (for example, (x,0)) of the upper right corner of the region as shown in FIG. 11B. However, without limitation thereto, the reference coordinates may be variously configured. In an embodiment, without limitation to what is described and/or shown, the electronic device 500 (for example, the content transmission module 575) may determine the coordinates defining a region and obtain a content displayed on the region corresponding to the determined coordinates. For example, the coordinates may include coordinates of a vertex of the upper left corner and coordinates of a vertex of the lower right corner corresponding (for example, a diagonal direction) thereto, or coordinates of a vertex of the upper right corner and coordinates of a vertex of the lower left corner corresponding (for example, a diagonal direction) thereto. The electronic device (for example, the content transmission module) may obtain (for example, a content having corresponding information), from the memory, a content on a region identified based on information (for example, the reference coordinates 1100a and 1100b, the width w1, w2, and w3, and the height 1, or coordinates)

defining the region to be wirelessly displayed, or may obtain a content returned by requesting from a component (for example, the surface flinger and view system) in the framework (for example, a component of the framework returns a content corresponding to the information). When the display 540 is withdrawn, the electronic device may update information on the region to be wirelessly displayed and obtain a content. The description thereof will be given below with reference to operation 1011.

According to various embodiments, the electronic device 500 (for example, the content transmission module 575) may transmit, based on the communication connection, information on the first content (or video data) together with the obtained video data to the external electronic device 800 (for example, the second electronic device 130 in FIG. 1 to FIG. 2). In an embodiment, the information on the first content may include, in addition to the video data, a value indicating at least one parameter with respect to the video data. In an embodiment, the at least one parameter may include information on a video quality such as at least one of resolution, a refresh rate, or color depth. For example, when processing (for example, encoding) the content, the electronic device 500 (for example, the content transmission module 575) may select a value from among multiple values stored in advance for each of at least one parameter, process (for example, encode) the content, based on the selected value, and obtain video data. By way of example, the electronic device 500 (for example, the content transmission module 575) may, during the operation of configuring the session for wireless displaying (for example, capacity exchange and negotiation), configure a value for a parameter (for example, resolution and a refresh rate), based on a message (for example, an RTSP message) exchanged with the external electronic device 800 (for example, the second electronic device 130 in FIG. 1 to FIG. 2), encode the first content obtained as the configured value (for example, resolution and a refresh rate) for the parameter (for example, encoding the content with the resolution and the refresh rate using a codec), and obtain video data with respect to the first content. As described below, the multiple values of each of parameter are classified and stored in predetermined units of format, and accordingly when the format is selected, the value of each parameter may be selected. The description thereof will be given with reference to FIG. 12 to FIG. 13. When transmitting the obtained video data, the electronic device may transmit the selected value of the at least one parameter together to the external electronic device 800 (for example, the second electronic device 130 in FIG. 1 to FIG. 2). As such, the external electronic device 800 (for example, the second electronic device 130 in FIG. 1 to FIG. 2) may obtain the first content by decoding the received video data, based on the received value for the at least one parameter. In an embodiment, the information on the first content may include information on an area of the display 540 exposed to the outside (for example, information on the screen ratio of the exposed display 540). Accordingly, the external electronic device 800 (for example, the second electronic device 130 in FIG. 1 to FIG. 2) may display the first content on the display 810 of the external electronic device 800 (for example, the second electronic device 130 in FIG. 1 to FIG. 2) in a screen ratio corresponding to the received information on the screen ratio of the exposed display 540.

According to various embodiments, the electronic device 500 (for example, the first electronic device 100 in FIG. 1 to FIG. 2) may determine whether a second region (for example, A2) of the display 540 is exposed to the outside in operation 1007, and in operation 1009, when the second region (for example, A2) is exposed, may display a second content on a third region including the first region (for example, A1) and the second region (for example, A2), based on at least one value obtained using a sensor as the second region is exposed. In an embodiment, the electronic device may control the display 540 to slide, based on the occurrence of an event configured to causing the display 540 (or the first structure 301 or the first plate 311a) to slide. The predetermined event may include identifying execution and/or running of the specified application and a user input (for example, identifying selection of an icon, and identifying physical pressing of a key) for causing the sliding of the display 540. The electronic device 500 may control the movement device 530 (for example, the motor) to rotate the roller 151 so as to move the first structure, based on the identification of the occurrence of the specified event. As shown in 1102 and 1103 in FIG. 11A, and 1105 and 1106 in FIG. 11B, according to the movement of the first structure, a region (for example, the second region (for example, A2)) received in the electronic device 500 may be at least partially exposed to the outside. In an embodiment, the display 540 may be manually slid by a user (for example, pulling the display 540 (or the first structure 301 or the first plate 311a) in a first direction (for example, direction ①)) or in a second direction opposite to the first direction). The display 540 of the electronic device may be continuously withdrawn to reach the maximally withdrawn state (for example, the open state) or may be at least partially withdrawn to maintain the state of being at least a partially withdrawn.

According to various embodiments, based on that the at least a portion of the second region (for example, A2) of the display 540 is exposed, the electronic device 500 may display the second content different from the first content on at least a portion of the first region (for example, A1) previously exposed to the outside and the second region (for example, A2) newly exposed to the outside. For example, the electronic device 500 may display the second content on the display 540 in which a size of an area exposed to the outside is changed, based on a value received from the sensor 520 according to the withdrawal of the display 540. In an embodiment, the electronic device may display the second content on the display 540 by displaying, on the at least a portion of the exposed second region (for example, A2), a screen other than the screen having been displayed on the first region (for example, A1) before the display 540 is withdrawn. For example, the electronic device may display an application execution screen (for example, a configuration application screen) on at least a portion of the second region (for example, A2). Accordingly, the electronic device may display, as the second content, the first application execution screen and the second application execution screen on at least a portion of the first region (for example, A1) and the second region (for example, A2). In an embodiment, the electronic device may display the second content on the display 540 by displaying, on the at least a portion of the exposed second region (for example, A2), a screen corresponding to the screen having been displayed on the first region (for example, A1) before the display 540 is withdrawn. For example, when the area of the first application execution screen displayed on the first region (for example, A1) is implemented to be variable in area, the electronic device may continuously display, on the display 540, the first application execution screen corresponding to the area (for example, the area of the third region including the first region (for example, A1) and the second region (for example, A2) of the display 540 currently exposed to the outside. Consequently, a portion of the first application execution screen may be displayed on at least a portion of the second region (for example, A2) exposed to the outside. By way of example, the electronic device 500 may resize (or re-draw) the first application execution screen, based on a value of the parameter identified using the sensor 520, such as the withdrawn distance or the area of the display 540 currently exposed to the outside and may display the resized execution screen on at least a portion of the first region (for example, A1) and the second region (for example, A2). In an embodiment, the electronic device (for example, the processor) may obtain a screen (for example, view system) returned by the first application, based on the parameter such as the withdrawn distance or the area of the display 540 currently exposed to the outside, and display the obtained screen on at least a portion of the first region (for example, A1) and the second region (for example, A2). Accordingly, the electronic device may display, as the second content, the first application execution screen having a changed area on at least a portion of the first region (for example, A1) and the second region (for example, A2).

However, the limitation is not made to what is shown in FIG. 11A and FIG. 11B. The operation of displaying the content of the electronic device 500 described above may be applied to the case in which the display 540 is inserted.

According to various embodiments, in operation 1011, the electronic device 500 (for example, the first electronic device 100 in FIG. 1 to FIG. 2) may obtain second information on the second content displayed on the third region including the first region (for example, A1) and the second region (for example, A2), based on at least one value obtained using the sensor. For example, as described above, based on the value obtained from the sensor 540 when the display 540 in inserted or withdrawn, the electronic device may identify the parameter (for example, the area of the display 540 exposed to the outside (or the length of the region in a direction (for example, the direction (for example, the horizontal direction, and X direction) in which the display 540 is inserted or withdrawn), the ratio of the exposed region and the received region of the display 540 (for example, the screen expansion ratio), or the distance by which the display 540 is currently withdrawn (or inserted)) related to a region of the display 540. The electronic device 500 (for example, the content transmission module 575) may change (or update) at least a portion (for example, the reference coordinates 1100a and 1100b, the width w1, w2, and w3, and/or the length) of information defining a region 1111, 1121, 1131, 1141, 1151, and 1161 to be wirelessly displayed, based on the parameter related to the region of the display 540 identified as shown in FIG. 11A and FIG. 11B, and change (or update) the region to be wirelessly displayed. In an embodiment, the electronic device 500 (for example, the content transmission module 575) may, as shown 1102 to 1103 in FIG. 11A, update the width w1, based on the parameter. By way of example, the electronic device 500 (for example, the content transmission module 575) may add the withdrawn distance to the width w1 (for example, w1+o1 or w1+o1+o2) so as to identify the updated width (for example, w2 and w3). In an embodiment, the electronic device 500 (for example, the content transmission module 575) may, as shown 1105 to 1106 in FIG. 11A, update the width w1 together with the reference coordinates 1100b, based on the parameter. By way of example, the electronic device 500 (for example, the content transmission module 575) may add the withdrawn distance to each of the x-coordinates value of the reference coordinates 1100b and the width w1 (for example, x1+o1, x1+o1+o2 w1+o1, or w1+o1+o2) so as to identify the updated reference coordinates 1100b (for example, (x1+o1, 0), (x1+o1+o2, 0)) and the updated width (for example, w2 and w3). The electronic device 500 (for example, the content transmission module 575) may obtain the second content of the region 1121, 1131, 1151, and 1161 corresponding to the undated information (for example, the updated reference coordinates 1100a and 1100b, the updated width w2 and w3, and/or the length), and process (for example, encode) the obtained second content to obtain video data. The operation of obtaining the video data may be performed in the same manner as the description above with reference to operation 1005, and thus an overlapping description will be omitted. Here, the electronic device 500 (for example, the content transmission module 575) may also change the value of the parameter related to the video data to process (for example, encode) the second content. The description thereof will be given below with reference to FIG. 12 to FIG. 13.

However, without limitation to what is described and/or shown, in the case in which the display 540 is withdrawn in the longitudinal direction, the reference coordinates 1100a and 1100b and/or the length l may be updated. The operation of updating the reference coordinates 1100a and 1100b and/or the length l may be performed in the same manner as the operation of updating the reference coordinates 1100a and 1100b and/or the width w, and thus an overlapping description will be omitted.

According to various embodiments, the electronic device 500 (for example, the electronic device 100 in FIG. 1 to FIG. 2) may perform an operation of changing (or updating) the region to be wirelessly displayed, based on the occurrence of the specified event. The specified event may occur at a specified period from a time point at which the display 540 is withdrawn, or occur when at least one value obtained using the sensor 520 is changed by a specified amount. For example, the electronic device 500 may update a region to be wirelessly displayed at each time point with a specified period from the time point at which the display 540 is withdrawn so as to obtain the second content. For example, the electronic device 500 may update a region to be wirelessly displayed at a specified time point at which at least one value obtained using the sensor 520 is changed by a specified amount so as to obtain the second content.

According to various embodiments, in operation 1013, the electronic device 500 (for example, the first electronic device 100 in FIG. 1 to FIG. 2) may transmit the second information to the external electronic device 800 (for example, the second electronic device 130 in FIG. 1 to FIG. 2) so that the external electronic device 800 (for example, the second electronic device 130 in FIG. 1 to FIG. 2) displays the second content. For example, the electronic device 500 (for example, the content transmission module 575) may transmit video data for the second content to the external electronic device 800 (for example, the second electronic device 130 in FIG. 1 to FIG. 2). As described above, the external electronic device 800 may decode the received video data and display the obtained second content on the display 810 of the external electronic device 800.

Hereinafter, an example of an operation of an electronic device 500 according to various embodiments.

According to various embodiments, when an area of the display 540 exposed to the outside is changed according to the movement (for example, slide-out or slide-in) of the first housing while a session for wireless displaying is configured, the electronic device 500 (for example, the first electronic device 100 in FIG. 1 to FIG. 2) may adjust (reduce) a value of at least one parameter related to the wireless displaying. The at least one parameter related to the wireless displaying may include parameters related to the video quality (for example, resolution, a frame rate, and color depth) and parameters related to video transmission (for example, a bit rate).

Figure 12:
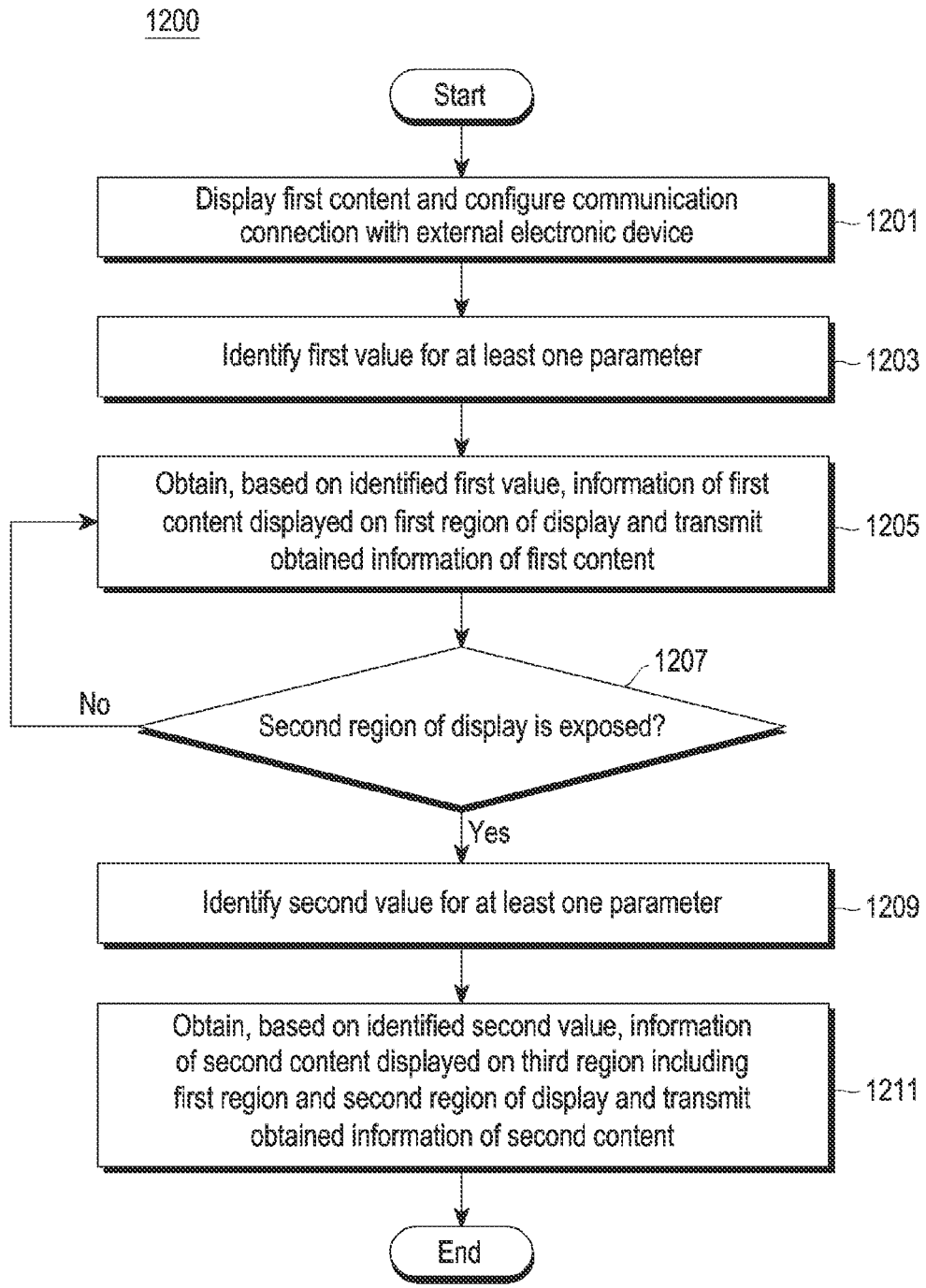
FIG. 12 is a flowchart illustrating an example of an operation of an electronic device according to various embodiments.

FIG. 12 is a flowchart 1200 illustrating an example of an operation of an electronic device 500 according to various embodiments. According to various embodiments, the operations shown in FIG. 12 are not limited to the described order and may be performed in various orders. In addition, according to various embodiments, more operations or the fewer operations than the operations shown in FIG. 12 may be performed. Hereinafter, FIG. 12 will be described with reference to FIG. 13.

Figure 13:
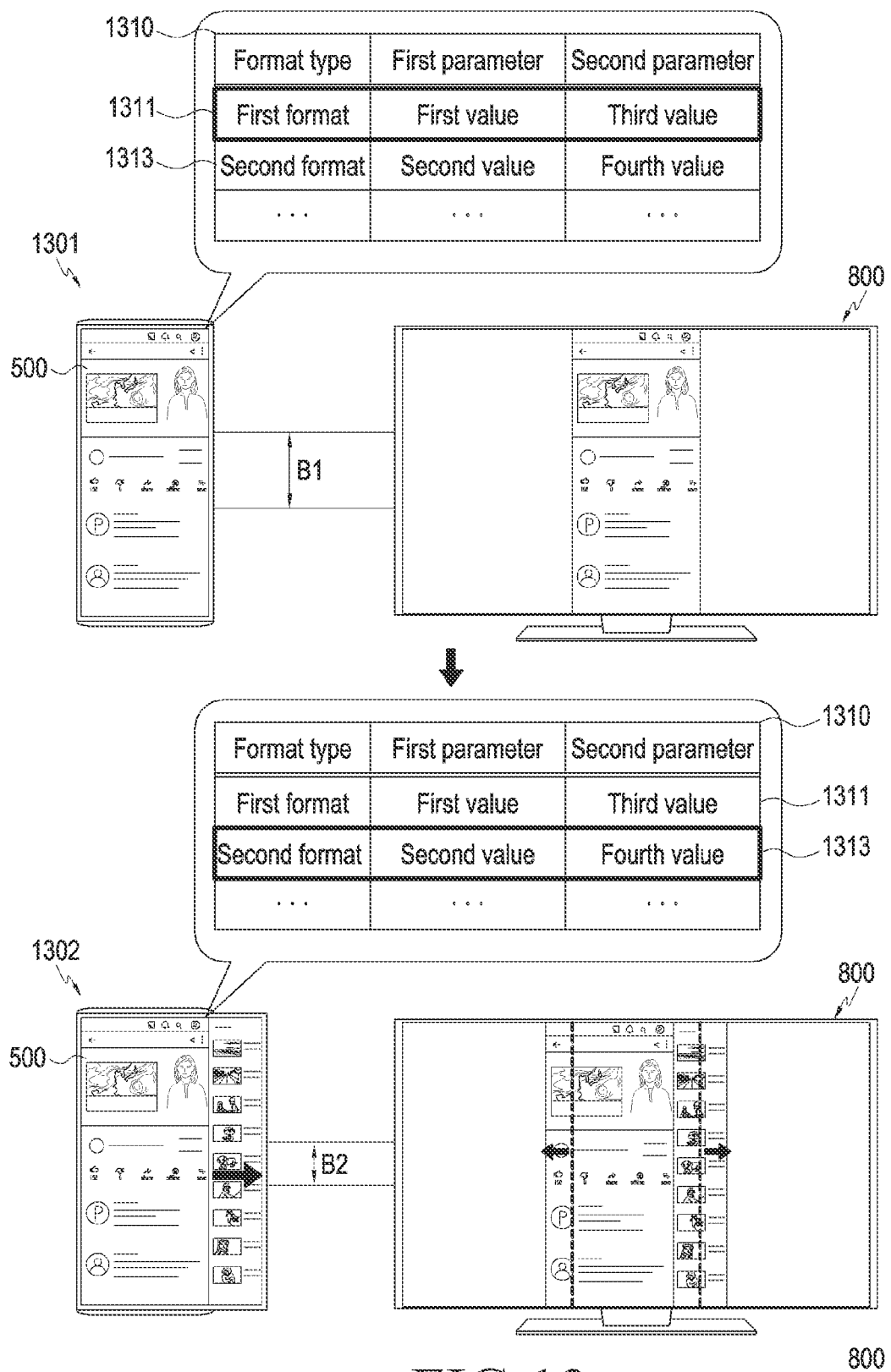
FIG. 13 is a view illustrating an example of an operation of adjusting a value of a parameter related to wireless display of an electronic device according to various embodiments.

FIG. 13 is a view illustrating an example of an operation of adjusting a value of a parameter related to wireless display of an electronic device 500 according to various embodiments.

According to various embodiments, the electronic device 500 may display a first content and configure communication connection with an external electronic device 800 (for example, the second electronic device 130 in FIG. 1 to FIG. 2) in operation 1201. For example, as shown in 1301 in FIG. 13, while displaying the first content (for example, the application execution screen) on a first region (for example, A1) of the display 540, the electronic device 500 (for example, the first electronic device 100 in FIG. 1 to FIG. 2) may configure communication connection with the external electronic device 800 (for example, the second electronic device 130 in FIG. 1 to FIG. 2), based on the performing an operation of configuring a session for wireless displaying. Operation 1201 of the electronic device 500 (for example, the first electronic device 100 in FIG. 1 to FIG. 2) is performed in the same manner as operation 1001 to 1003 of the electronic device 500 described above, and thus an overlapping description will be omitted.

According to various embodiments, the electronic device 500 may identify a first value of at least one parameter in operation 1203, obtain, based on the identified first value, information on the first content displayed on the first region (for example, A1) of the display 540 in operation 1205, and transmit the obtained information on the first content. For example, during the operation of configuring a session for the wireless displaying, the electronic device 500 may configure at least one from among parameters related to the video quality (for example, resolution, a frame rate, and color depth) or parameters related to video transmission (for example, a bit rate), based on information exchanged with the external electronic device 800 (for example, the second electronic device 130 in FIG. 1 to FIG. 2). In an embodiment, the electronic device 500 may determine a value B1 of the bit rate as shown in 1301 in FIG. 13. For example, multiple values of the bit rate supported by the technology (for example, mirror cast) used by the electronic device 500 are stored in the electronic device 500 in advance, and the electronic device 500 may select a value (for example, B1) from among the multiple values of the bit rate, based on the information exchanged with the external electronic device 800 (for example, the second electronic device 130 in FIG. 1 to FIG. 2). In an embodiment, as shown in 1301 in FIG. 13, the electronic device 500 may determine a value of each of the parameters (for example, resolution, a refresh rate, color depth) related to the video quality. For example, referring to 1301 in FIG. 13, information 1310 on values of each of parameters (for example, resolution and a frame rate) related to the video quality corresponding to each of formats (for example, the first format 1311 and the second format 1313) supported by the technology (for example, mirror cast) for the wireless displaying may be stored in the electronic device 500 in advance. For example, the values of each of parameters (for example, resolution and a frame rate) related to the video quality may be stored in units of format as depicted in Table 1 below. Other values for formats other than the values of parameters for formats depicted in Table 1 may be implemented as described in "Wi-Fi Display Technical Specification" or values of parameters for each format are not limited what is described and may be variously configured. The electronic device 500 may select, from among multiple formats, a format (for example, the first format 1311) having a specific value (for example, a first value and a third value) for each parameter (for example, a first parameter (for example, resolution), and a second parameter (for example, a frame rate)) based on the exchange of information with the external electronic device 800 (for example, the second electronic device 130 in FIG. 1 to FIG. 2). The information exchange may be performed in the same manner as the capability exchange and negotiation 211, and thus an overlapping description will be omitted.

TABLE 1

| Format | Resolution | Frames per second ((i) interlaced or (p) progressive) |
|---|---|---|
| Standard definition | 640 × 480 | p60 |
| High definition 1 | 720 × 480 | p60 |
| High definition 2 | 1280 × 720 | p60 |
| Ultra high definition | 1920 × 1080 | i60 |
| ... | ... | ... |

Without limitation to what is described and/or shown, the values of the parameters related to the video quality are not stored in units of format, and regardless of the format, the values for each of the parameters (for example, resolution, a frame rate, color depth) may be stored in the electronic device 500. The electronic device 500 may encode the first content obtained based on the value for the parameters (for example, resolution, a frame rate, color depth) related to the quality of the selected video, and may obtain video data based on the encoding. For example, the electronic device 500 may encode the obtained first content to produce video data having a first value for the first parameter (for example, resolution) corresponding to the first format 1311 and a second value for the second parameter (for example, a frame rate). For another example, the electronic device 500 may encode the obtained first content to produce video data having color depth of specific value (for example, 16 bit). Thereafter, the electronic device 500 may wirelessly transmit the video data as the value (for example, B1) for the selected bit rate to the external electronic device 800 (for example, the second electronic device 130 in FIG. 1 to FIG. 2).

According to various embodiments, in operation 1207, the electronic device 500 may determine whether the second region (for example, A2) of the display 540 is exposed, and may identify, when the second region (for example, A2) of the display 540 is exposed, a second value for at least one parameter in operation 1209. For example, the electronic device 500 may identify the withdrawal of the display while transmitting the video data for the first content to the external electronic device 800 (for example, the second electronic device 130 in FIG. 1 to FIG. 2). In an embodiment, the electronic device 500 may identify the occurrence of the event configured to cause the sliding of the display 540 (or the first structure 101 or the first plate 111a) to identify the withdrawal of the display 540 (or the open state of the electronic device 500). In an embodiment, the electronic device 500 may identify the withdrawal of the display 540, based on the value obtained using the sensor 520. When the withdrawal of the display 540 is identified, the electronic device 500 may change the configured first value for the at least one parameter to the second value. For example, the second value may be the previously configured first value. In an embodiment, the electronic device 500 may select (or change) a value B2 smaller than the value B1 previously selected for the bit rate as shown in 1302 in FIG. 13. The changed value B2 may be a value preconfigured to be selected when the display 540 is withdrawn. In an embodiment, as shown in 1302 in FIG. 13, the electronic device 500 may select, from among multiple formats, a format (for example, a second format 1313) having a lower value (for example, the second value and the fourth value) for the multiple parameters then that for the existing parameters (for example, the first parameter (for example, resolution) and the second parameter (for example, a frame rate)) related to the video quality. Accordingly, in a situation that the area of the display 540 increases to cause the increase of the amount of the content data to be processed, the value of the parameter (for example, the parameter related to the video quality and the parameter related to the video transmission) is adjusted to be small and thereby the amount of the data to be processed and/or the amount of the data to be transmitted may be reduced.

According to the various embodiments, the electronic device 500 may transmit information indicating the value for at least one parameter changed according to the withdrawal of the display 540 to the external electronic device 800 (for example, the second electronic device 130 in FIG. 1 to FIG. 2). In an embodiment, when the electronic device 500 transmits information related to the type of the electronic device to the external electronic device 800 (for example, the second electronic device 130 in FIG. 1 to FIG. 2) during at least one of the WFD device discover, the WFD service discovery, the WFD connection setup, or the capacity exchange and negotiation, the electronic device 500 (for example, the first electronic device 100 in FIG. 1 to FIG. 2) may transmit, to the external electronic device 800 (for example, the second electronic device 130 in FIG. 1 to FIG. 2), information (for example, an index indicating a changed format, or an index indicating the changed value for the parameter) indicating the value for the parameter changed when the parameter is changed. In an embodiment, the electronic device 500 (for example, the first electronic device 100 in FIG. 1 to FIG. 2) may produce an RTSP request message (for example, the RTSP M4 request message) including information (for example, an index indicating a changed format, or an index indicating the changed value for the parameter) indicating the changed value for the parameter, and transmit the message to the external electronic device 800 (for example, the second electronic device 130 in FIG. 1 to FIG. 2). Based on the transmission of the RTSP request message, the electronic device 500 may perform renegotiation for at least one parameter with the external electronic device 800 (for example, the second electronic device 130 in FIG. 1 to FIG. 2), and when the renegotiation is completed, the electronic device may transmit video data produced based on the value of the at least one parameter to the external electronic device 800 (for example, the second electronic device 130 in FIG. 1 to FIG. 2). As such, the external electronic device 800 (for example, the second electronic device 130 in FIG. 1 to FIG. 2) (for example, the sink device) may obtain a content by decoding the video data, based on the received value for the at least one parameter included in the RTSP message, and may display the obtained content.

However, without limitation to what is described and/or shown, even when a portion of the second region (for example, A2) of the display 540 of the electronic device 500 is inserted, the electronic device 500 may change the value for the at least one parameter. For example, when the display is inserted, the electronic device 500 may be changed to the parameter having a larger value.

According to various embodiments, the electronic device 500 may obtain information on the second content displayed on the third region including the first region (for example, A1) and the second region (for example, A2) of the display 540, based on the second value identified in operation 1211, and transmit the obtained information of the second content. For example, the electronic device 500 may produce video data, based on the value for the parameters (for example, resolution, a frame rate, and color depth) related to the video quality, and transmit the produced video data as a changed value for the bit rate to the external electronic device 800 (for example, the second electronic device 130 in FIG. 1 to FIG. 2). Operation 1211 of the electronic device 500 is performed in the same manner as operation 1205 of the electronic device 500 as described above, and thus an overlapping description will be omitted.

Hereinafter, an example of an operation of an electronic device 500 according to various embodiments will be described.

According to various embodiments, when an area of the display 540 exposed to the outside is changed according to the movement (for example, slide-out or slide-in) of the first housing while a session for wireless displaying is configured, the electronic device 500 (for example, the first electronic device 100 in FIG. 1 to FIG. 2) may continuously change (for example, continuously reduce) the parameter (for example, the parameter related to the video quality or the parameter related to transmission) according to the changed area.

Figure 14:
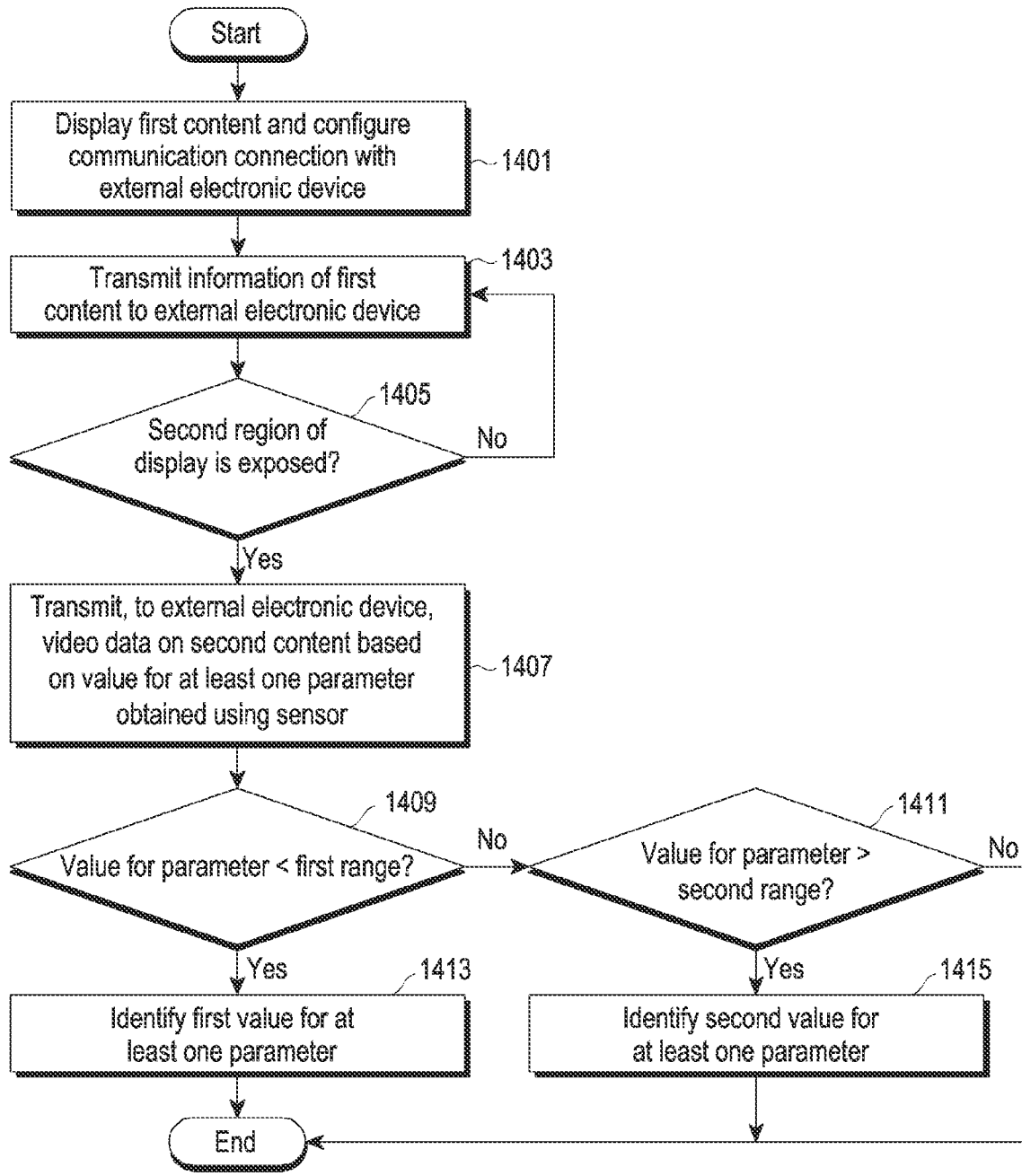
FIG. 14 is a flowchart illustrating an example of an operation of an electronic device according to various embodiments.

FIG. 14 is a flowchart 1400 illustrating an example of an operation of an electronic device 500 according to various embodiments. According to various embodiments, the operations shown in FIG. 14 are not limited to the described order and may be performed in various orders. In addition, according to various embodiments, more operations or the fewer operations than the operations shown in FIG. 14 may be performed. Hereinafter, FIG. 14 will be described with reference to FIG. 15A and FIG. 15B.

Figure 15B:
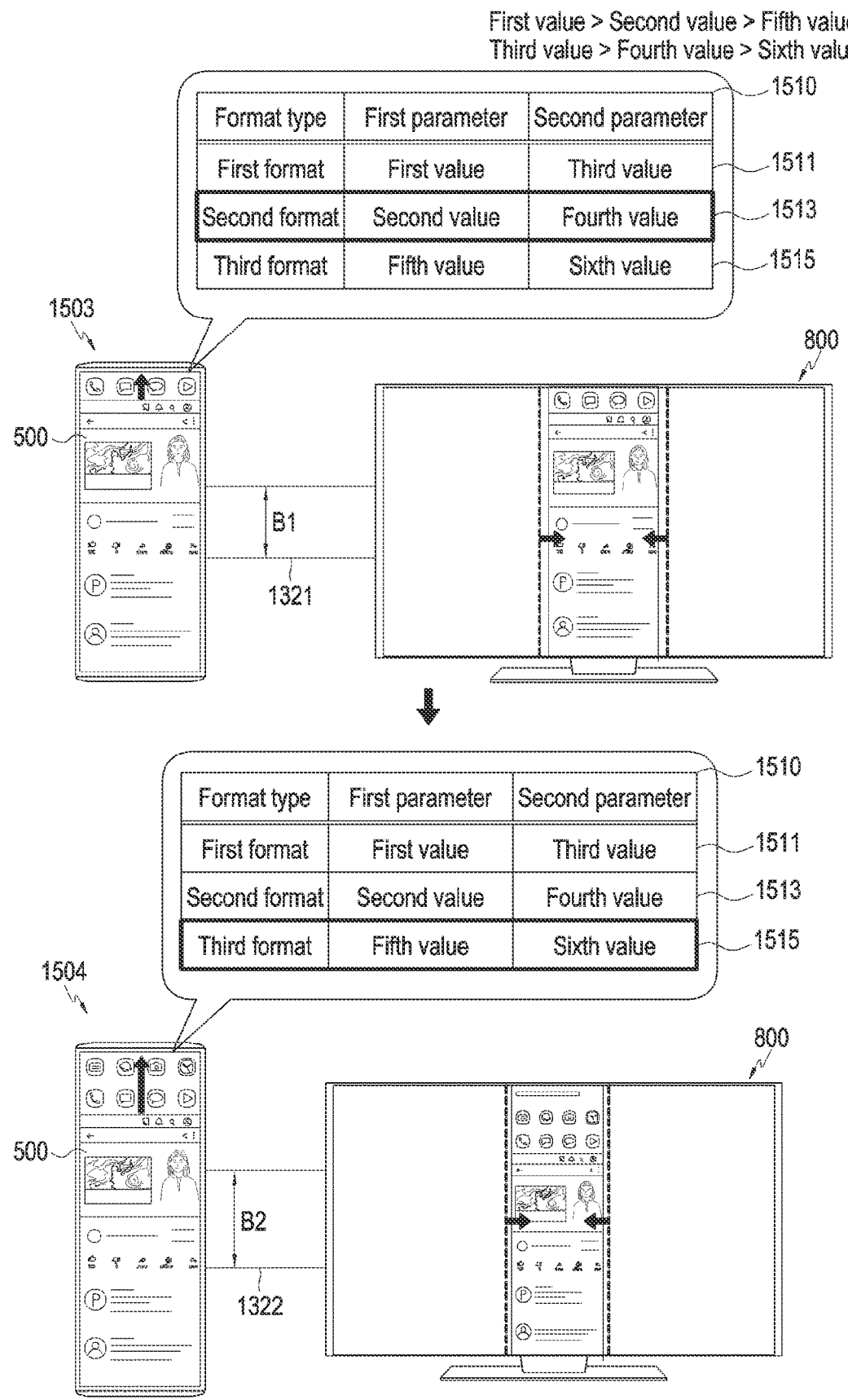
FIG. 15B is a view illustrating an operation of adjusting a parameter of an electronic of which a display is implemented to be withdrawn in a longitudinal direction according to various embodiments.

FIG. 15A is a view illustrating an operation of changing a parameter of an electronic 500 of which a display 540 is implemented to be withdrawn in a transverse direction according to various embodiments. FIG. 15B is a view illustrating an operation of changing a parameter of an electronic 500 of which a display 540 is implemented to be withdrawn in a longitudinal direction according to various embodiments.

According to various embodiments, the electronic device 500 may display a first content and configure communication connection with the external electronic device 800 (for example, the second electronic device 130 in FIG. 1 to FIG. 2) in operation 1401, and may transmit information on the first content to the external electronic device 800 (for example, the second electronic device 130 in FIG. 1 to FIG. 2) in operation 1403. For example, as shown in 1501 in FIG. 15A and 1504 in FIG. 15B, while displaying the first content (for example, the application execution screen) on a first region (for example, A1) of the display 540, the electronic device 500 (for example, the first electronic device 100 in FIG. 1 to FIG. 2) may configure communication connection with the external electronic device 800 (for example, the second electronic device 130 in FIG. 1 to FIG. 2), based on the performing an operation of configuring a session for wireless displaying. For example, the electronic device 500 (for example, the first electronic device 100 in FIG. 1 to FIG. 2) may encode the obtained first content, based on the value for the parameters (for example, resolution, a frame rate, and color depth) related to the video quality, to obtain video data, and transmit the obtained video data, based on the selected value for the bit rate B1 or B3, to the external electronic device 800 (for example, the second electronic device 130 in FIG. 1 to FIG. 2). Operations 1401 to 1403 of the electronic device 500 are performed in the same manner as operations 1201 to 1205 of the electronic device 500 described above, and thus an overlapping description will be omitted.

According to various embodiments, in operation 1405, the electronic device 500 may determine whether the second region (for example, A2) of the display 540 is exposed, and in operation 1407, when the second region (for example, A2) is determined to be exposed, the electronic device may transmit, to the external electronic device 800 (for example, the second electronic device 130 in FIG. 1 to FIG. 2), video data for the second content, based on the value of at least one parameter identified using the sensor. For example, while transmitting video data for the first content to the external electronic device 800 (for example, the second electronic device 130 in FIG. 1 to FIG. 2), the electronic device 500 may identify the withdrawal (or the open state of the electronic device 500) of the display 540 based on the operation of identifying the occurrence of the event configured to causing the sliding of the display 540 (or the first structure 301 or the first plate 311a) and/or the value obtained using the sensor 520. Based on identification of the withdrawal of the display 540 (or the open state of the electronic device 500), as shown in FIG. 15A and FIG. 15B, the electronic device 500 may select (or change) a smaller value for the bit rate than the existing value for the bit rate and/or select a format (for example, the second format 1513) having a lower value than the existing value (for example, the value of the first format 1511) for the parameters (for example, resolution, a frame rate, color depth) related to the video quality from among multiple formats 1510 (for example, the first format 1511, the second format 1513, and the third format 1515), and based thereon, may produce video data for the second content (for example, encoding the second content). Here, in an embodiment, referring to FIGS. 15A and 15B, in the case of the electronic device 500 including the display 540 configured to be withdrawn in the transverse direction, the parameter of a lower value may be selected than the case of the electronic device 500 including the display 540 configured to be withdrawn in the longitudinal direction (for example, the second format is selected in the case of withdrawing in the transverse direction and the third format is selected in the case of withdrawing in the longitudinal direction), but is not limited thereto.

According to various embodiments, in each of operation 1409 and operation 1411, the electronic device 500 may determine whether the value of the parameter related to the exposed region of the display 540 is smaller than a first range and/or smaller than a second range. When the withdrawal of the display 540 is identified (or the open state of the electronic device 500 is identified), the electronic device 500 may continuously identify the parameter related to the region of the display 540 (for example, the area of the display 540 exposed to the outside (or the length of the region in a direction (for example, the direction (for example, the horizontal direction, and X direction) in which the display 540 is inserted or withdrawn), the ratio of the exposed region and the received region of the display 540 (for example, the screen expansion ratio), or the distance by which the display 540 is currently withdrawn (or inserted)), and may compare the same with a preconfigured multiple ranges (for example, the first range and the second range larger than the first range). Although the operation in which the electronic device 500 identifies the withdrawal distance of the display 540 from the parameter will be described as an example below for convenience of the description, the description below may be applied to other operations of identifying a parameter.

According to various embodiments, when the value of the parameter related to the exposed region of the display 540 is within the first range, the electronic device 500 may identify a first value for at least one parameter in operation 1413, and when the value of the parameter related to the exposed region of the display 540 is within the second range, the electronic device may identify a second value for at least one parameter in operation 1415. For example, the electronic device 500 may adjust the value for the at least one parameter according to the range (for example, the first range and the second range) within which the withdrawal length of the display 540 falls. In an embodiment, as shown in 1501 and 1502 in FIG. 15A, in the case of the electronic device 500 including the display 540 configured to be withdrawn in the transverse direction, the electronic device 500 may increase or decrease the value of the at least one parameter in a stepwise manner when the range within which the withdrawal length of the display 540 increases (for example, becoming the second range from the first range). For example, as the range to which the withdrawal distance corresponds increases, the electronic device 500 may configure the value of the parameter related to video quality (for example, resolution, a frame rate, color depth) larger and the value of the parameter related to video transmission (for example, a bit rate) smaller, but is not limited thereto. By way of example, referring to 1502 in FIG. 15A, when the range including the withdrawal distance is increases, the electronic device 500 may select a format (for example the second format 1513) having a larger value for the at least one parameter related to video quality (for example, resolution, a frame rate, color depth) in a stepwise manner. For another example, referring to 1502 in FIG. 15A, when the range including the withdrawal distance is increases, the electronic device 500 may select a smaller value for the bit rate (for example, B2) in a stepwise manner. In an embodiment, as shown in 1503 to 1504 in FIG. 15B, in the case of the electronic device 500 including the display 540 configured to be withdrawn in the longitudinal direction, the electronic device 500 may decrease the value of the at least one parameter in a stepwise manner when the range within which the withdrawal length of the display 540 increases (for example, becoming the second range from the first range). For example, as the range to which the withdrawal length corresponds increases, the electronic device 500 may configure the value of the parameter related to video quality (for example, resolution, a frame rate, color depth) and the value of the parameter related to video transmission (for example, a bit rate) smaller, but is not limited thereto. By way of example, referring to 1504 in FIG. 15B, when the range including the withdrawal distance is increases, the electronic device 500 may select a format (for example the third format 1515) having a smaller value for the at least one parameter related to video quality (for example, resolution, a frame rate, color depth) in a stepwise manner. For another example, referring to 1504 in FIG. 15B, when the range including the withdrawal distance is increases, the electronic device 500 may select a smaller value for the bit rate (for example, B4) in a stepwise manner.

However, without limitation to what is described and/or shown, even when a portion of the second region (for example, A2) of the display 540 of the electronic device 500 is inserted, the electronic device 500 may change the value for the at least one parameter. For example, the electronic device 500 including the display 540 configured to be inserted in the transverse direction may decrease the value for the at least one parameter when the insertion distance of the display 540 decreases. For example, the electronic device 500 including the display 540 configured to be inserted in the longitudinal direction may increase the value for the at least one parameter when the insertion distance of the display 540 decreases.

According to various embodiments, the electronic device 500 may obtain video data based on the selected value (for example, the first value or the second value) for the at least one parameter in operation 1413 and transmit the obtained video data to the external electronic device 800 (for example, the second electronic device 130 in FIG. 1 to FIG. 2).

Hereinafter, an example of an operation of an electronic device 500 according to various embodiments will be described.

According to various embodiments, the electronic device 500 (for example, the first electronic device 100 in FIG. 1 to FIG. 2) may select at least a portion (for example, a portion of units of execution screen or units of view of the content displayed on the display 540 of which withdrawal is completed, or the all portions) of contents displayed on the display 540 and transmit video data with respect to the selected portion of the contents to the external electronic device 800 (for example, the second electronic device 130 in FIG. 1 to FIG. 2) (for example, the sink device).

Figure 16A:
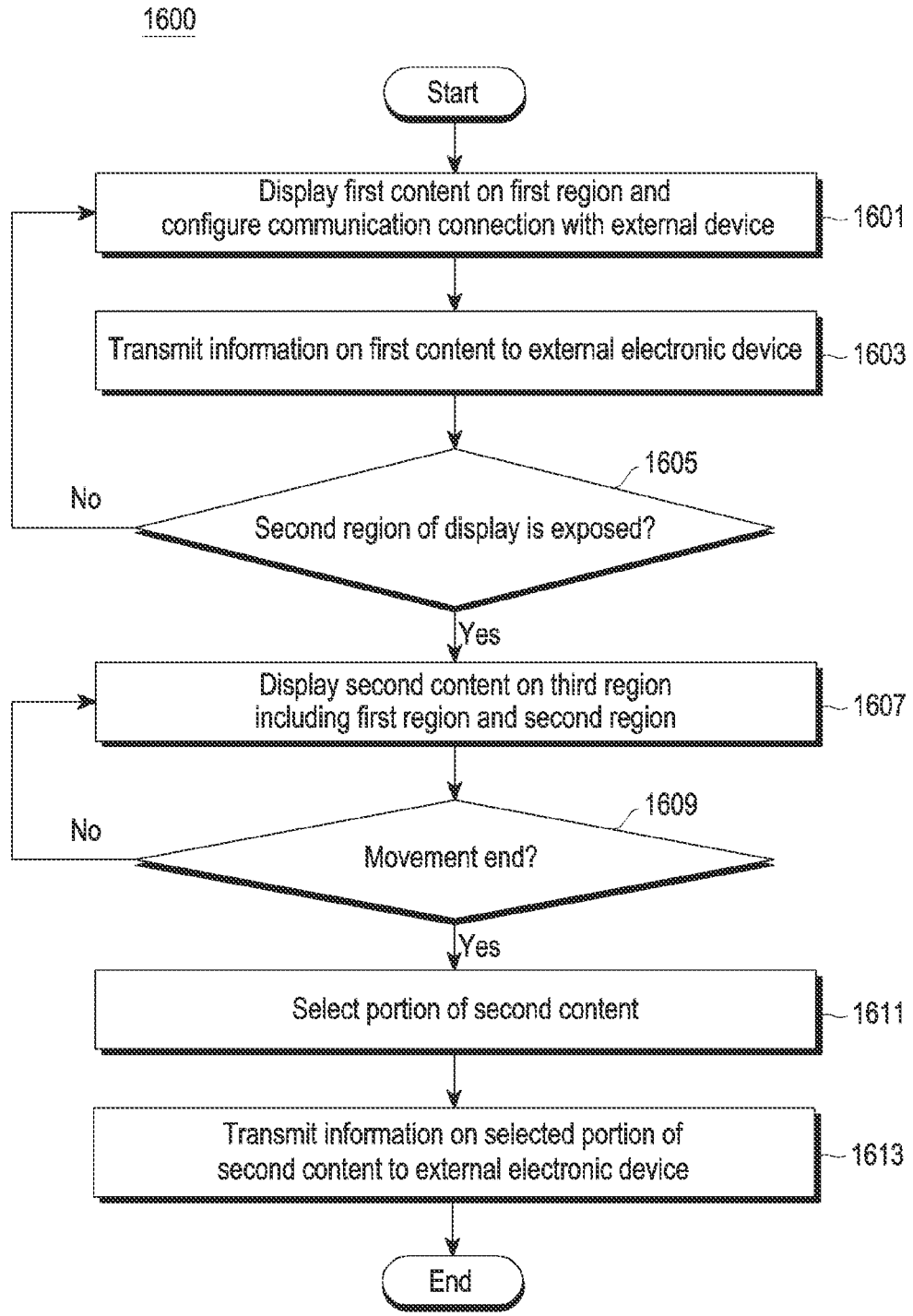
FIG. 16A is a flowchart illustrating an example of an operation of an electronic device according to various embodiments.

FIG. 16A is a flowchart 1600 illustrating an example of an operation of an electronic device 500 according to various embodiments. According to various embodiments, the operations shown in FIG. 16A are not limited to the described order and may be performed in various orders. In addition, according to various embodiments, more operations or the fewer operations than the operations shown in FIG. 16A may be performed. Hereinafter, FIG. 16A will be described with reference to FIG. 16B, and FIG. 17A to FIG. 17B.

Figure 16B:
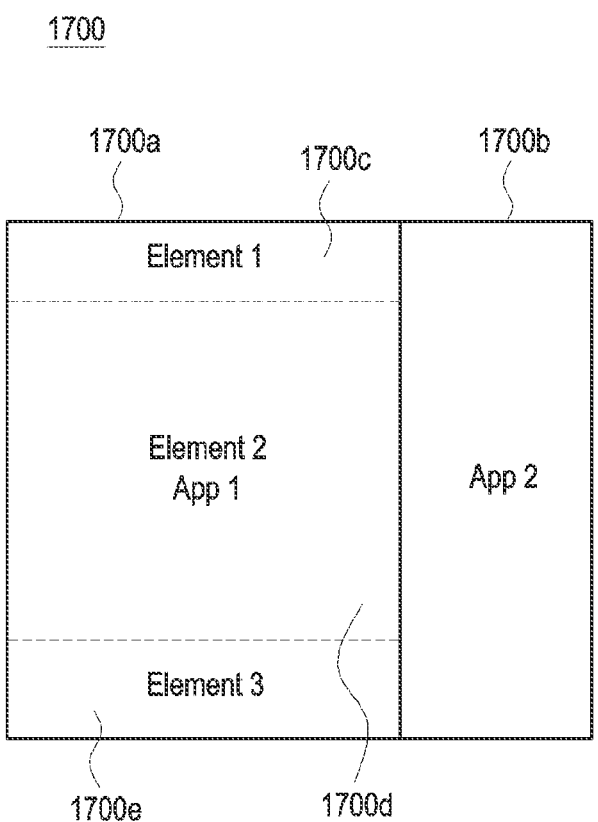
FIG. 16B is a view illustrating an example of an operation a wireless display operation for a portion of a content selected by a user of an electronic device according to various embodiments.
Figure 17A:
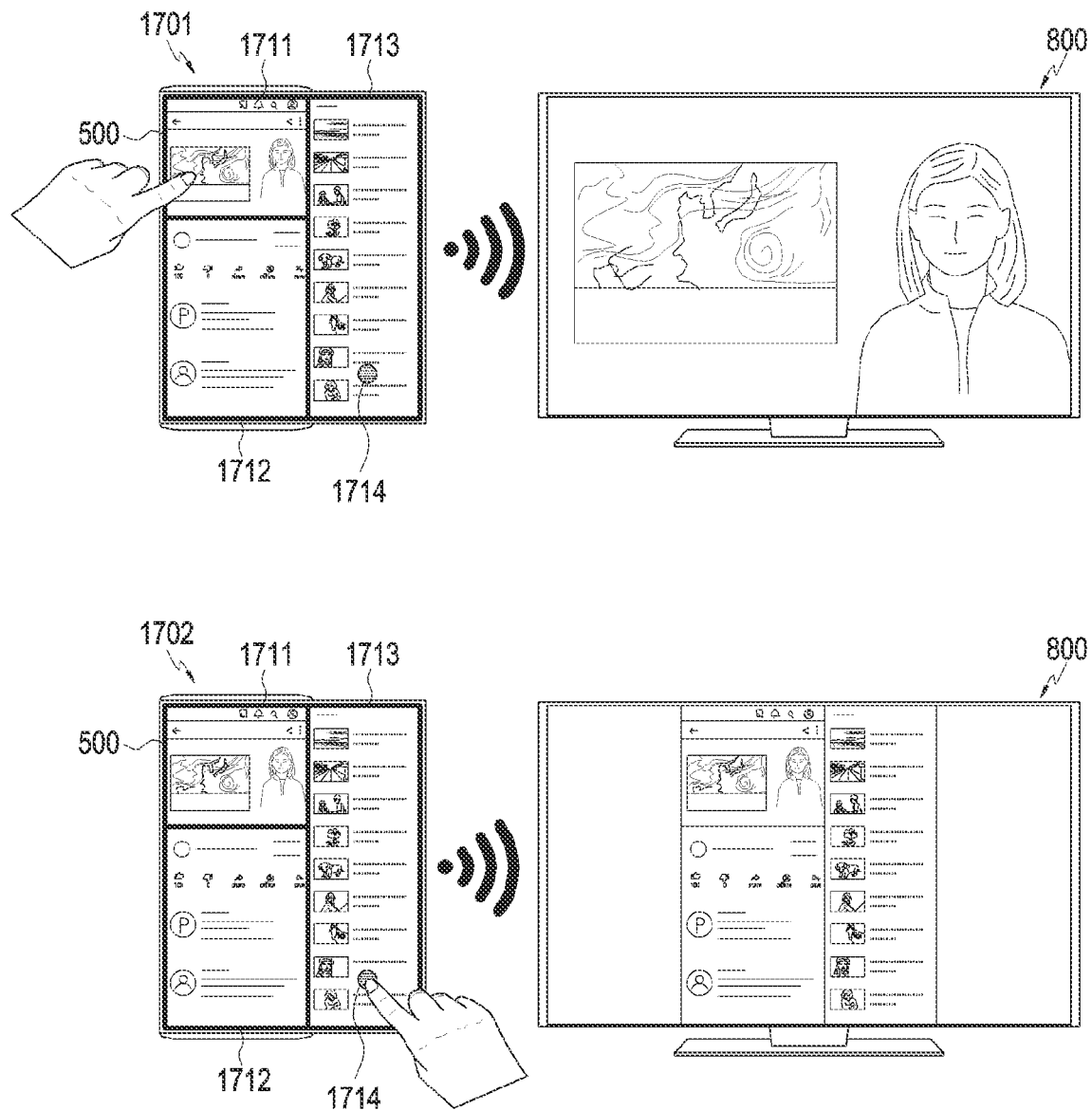
FIG. 17A is a view illustrating an example of an operation of transmitting, to an external electronic device, video data for at least a portion of a selected content of an electronic device according to various embodiments.
Figure 17B:
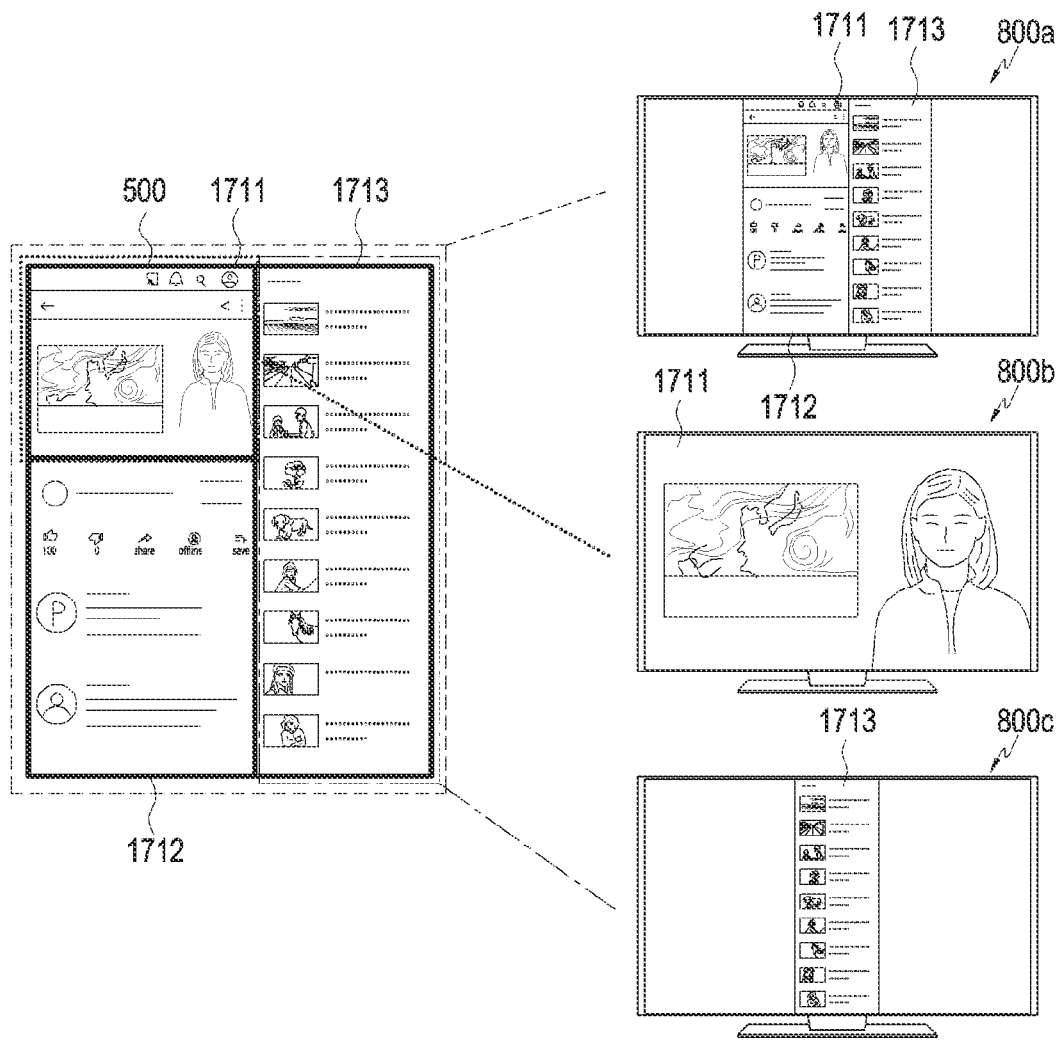
FIG. 17B is a view illustrating an example of an operation of transmitting, to different external electronic devices, video data for respective portions of a content of an electronic device according to various embodiments.

FIG. 16B is a view illustrating an example of an operation a wireless display operation for a portion of a content selected by a user of an electronic device 500 according to various embodiments;

FIG. 17A is a view illustrating an example of an operation of transmitting, to an external electronic device 800 (for example, the second electronic device 130 in FIG. 1 to FIG. 2), video data for at least a portion of a selected content of an electronic device 500 according to various embodiments. FIG. 17B is a view illustrating an example of an operation of transmitting, to different external electronic devices 800 (for example, the second electronic device 130 in FIG. 1 to FIG. 2), image data for respective portions of a content of an electronic device 500 according to various embodiments.

According to various embodiments, the electronic device 500 may display a first content on the first region (for example, A1) of the display 540 and configure communication connection with at least one external electronic device 800 (for example, the second electronic device 130 in FIG. 1 to FIG. 2) in operation 1601, and may transmit information on the first content to the external electronic device 800 (for example, the second electronic device 130 in FIG. 1 to FIG. 2) in operation 1603. For example, while displaying the first content (for example, the application execution screen) on a first region (for example, A1) of the display 540, the electronic device 500 (for example, the first electronic device 100 in FIG. 1 to FIG. 2) may configure communication connection with at least one external electronic device 800 (for example, the second electronic device 130 in FIG. 1 to FIG. 2), based on the performing an operation of configuring a session for wireless displaying. Here, the electronic device 500 may configure, as shown in FIG. 17A, a session for wireless displaying with single external electronic device 800 (for example, the second electronic device 130 in FIG. 1 to FIG. 2), or may configure, as shown in FIG. 17B, a session for wireless displaying with multiple external electronic devices 800a, 800b, and 800c (for example, the sink devices 130a and 130b in FIG. 1B). The electronic device 500 may obtain a first content and transmit video data obtained by processing the first content to at least one external electronic device 800, 800a, 800b, and 800c (for example, the second electronic device 130 in FIG. 1 to FIG. 2). Operations 1601 to 1603 of the electronic device 500 (for example, the first electronic device 100 in FIG. 1 to FIG. 2) are performed in the same manner as operations 1001 to 1005 of the electronic device 500 described above, and thus an overlapping description will be omitted.

According to various embodiments, in operation 1605, the electronic device 500 may determine whether a second region (for example, A2) of the display 540 is exposed, and when the second region (for example, A2) is determined to be exposed, in operation 1607, the electronic device may display a second content on a third region including the first region (for example, A1) and the second region (for example, A2) and transmit information on the second content to the external electronic device 800 (for example, the second electronic device 130 in FIG. 1 to FIG. 2). For example, while transmitting video data for the first content to the external electronic device 800 (for example, the second electronic device 130 in FIG. 1 to FIG. 2), the electronic device 500 may identify the withdrawal (or the open state of the electronic device 500) of the display 540, based on the operation of identifying the occurrence of the event configured to causing the sliding of the display 540 (or the first structure 101 or the first plate 111a) and/or the value obtained using the sensor 520. The electronic device 500 may display the second content on at least a portion of the first region (for example, A1) and the second region (for example, A2), based on the identification of the withdrawal of the display 540 (or the open state of the electronic device 500), produce video data with respect to the second content, and transmit the video data to the external electronic device 800 (for example, the second electronic device 130 in FIG. 1 to FIG. 2). Operations 1605 to 1607 of the electronic device 500 are performed in the same manner as operations 1007 to 1013 of the electronic device 500 described above, and thus an overlapping description will be omitted.

According to various embodiments, in operation 1609, the electronic device 500 may determine whether the withdrawal of the display 540 (for example, sliding of the first plate or the first structure) is completed. In an embodiment, when the value received from the sensor 520 is not obtained in a predetermined time, the electronic device 500 may determine that the withdrawal of the display 540 is completed. In an embodiment, when the value of the parameter (for example, the area of the display 540 exposed to the outside (or the length of the region in a direction (for example, the direction (for example, the horizontal direction, and X direction) in which the display 540 is inserted or withdrawn), the ratio of the exposed region and the received region of the display 540 (for example, the screen expansion ratio), or the distance by which the display 540 is currently withdrawn (or inserted)) related to the area of the exposed region of the display 540 identified based on the value obtained from the sensor 520 reaches a preconfigured target value, the electronic device 500 may determine that the withdrawal of the display 540 is completed. The preconfigured target value may be the value identified based on the sensor when the display 540 is maximally withdrawn or may be configured to various values corresponding to various withdrawal distance without being limited to what has been described.

According to the various embodiments, when the withdrawal of the display 540 is determined to be completed, the electronic device 500 may select a portion of the second content in operation 1611, and transmit information on the portion of the second content to the external electronic device 800 (for example, the second electronic device 130 in FIG. 1 to FIG. 2) in operation 1613. For example, referring to FIG. 16B, units of application execution screen 1700a and 1700b included in the content 1700 displayed on the display 540 or units of object 1700c, 1700d, and 1700e (for example, units of view) included in the screen may be wirelessly displayed. For example, the electronic device 500 may classify and identify portions 1700a, 1700b, 1700c, 1700d, and 1700e of the content 1700 displayed on the display 540 by the units of execution screen or units of view, and configure to enable the identified portions to be wirelessly displayed.

In an embodiment, as shown in FIG. 17A, the electronic device 500, may provide wirelessly displayable portions 1711, 1712, and 1713 from among the second content displayed on the first region (for example, A1) and the second region (for example, A2) of the display 540, and may produce, when a portion 1711 of the provided portions is selected, video data corresponding to the selected portion and transmit the same to the external electronic device 800 (for example, the second electronic device 130 in FIG. 1 to FIG. 2). For example, when the withdrawal of the display 540 is completed, the electronic device 500 may identify a portion corresponding to the application execution screen and/or a portion corresponding to the object of units of view included in the content (for example, the second content) displayed on the display 540. The electronic device 500 may obtain coordinates information corresponding to the identified portion of the second content. Thereafter, as shown in 1701 in FIG. 17A, when a user input is received, the electronic device 500 may compare the obtained coordinates information and the coordinates at which the user input is received with respect to the multiple portions, obtain a portion 1711 having a corresponding coordinates, produce the obtained portion 1711 into video data, and transmit the video data to the external electronic device 800 (for example, the second electronic device 130 in FIG. 1 to FIG. 2). For another example, as shown in 1702 in FIG. 17A, the electronic device 500 may display an object 1714 for selecting all portions of the second content, when the displayed object 1714 is selected, produce video data with respect to all portions of the second content, and transmit the video data to the external electronic device 800 (for example, the second electronic device 130 in FIG. 1 to FIG. 2).

In an embodiment, as shown in FIG. 17A, the electronic device 500 may produce video data with respect to each of at least a portion from among the wirelessly displayable portions 1711, 1712, and 1713 of the second content displayed on the first region (for example, A1) and the second region (for example, A2) of the display 540, and transmit the video data to different external electronic devices 800a, 800b, and 800c, as well. The transmitted video data with respect to at least a portion may be displayed on different external electronic devices 800a, 800b, and 800c. For example, the electronic device 500 may receive a user input for selecting at least one portion to be transmitted to different external electronic devices 800a, 800b, and 800c among the multiple portions 1711, 1712, and 1713 and transmit video data with respect to the selected portion to the external electronic devices 800a, 800b, and 800c. By way of example, when all portions 1711, 1712, and 1713 from among the multiple portions 1711, 1712, and 1713 are selected as the portions to be transmitted to a first external electronic device 800a, the electronic device 500 may produce video data with respect to the multiple portions and transmit the video data to the first external electronic device 800a. For another example, when a first portion 1711 from among the multiple portions and 1711, 1712, and 1313 is selected as the portion to be transmitted to a second external electronic device 800b, the electronic device 500 may produce video data with respect to the first portion 1711 and transmit the video data to the second external electronic device 800b. For another example, when a third portion 1713 from among the multiple portions 1711, 1712, and 1713 is selected as the portion to be transmitted to a third external electronic device 800c, the electronic device 500 may produce video data with respect to the third portion 1713 and transmit the video data to the third external electronic device 800c.

According to various embodiments, when the video data corresponding to the selected portion of the second content is produced, the electronic device 500 may select a value for at least one parameter (for example, a parameter related to the video quality and/or a parameter related to the transmission) related to the wireless displaying, based on the area of the selected portion. For example, the electronic device 500 may select a value for the parameter related to the video quality and/or the parameter related to the transmission to be inversely proportional to the area of the selected portion of the second content.

However, the disclosure is not limited what is described and/or shown, and the operation of producing video data with respect to the portion of the content displayed on the display 540 having completed insertion and transmitting the video data to the external electronic device 800 (for example, the second electronic device 130 in FIG. 1 to FIG. 2) may be performed in the same manner as the operation of producing video data with respect to the portion of the content displayed on the display 540 having completed withdrawal and transmitting the video data to the external electronic device 800 (for example, the second electronic device 130 in FIG. 1 to FIG. 2), and an overlapping description will be omitted.

Hereinafter, an example of an operation of an electronic device 500 according to various embodiments will be described.

According to various embodiments, the electronic device 500 (for example, the first electronic device 100 in FIG. 1 to FIG. 2) may provide a graphic object 1900 for selecting a portion of the content displayed on the display 540, produce at least a portion of the content into video data based on the graphic object 1900, and transmit the video data to the external electronic device 800 (for example, the second electronic device 130 in FIG. 1 to FIG. 2).

Figure 18:
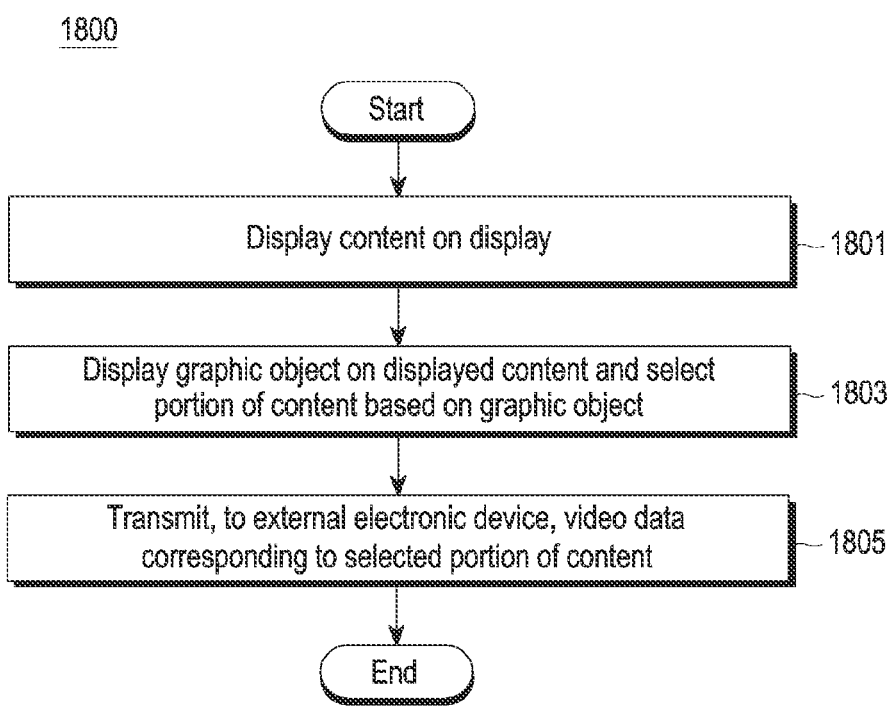
FIG. 18 is a flowchart illustrating an example of an operation of an electronic device according to various embodiments.

FIG. 18 is a flowchart 1800 illustrating an example operation of an electronic device 500 according to various embodiments. According to various embodiments, the operations shown in FIG. 18 are not limited to the described order and may be performed in various orders. In addition, according to various embodiments, more operations or the fewer operations than the operations shown in FIG. 18 may be performed. Hereinafter, FIG. 18 will be described with reference to FIG. 19A to FIG. 19B.

Figure 19A:
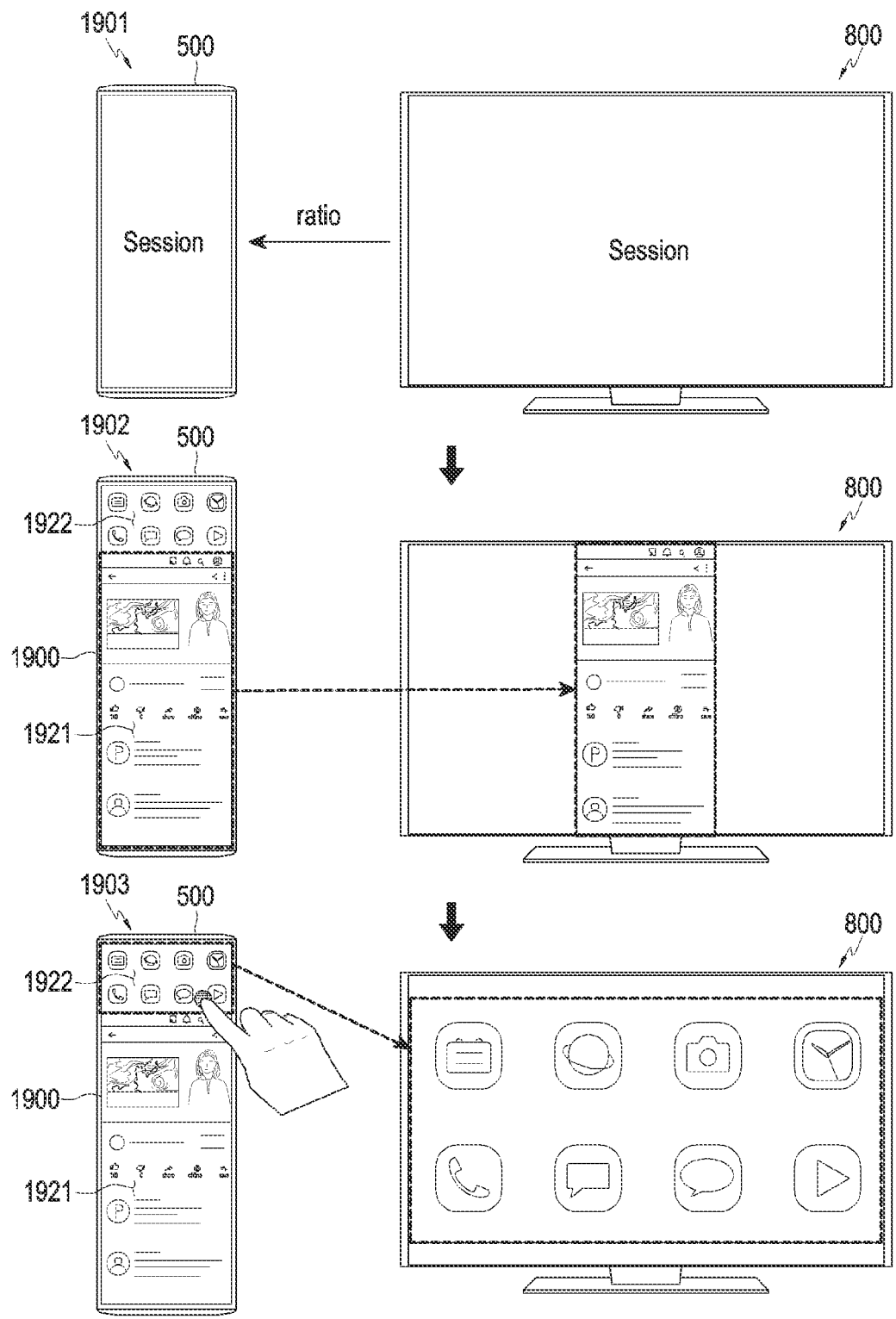
FIG. 19A is a view illustrating an example of an operation of providing a guide line for selecting at least a portion of a content of an electronic device according to various embodiments.
Figure 19B:
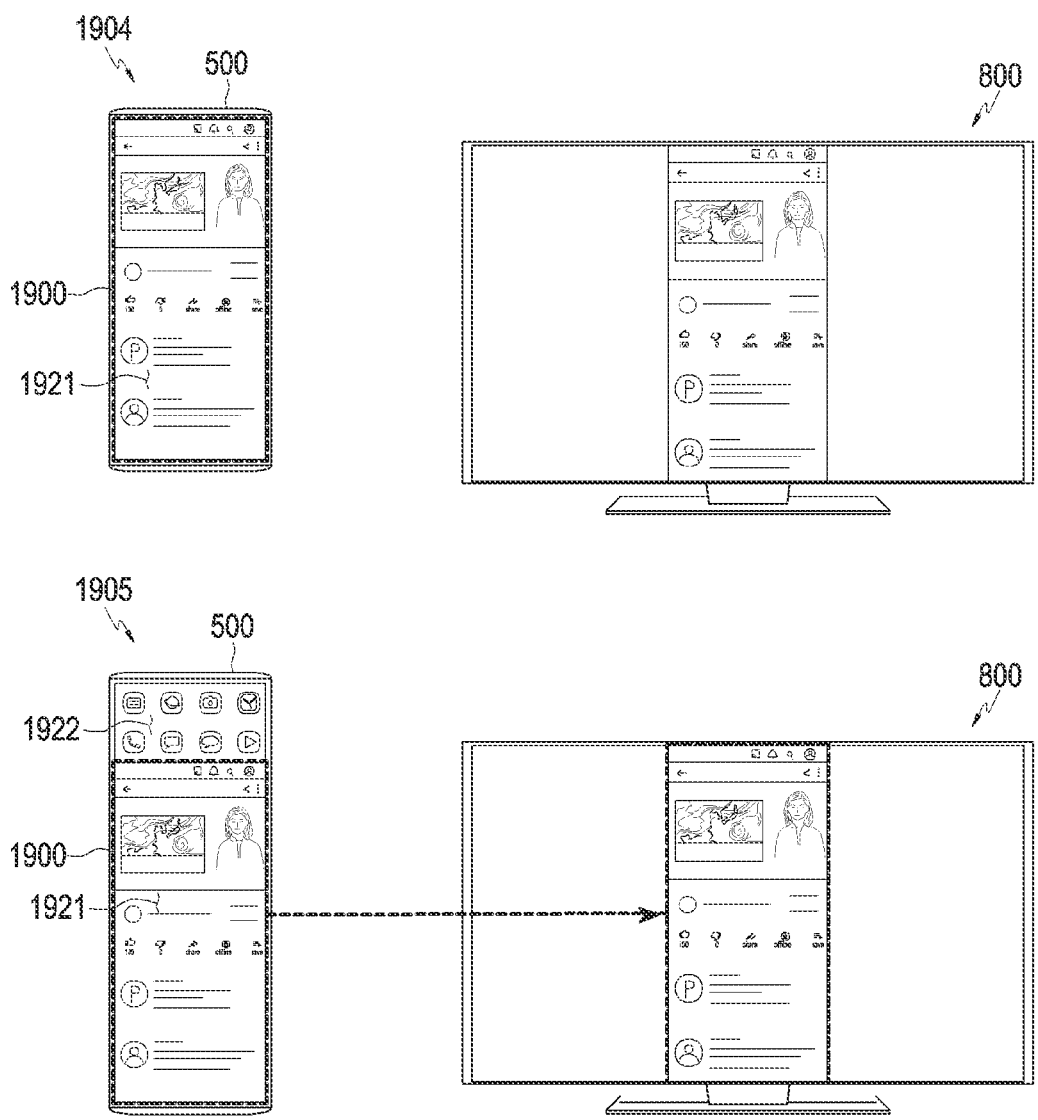
FIG. 19B is a view illustrating an example of an operation of transmitting, to an external electronic device, only video data for a content previously having been displayed when a display of an electronic device is withdrawn according to various embodiments.

FIG. 19A is a view illustrating an example of an operation of providing a graphic object 1900 for selecting at least a portion of a content of an electronic device 500 according to various embodiments. FIG. 19B is a view illustrating an example of an operation of transmitting, when the display 540 of the electronic device 500 according to various embodiments is withdrawn, only the video data with respect to the previously displayed content to an external electronic device 800 (for example, the second electronic device 130 in FIG. 1 to FIG. 2).

According to various embodiments, the electronic device 500 may display a content on the display 540 in operation 1801, display the graphic object 1900 on the displayed content in operation 1803, and select a portion of the content based on the graphic object 1900. For example, electronic device 500 may configure communication connection with the external electronic device 800 (for example, the second electronic device 130 in FIG. 1 to FIG. 2) for wireless displaying, and during displaying a content on the display 540, provide the graphic object 1900 (for example, a guideline) for selecting a portion of the displayed content. The graphic object 1900 may be implemented to include, as shown in FIG. 19A and FIG. 19B, an outline and an inner region having a predetermined color (or transparent), but is not limited what is shown and may be implemented in various ways. For example, while performing at least a portion of the procedures for wireless displaying (for example, WFD device discovery 201, WFD service discovery 203, WFD connection setup 209, or capability exchange and negotiation 211) as shown in 1901 in FIG. 19A, the electronic device 500 may receive information related to the display 810 (for example, information on the size of the display 810 and information on the ratio of the display 810) of the external electronic device 800 (for example, the second electronic device 130 in FIG. 1 to FIG. 2) from the external electronic device 800 (for example, the second electronic device 130 in FIG. 1 to FIG. 2). As shown in 1902 in FIG. 19A, the electronic device 500 may produce and provide the graphic object 1900 having an area maximally displayable on the display 810 of the external electronic device 800 (for example, the second electronic device 130 in FIG. 1 to FIG. 2), based on the received information related to the display 810 the external electronic device 800 (for example, the second electronic device 130 in FIG. 1 to FIG. 2). The graphic object 1900 may be implemented to be selected (for example, the outline of the graphic object 1900 is touched or the inner region inside the outline of the graphic object 1900 is touched) by a user, dragged, and moved. The electronic device 500 may select at least a portion 1921 selected (for example, where the graphic object 1900 locates) by the provided graphic object 1900 from among portions 1921 and 1922 of a content. As described above, portions in units of execution screen and/or in units of view of the content may be separated to be wirelessly displayable, and the separated portion of the content may be selected by the graphic object 1900.

According to various embodiments, the electronic device 500 may modify the graphic object 1900 to correspond to the area of a portion of a content adjacent to the graphic object 1900 corresponds and select the portion of the adjacent content. For example, as shown in 1902 and 1903 in FIG. 9A, when the graphic object 1900 moves to be positioned adjacent (or within a predetermined distance) to a portion 1922 (for example, a menu screen) of a wirelessly displayable content, the electronic device 500 may modify the area of the graphic object 1900 to correspond to the area of the portion 1922 of the content and position the graphic object 1900 so that the outline of the graphic object 1900 corresponds to the boundary line of the portion 1922 of the content. Accordingly, a user may conveniently select the portion 1922 of the wirelessly displayable content using the graphic object 1900.

According to various embodiments, the electronic device 500 may provide the graphic object 1900 when a predetermined condition is satisfied. In an embodiment, as shown in 1902 in FIG. 19A, the electronic device 500 may identify the satisfaction of the predetermined condition when the display 540 is withdrawn maximally or by predetermined distance and provide the graphic object 1900. In an embodiment, the electronic device 500 may identify the satisfaction of the predetermined condition based on the information on the application currently being executed in the foreground mode, and provide the graphic object 1900. For example, the electronic device 500 may identify the satisfaction of the predetermined condition when obtaining, from the application currently being executed in a foreground mode, information indicating the execution screen of the application is incapable of changing according to the area of the display 540. In this case, as shown in 1904 to 1905 in FIG. 19B, the electronic device 500 may provide the graphic object 1900 from the time point at which the display 540 is withdrawn, continuously obtain the existing content 1921 (for example, the execution screen of the application) based on the graphic object 1900 irrelevant to the withdrawal of the display 540 (for example, even a new content 1922 is displayed as the display 540 is withdrawn), and transmit video data to the external electronic device 800 (for example, the second electronic device 130 in FIG. 1 to FIG. 2). However, the disclosure is not limited to what is shown in FIG. 19B, and the electronic device 500 may obtain, without providing the graphic object 1900, a content (or a content displayed on the display 540 in the closed state) positioned on a region of the display 540 maximally displayable to the external electronic device 800 (for example, the second electronic device 130 in FIG. 1 to FIG. 2) and transmit video data to the external electronic device 800 (for example, the second electronic device 130 in FIG. 1 to FIG. 2). Alternatively, without limitation to what is described, the electronic device 500 may identify the satisfaction of the predetermined condition based on a configuration of a user, and provide the graphic object 1900.

According to various embodiments, in operation 1805, the electronic device 500 may transmit video data corresponding to the selected portion of the content to the external electronic device 800 (for example, the second electronic device 130 in FIG. 1 to FIG. 2). The electronic device 500 may produce video data with at least a portion of the content selected by the graphic object 1900 (for example, at which the graphic object 1900 is positioned), and transmit the produced video date to the external electronic device 800 (for example, the second electronic device 130 in FIG. 1 to FIG. 2).

Hereinafter, an example of an electronic device 2001 applicable to the aforementioned electronic devices (for example, the first electronic device 100, the second electronic device 130, the electronic device 500, and the external electronic device 800) will be described.

Figure 20:
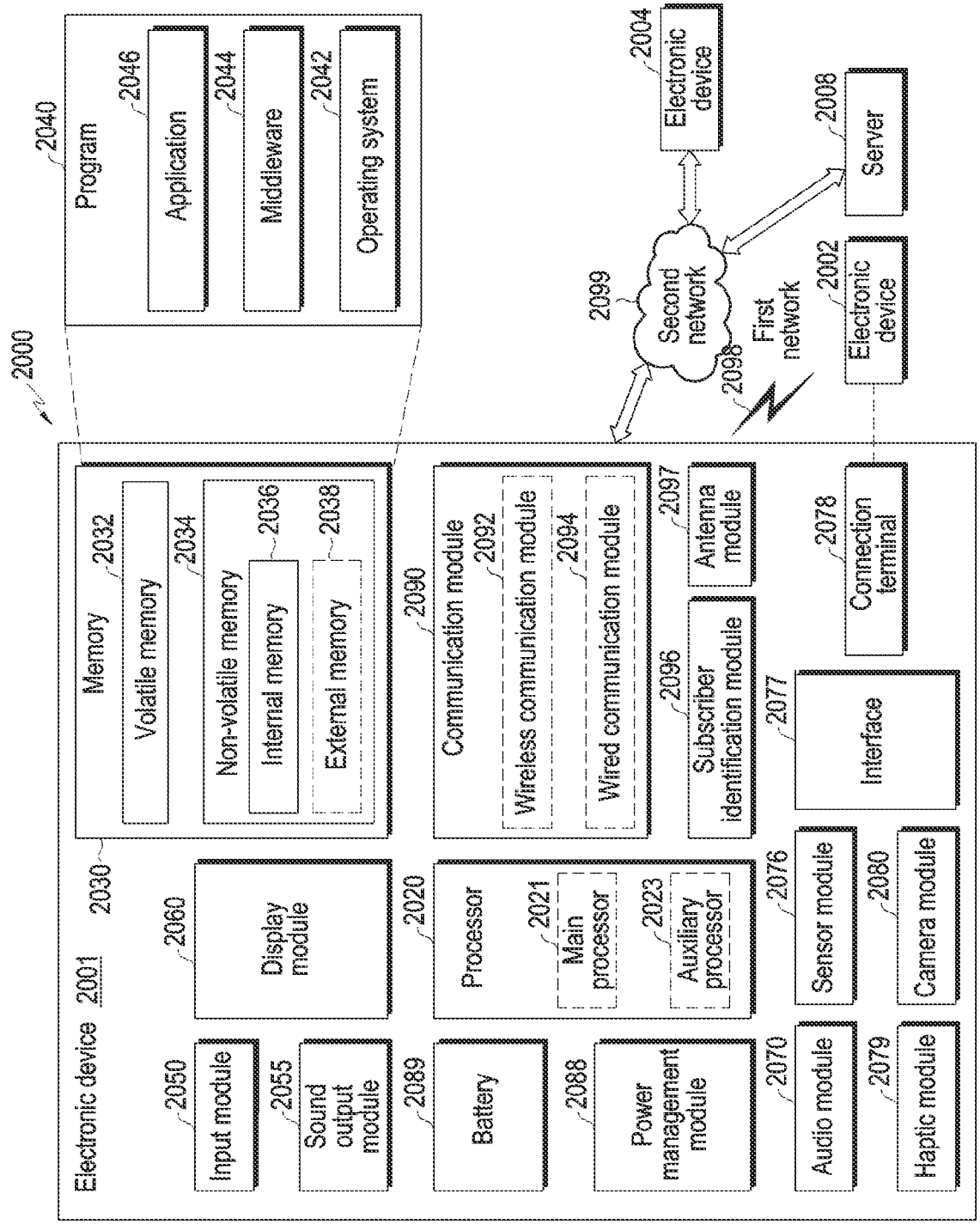
FIG. 20 is a block diagram of an electronic device in a network environment according to various embodiments.

FIG. 20 is a block diagram illustrating an electronic device 2001 in a network environment 2000 according to various embodiments. Referring to FIG. 20, the electronic device 2001 in the network environment 2000 may communicate with an electronic device 2002 via a first network 2098 (e.g., a short-range wireless communication network), or at least one of an electronic device 2004 or a server 2008 via a second network 2099 (e.g., a long-range wireless communication network). According to an embodiment, the electronic device 2001 may communicate with the electronic device 2004 via the server 2008. According to an embodiment, the electronic device 2001 may include a processor 2020, memory 2030, an input module 2050, a sound output module 2055, a display module 2060, an audio module 2070, a sensor module 2076, an interface 2077, a connecting terminal 2078, a haptic module 2079, a camera module 2080, a power management module 2088, a battery 2089, a communication module 2090, a subscriber identification module (SIM) 2096, or an antenna module 2097. In various embodiments, at least one of the components (e.g., the connecting terminal 2078) may be omitted from the electronic device 2001, or one or more other components may be added in the electronic device 2001. In various embodiments, some of the components (e.g., the sensor module 2076, the camera module 2080, or the antenna module 2097) may be implemented as a single component (e.g., the display module 2060).

The processor 2020 may execute, for example, software (e.g., a program 2040) to control at least one other component (e.g., a hardware or software component) of the electronic device 2001 coupled with the processor 2020, and may perform various data processing or computation. According to an embodiment, as at least part of the data processing or computation, the processor 2020 may store a command or data received from another component (e.g., the sensor module 2076 or the communication module 2090) in volatile memory 2032, process the command or the data stored in the volatile memory 2032, and store resulting data in non-volatile memory 2034. According to an embodiment, the processor 2020 may include a main processor 2021 (e.g., a central processing unit (CPU) or an application processor (AP)), or an auxiliary processor 2023 (e.g., a graphics processing unit (GPU), a neural processing unit (NPU), an image signal processor (ISP), a sensor hub processor, or a communication processor (CP)) that is operable independently from, or in conjunction with, the main processor 2021. For example, when the electronic device 2001 includes the main processor 2021 and the auxiliary processor 2023, the auxiliary processor 2023 may be adapted to consume less power than the main processor 2021, or to be specific to a specified function. The auxiliary processor 2023 may be implemented as separate from, or as part of the main processor 2021.

The auxiliary processor 2023 may control, for example, at least some of functions or states related to at least one component (e.g., the display module 2060, the sensor module 2076, or the communication module 2090) among the components of the electronic device 2001, instead of the main processor 2021 while the main processor 2021 is in an inactive (e.g., sleep) state, or together with the main processor 2021 while the main processor 2021 is in an active (e.g., executing an application) state. According to an embodiment, the auxiliary processor 2023 (e.g., an image signal processor or a communication processor) may be implemented as part of another component (e.g., the camera module 2080 or the communication module 2090) functionally related to the auxiliary processor 2023. According to an embodiment, the auxiliary processor 2023 (e.g., the neural processing unit) may include a hardware structure specified for artificial intelligence model processing. An artificial intelligence model may be generated by machine learning. Such learning may be performed, e.g., by the electronic device 2001 where the artificial intelligence model is performed or via a separate server (e.g., the server 2008). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 2030 may store various data used by at least one component (e.g., the processor 2020 or the sensor module 2076) of the electronic device 2001. The various data may include, for example, software (e.g., the program 2040) and input data or output data for a command related thereto. The memory 2030 may include the volatile memory 2032 or the non-volatile memory 2034.

The program 2040 may be stored in the memory 2030 as software, and may include, for example, an operating system (OS) 2042, middleware 2044, or an application 2046.

The input module 2050 may receive a command or data to be used by another component (e.g., the processor 2020) of the electronic device 2001, from the outside (e.g., a user) of the electronic device 2001. The input module 2050 may include, for example, a microphone, a mouse, a keyboard, a key (e.g., a button), or a digital pen (e.g., a stylus pen).

The sound output module 2055 may output sound signals to the outside of the electronic device 2001. The sound output module 2055 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 2060 may visually provide information to the outside (e.g., a user) of the electronic device 2001. The display module 2060 may include, for example, a display, a hologram device, or a projector and control circuitry to control a corresponding one of the display, hologram device, and projector. According to an embodiment, the display module 2060 may include a touch sensor adapted to detect a touch, or a pressure sensor adapted to measure the intensity of force incurred by the touch.

The audio module 2070 may convert a sound into an electrical signal and vice versa. According to an embodiment, the audio module 2070 may obtain the sound via the input module 2050, or output the sound via the sound output module 2055 or an external electronic device (e.g., an electronic device 2002 (e.g., a speaker or a headphone)) directly or wirelessly coupled with the electronic device 2001.

The sensor module 2076 may detect an operational state (e.g., power or temperature) of the electronic device 2001 or an environmental state (e.g., a state of a user) external to the electronic device 2001, and then generate an electrical signal or data value corresponding to the detected state. According to an embodiment, the sensor module 2076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 2077 may support one or more specified protocols to be used for the electronic device 2001 to be coupled with the external electronic device (e.g., the electronic device 2002) directly or wirelessly. According to an embodiment, the interface 2077 may include, for example, a high definition multimedia interface (HDMI), a universal serial bus (USB) interface, a secure digital (SD) card interface, or an audio interface.

A connecting terminal 2078 may include a connector via which the electronic device 2001 may be physically connected with the external electronic device (e.g., the electronic device 2002). According to an embodiment, the connecting terminal 2078 may include, for example, an HDMI connector, a USB connector, an SD card connector, or an audio connector (e.g., a headphone connector).

The haptic module 2079 may convert an electrical signal into a mechanical stimulus (e.g., a vibration or a movement) or electrical stimulus which may be recognized by a user via his tactile sensation or kinesthetic sensation. According to an embodiment, the haptic module 2079 may include, for example, a motor, a piezoelectric element, or an electric stimulator.

The camera module 2080 may capture a still image or moving images. According to an embodiment, the camera module 2080 may include one or more lenses, image sensors, image signal processors, or flashes.

The power management module 2088 may manage power supplied to the electronic device 2001. According to an embodiment, the power management module 2088 may be implemented as at least part of, for example, a power management integrated circuit (PMIC).

The battery 2089 may supply power to at least one component of the electronic device 2001. According to an embodiment, the battery 2089 may include, for example, a primary cell which is not rechargeable, a secondary cell which is rechargeable, or a fuel cell.

The communication module 2090 may support establishing a direct (e.g., wired) communication channel or a wireless communication channel between the electronic device 2001 and the external electronic device (e.g., the electronic device 2002, the electronic device 2004, or the server 2008) and performing communication via the established communication channel. The communication module 2090 may include one or more communication processors that are operable independently from the processor 2020 (e.g., the application processor (AP)) and supports a direct (e.g., wired) communication or a wireless communication. According to an embodiment, the communication module 2090 may include a wireless communication module 2092 (e.g., a cellular communication module, a short-range wireless communication module, or a global navigation satellite system (GNSS) communication module) or a wired communication module 2094 (e.g., a local area network (LAN) communication module or a power line communication (PLC) module). A corresponding one of these communication modules may communicate with the external electronic device 2004 via the first network 2098 (e.g., a short-range communication network, such as Bluetooth™ wireless-fidelity (Wi-Fi) direct, or infrared data association (IrDA)) or the second network 2099 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 2092 may identify or authenticate the electronic device 2001 in a communication network, such as the first network 2098 or the second network 2099, using subscriber information (e.g., international mobile subscriber identity (IMSI)) stored in the subscriber identification module 2096.

The wireless communication module 2092 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 2092 may support a high-frequency band (e.g., the mmWave band) to achieve, e.g., a high data transmission rate. The wireless communication module 2092 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 2092 may support various requirements specified in the electronic device 2001, an external electronic device (e.g., the electronic device 2004), or a network system (e.g., the second network 2099). According to an embodiment, the wireless communication module 2092 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 2097 may transmit or receive a signal or power to or from the outside (e.g., the external electronic device) of the electronic device 2001. According to an embodiment, the antenna module 2097 may include an antenna including a radiating element including a conductive material or a conductive pattern formed in or on a substrate (e.g., a printed circuit board (PCB)). According to an embodiment, the antenna module 2097 may include a plurality of antennas (e.g., array antennas). In such a case, at least one antenna appropriate for a communication scheme used in the communication network, such as the first network 2098 or the second network 2099, may be selected, for example, by the communication module 2090 from the plurality of antennas. The signal or the power may then be transmitted or received between the communication module 2090 and the external electronic device via the selected at least one antenna. According to an embodiment, another component (e.g., a radio frequency integrated circuit (RFIC)) other than the radiating element may be additionally formed as part of the antenna module 2097.

According to various embodiments, the antenna module 2097 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 2001 and the external electronic device 2004 via the server 2008 coupled with the second network 2099. Each of the external electronic devices 2002 or 2004 may be a device of a same type as, or a different type, from the electronic device 2001. According to an embodiment, all or some of operations to be executed at the electronic device 2001 may be executed at one or more of the external electronic devices 2002, 2004, or 2008. For example, if the electronic device 2001 should perform a function or a service automatically, or in response to a request from a user or another device, the electronic device 2001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 2001. The electronic device 2001 may provide the outcome, with or without further processing of the outcome, as at least part of a reply to the request. To that end, a cloud computing, distributed computing, mobile edge computing (MEC), or client-server computing technology may be used, for example. The electronic device 2001 may provide ultra low-latency services using, e.g., distributed computing or mobile edge computing. In an embodiment, the external electronic device 2004 may include an internet-of-things (IoT) device. The server 2008 may be an intelligent server using machine learning and/or a neural network. According to an embodiment, the external electronic device 2004 or the server 2008 may be included in the second network 2099. The electronic device 2001 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 2040) including one or more instructions that are stored in a storage medium (e.g., internal memory 2036 or external memory 2038) that is readable by a machine (e.g., the electronic device 2001). For example, a processor (e.g., the processor 2020) of the machine (e.g., the electronic device 2001) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added. According to various embodiments, there may be provided an electronic device (for example, the first electronic device 100 in FIG. 1 to FIG. 2 and the electronic device 500 in FIG. 5) including: a housing (for example, the first structure 301 or the second structure 302 in FIG. 3A to FIG. 3C), a flexible display (for example, the display 540 in FIG. 5) capable of changing a size of a region visible to the outside of the housing (for example, the first structure 301 or the second structure 302 in FIG. 3A to FIG. 3C), a communication circuit (for example, the communication circuit 530 in FIG. 5) for enabling transmitting or receiving data to or from an external electronic device, at least one sensor (for example, the sensor 520 in FIG. 5) configured to identify the size of the region where the flexible display (for example, the display 540 in FIG. 5) is visible to the outside of the housing (for the first structure 301 or the second structure 302 in FIG. 3A to FIG. 3C), a memory (for example, the memory 550 in FIG. 5), and at least one processor, wherein the at least one processor is configured to: control the display to display first content on a first region of the flexible display (for example, the display 540 in FIG. 5) where the flexible display (for example, the display 540 in FIG. 5) is visible to the outside of the housing (for example, the first structure 301 or the second structure 302 in FIG. 3A to FIG. 3C), establish communication connection with an external electronic device (for example, the second electronic device 130 in FIG. 1 to FIG. 2 and the external electronic device 800 in FIG. 8) through the communication circuit (for example, the communication circuit 530 in FIG. 5), control the communication circuit to transmit, based on the establishing of the communication connection, first information on the first content to the external electronic device (for example, the second electronic device 130 in FIG. 1 to FIG. 2 and the external electronic device 800 in FIG. 8) so that the external electronic device (for example, the second electronic device 130 in FIG. 1 to FIG. 2 and the external electronic device 800 in FIG. 8) displays the first content, based on a second region where the flexible display (for example, the display 540 in FIG. 5) located inside the housing (for example, the first structure 301 or the second structure 302 in FIG. 3A to FIG. 3C) being visible to the outside of the housing (for example, the first structure 301 or the second structure 302 in FIG. 3A to FIG. 3C), display second content on a third region including the first region and the second region, based on at least one value obtained using the at least one sensor (for example, the sensor 520 in FIG. 5), identify second information with respect to the second content, to be transmitted to the external electronic device, based on the at least one value obtained based on the visibility of the second region, and transmit the identified second information to the external electronic device (for example, the second electronic device 130 in FIG. 1 to FIG. 2 and the external electronic device 800 in FIG. 8) through the communication circuit (for example, the communication circuit 530 in FIG. 5) so that the external electronic device (for example, the second electronic device 130 in FIG. 1 to FIG. 2 and the external electronic device 800 in FIG. 8) displays the second content.

According to various embodiments, there may be provided the electronic device (for example, the first electronic device 100 in FIG. 1 to FIG. 2 and the electronic device 500 in FIG. 5), wherein the at least one processor is configured to: transmit a message including information related to withdrawal or insertion of the flexible display (for example, the display 540 in FIG. 5) to the external electronic device (for example, the second electronic device 130 in FIG. 1 to FIG. 2 and the external electronic device 800 in FIG. 8) as at least a part of the operation of establishing of the communication connection with an external electronic device (for example, the second electronic device 130 in FIG. 1 to FIG. 2 and the external electronic device 800 in FIG. 8) through the communication circuit (for example, the communication circuit 530 in FIG. 5).

According to various embodiments, there may be provided the electronic device (for example, the first electronic device 100 in FIG. 1 to FIG. 2 and the electronic device 500 in FIG. 5), wherein the information related to the withdrawal or insertion of the display (for example, the display 540 in FIG. 5) includes information indicating that the electronic device is capable of changing the size of the region of the flexible display (for example, the display 540 in FIG. 5) of the electronic device (for example, the first electronic device 100 in FIG. 1 to FIG. 2 and the electronic device 500 in FIG. 5) visible to the outside of the housing (for example, the first structure 301 or the second structure 302 in FIG. 3A to FIG. 3C).

According to various embodiments, there may be provided the electronic device (for example, the first electronic device 100 in FIG. 1 to FIG. 2 and the electronic device 500 in FIG. 5), wherein the at least one processor is configured to: identify region information on the first region based on the first region being visible, obtain first video data corresponding to the first content displayed on the first region based on the identified region information on the first region, transmit the obtained first video data to the external electronic device (for example, the second electronic device 130 in FIG. 1 to FIG. 2 and the external electronic device 800 in FIG. 8) through the communication circuit (for example, the communication circuit 530 in FIG. 5), identify region information on the third region including the first region and the second region based on the first region and the second region being visible while the communication connection between the electronic device (for example, the first electronic device 100 in FIG. 1 to FIG. 2 and the electronic device 500 in FIG. 5) and the external electronic device (for example, the second electronic device 130 in FIG. 1 to FIG. 2 and the external electronic device 800 in FIG. 8) is maintained, obtain second video data corresponding to the second content displayed on the third region including the first region and the second region based on the identified region information on the third region, and transmit the obtained second video data to the external electronic device (for example, the second electronic device 130 in FIG. 1 to FIG. 2 and the external electronic device 800 in FIG. 8) through the communication circuit (for example, the communication circuit 530 in FIG. 5).

According to various embodiments, there may be provided the electronic device (for example, the first electronic device 100 in FIG. 1 to FIG. 2 and the electronic device 500 in FIG. 5), wherein the at least one processor is configured to: identify, based on the first region and the second region being visible, a parameter related to the size of the third region including the first region and the second region of the flexible display (for example, the display 540 in FIG. 5) visible to the outside, based on at least one value obtained using the at least one sensor (for example, the sensor 520 in FIG. 5), and obtain the information on the third region including the first region and the second region different from the information on the first region, based on the identified parameter.

According to various embodiments, there may be provided the electronic device (for example, the first electronic device 100 in FIG. 1 to FIG. 2 and the electronic device 500 in FIG. 5), wherein the information on the first region includes a value of at least one of reference coordinates, a width, or a length, and the at least one processor is configured to change, based on the identified parameter, at least one of the reference coordinates, the width, or the length to obtain the information on the third region including the first region and the second region.

According to various embodiments, there may be provided the electronic device (for example, the first electronic device 100 in FIG. 1 to FIG. 2 and the electronic device 500 in FIG. 5), wherein the at least one processor is configured to: obtain, based on the first region being visible, first video data corresponding to the first content based on a first value for the at least one first parameter related to the quality of the first content, and obtain, based on the first region and the second region being visible, second video data corresponding to the second content based on a second value different from the first value for the at least one first parameter.

According to various embodiments, there may be provided the electronic device (for example, the first electronic device 100 in FIG. 1 to FIG. 2 and the electronic device 500 in FIG. 5), wherein the at least one first parameter related to the quality of the first content include at least one of resolution, a frame rate, or color depth.

According to various embodiments, there may be provided the electronic device (for example, the first electronic device 100 in FIG. 1 to FIG. 2 and the electronic device 500 in FIG. 5), wherein the memory (for example, the memory 550 in FIG. 5) stores information on a plurality of formats each including the value for the at least one first parameter, and the at least one processor is configured to: select, based on the first region being visible, a first format corresponding to the first value for the at least one first parameter from among the plurality of formats, obtain the first video data by encoding the first content based on the first format, select, based on the first region and the second region being visible, a second format corresponding to the second value for the at least one second parameter from among the plurality of formats, and obtain the second video data by encoding the second content based on the second format.

According to various embodiments, there may be provided the electronic device (for example, the first electronic device 100 in FIG. 1 to FIG. 2 and the electronic device 500 in FIG. 5), wherein the at least one processor is configured to: transmit, based on the first region and the second region being visible, a message including information indicating the second value for the at least one second parameter corresponding to the selected second format to the external electronic device (for example, the second electronic device 130 in FIG. 1 to FIG. 2 and the external electronic device 800 in FIG. 8) through the communication circuit (for example, the communication circuit 530 in FIG. 5), and obtain, by encoding the second content based on the second format, the second video data based on a response message received from the external electronic device (for example, the second electronic device 130 in FIG. 1 to FIG. 2 and the external electronic device 800 in FIG. 8) through the communication circuit (for example, the communication circuit 530 in FIG. 5).

According to various embodiments, there may be provided the electronic device (for example, the first electronic device 100 in FIG. 1 to FIG. 2 and the electronic device 500 in FIG. 5), wherein the at least one processor is configured to: transmit, based on the first region being visible, based on a first value for a bit rate, the video data to the external electronic device (for example, the second electronic device 130 in FIG. 1 to FIG. 2 and the external electronic device 800 in FIG. 8) through the communication circuit (for example, the communication circuit 530 in FIG. 5), and transmit, based on the first region and the second region being visible, based on a second value lower than the first value for a bit rate, the video data to the external electronic device (for example, the second electronic device 130 in FIG. 1 to FIG. 2 and the external electronic device 800 in FIG. 8) through the communication circuit (for example, the communication circuit 530 in FIG. 5).

According to various embodiments, there may be provided the electronic device (for example, the first electronic device 100 in FIG. 1 to FIG. 2 and the electronic device 500 in FIG. 5), wherein the at least one processor is configured to select the second value for the at least one first parameter and the second value for the bit rate, based on the size of the third region including the first region and the second region.

According to various embodiments, there may be provided the electronic device (for example, the first electronic device 100 in FIG. 1 to FIG. 2 and the electronic device 500 in FIG. 5), wherein the at least one processor is configured to: determine whether the withdrawal of the flexible display (for example, the display 540 in FIG. 5) is completed to enable the first region and the second region of the flexible display (for example, the display 540 in FIG. 5) to be visible to the outside of the housing (for example, the first structure 301 or the second structure 302 in FIG. 3A to FIG. 3C), select, based on the withdrawal of the flexible display (for example, the display 540 in FIG. 5) being completed, at least a portion of the second content displayed on the third region including the first region and the second region, obtain third video data with respect to the selected at least a portion of the second content, and transmit the obtained third video data to the external electronic device (for example, the second electronic device 130 in FIG. 1 to FIG. 2 and the external electronic device 800 in FIG. 8) through the communication circuit.

According to various embodiments, there may be provided the electronic device (for example, the first electronic device 100 in FIG. 1 to FIG. 2 and the electronic device 500 in FIG. 5), wherein the second content includes a plurality of portions, each of the multiple portions including a specific application execution screen or a specific view of an application execution screen, and the at least one processor is configured to receive an input for selecting a first portion selected from among the plurality of portions of the second content and obtain the third video data with respect to the first portion.

According to various embodiments, there may be provided the electronic device (for example, the first electronic device 100 in FIG. 1 to FIG. 2 and the electronic device 500 in FIG. 5), wherein the at least one processor is configured to: configure, through the communication circuit (for example, the communication circuit 530 in FIG. 5), communication connection with a first external electronic device (for example, one of a plurality of external electronic devices 800*a*, 800*b*, and 800*c* in FIG. 17B) and a second external electronic device (for example, another one of a plurality of external electronic devices 800*a*, 800*b*, and 800*c* in FIG. 17B), obtain fourth video data with respect to the first portion of the second content, transmit, through the communication circuit (for example, the communication circuit 530 in FIG. 5), the fourth video data to the first external electronic device (for example, the second electronic device 130 in FIG. 1 to FIG. 2 and the external electronic device 800 in FIG. 8), obtain fifth video data with respect to the second portion of the second content, and transmit, through the communication circuit (for example, the communication circuit 530 in FIG. 5), the fifth video data to the second external electronic device (for example, the second electronic device 130 in FIG. 1 to FIG. 2 and the external electronic device 800 in FIG. 8).

According to various embodiments, there may be provided the electronic device (for example, the first electronic device 100 in FIG. 1 to FIG. 2 and the electronic device 500 in FIG. 5), wherein the at least one processor is configured to: display an object having a specific size on the second content, based on information related to the display of the external electronic device (for example, the second electronic device 130 in FIG. 1 to FIG. 2 and the external electronic device 800 in FIG. 8) received from the external electronic device (for example, the second electronic device 130 in FIG. 1 to FIG. 2 and the external electronic device 800 in FIG. 8), the object being configured to have a specific size being configured to be movable based on an input, and identify at least a portion of the second content corresponding to the position of the object.

According to various embodiments, a method for operating an electronic device (for example, the first electronic device 100 in FIG. 1 to FIG. 2 and the electronic device 500 in FIG. 5) may include an operation of displaying first content on a first region of the flexible display (for example, the display 540 in FIG. 5) visible to outside of the housing (for example, the first structure 301 or the second structure 302 in FIG. 3A to FIG. 3C), the flexible display being capable of changing a size of a region thereof visible to the outside of the housing (for example, the first structure 301 or the second structure 302 in FIG. 3A to FIG. 3C), an operation of establishing communication connection with an external electronic device (for example, the second electronic device 130 in FIG. 1 to FIG. 2 and the external electronic device 800 in FIG. 8) through a communication circuit (for example, the communication circuit 530 in FIG. 5), an operation of transmitting, based on the establishing of the communication connection, first information on the first content to the external electronic device through the communication circuit (for example, the communication circuit 530 in FIG. 5) so that the external electronic device (for example, the second electronic device 130 in FIG. 1 to FIG. 2 and the external electronic device 800 in FIG. 8) displays the first content, an operation of displaying, based on a second region where the flexible display (for example, the display 540 in FIG. 5) located inside the housing (for example, the first structure 301 or the second structure 302 in FIG. 3A to FIG. 3C) being visible to the outside of the housing (for example, the first structure 301 or the second structure 302 in FIG. 3A to FIG. 3C), second content on a third region including the first region and the second region, based on at least value obtained using the at least one sensor (for example, the sensor 520 in FIG. 5) of the electronic device, obtaining second information on the second content displayed on the third region including the first region and the second region, based on the at least one value obtained as the second region being visible, and transmitting the second information to the external electronic device (for example, the second electronic device 130 in FIG. 1 to FIG. 2 and the external electronic device 800 in FIG. 8) through the communication circuit (for example, the communication circuit 530 in FIG. 5) so that the external electronic device (for example, the second electronic device 130 in FIG. 1 to FIG. 2 and the external electronic device 800 in FIG. 8) displays the second content.

According to various embodiments, there may be provided the method including an operation of transmitting a message including information related to the withdrawal or insertion of the display (for example, the display 540 in FIG. 5) to the external electronic device (for example, the second electronic device 130 in FIG. 1 to FIG. 2 and the external electronic device 800 in FIG. 8) as at least a part of the operation of establishing of the communication connection with an external electronic device (for example, the second electronic device 130 in FIG. 1 to FIG. 2 and the external electronic device 800 in FIG. 8) through the communication circuit (for example, the communication circuit 530 in FIG. 5).

According to various embodiments, there may be provided the method, wherein the information related to the type of the electronic device (for example, the first electronic device 100 in FIG. 1 to FIG. 2 and the electronic device 500 in FIG. 5) includes information indicating that the electronic device (for example, the first electronic device 100 in FIG. 1 to FIG. 2 and the electronic device 500 in FIG. 5) is capable of changing the size of the region of the flexible display (for example, the display 540 in FIG. 5) of the electronic device (for example, the first electronic device 100 in FIG. 1 to FIG. 2 and the electronic device 500 in FIG. 5) visible to the outside of the housing (for example, the first structure 301 or the second structure 302 in FIG. 3A to FIG. 3C).

According to various embodiments, an electronic device (for example, the first electronic device 100 in FIG. 1 to FIG. 2 and the electronic device 500 in FIG. 5) may include: a housing (for example, the first structure 301 or the second structure 302 in FIG. 3A to FIG. 3C), a flexible display (for example, the display 540 in FIG. 5) capable of changing a size of a region thereof visible to the outside of the housing (for example, the first structure 301 or the second structure 302 in FIG. 3A to FIG. 3C), a communication circuit (for example, the communication circuit 530 in FIG. 5) for enabling transmitting or receiving data to or from an external electronic device, at least one sensor (for example, the sensor 520 in FIG. 5) configured to identify the size of the region where the display (for example, the display 540 in FIG. 5) is visible to the outside of the housing, and at least one processor, wherein the at least one processor is configured to: identify, based on the identified value using the at least one sensor (for example, the sensor 520 in FIG. 5) at least one first parameter related to the area of the flexible display (for example, the display 540 in FIG. 5) visible to the outside, identify a value for at least one second parameter related to the video quality and a specific region of the flexible display (for example, the display 540 in FIG. 5) and a value for at least one third parameter related to the video transmission, based on the identified at least one first parameter, obtain video data based on the value for the at least one second parameter by encoding a content corresponding to the specified region, and transmit the video data based on the value for the at least one third specific to the external electronic device (for example, the second electronic device 130 in FIG. 1 to FIG. 2 and the external electronic device 800 in FIG. 8) through the communication circuit (for example, the communication circuit 530 in FIG. 5).

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a housing;
a flexible display including a first region and a second region, wherein the second region is configured to form a substantially planar surface with the first region when the second region is moved from inside to outside of the housing according to a moving of at least a part of the housing;
a communication circuit configured to enable transmitting data to an external electronic device and/or receiving data from the external electronic device;
at least one sensor configured to detect at least one value related to a movement of the second region;
memory storing instructions;
at least one processor configured to cause the electronic device to:
display first content on the first region of the flexible display, while the second region of the flexible display is located in the housing,
transmit first information about the first content and the first region to the external electronic device through the communication circuit so as to cause the external electronic device to display the first content in a first screen ratio corresponding to the first information at a center of a display of the external electronic device,
identify a distance of the movement of the second region by the at least one sensor,
display second content on a third region, visible to the outside of the housing based on the identified distance, comprising the first region and at least a portion of the second region, and
transmit second information about the second content and the third region to the external electronic device through the communication circuit so as to cause the external electronic device to display the second content in a second screen ratio corresponding to the second information at the center of the display of the external electronic device.

2. The electronic device of claim 1, wherein the at least one processor is further configured to cause the electronic device to:
obtain the at least one value related to the movement of the second region by the at least one sensor,
identify a size of the third region of the flexible display based on the obtained at least one value, and
transmit a message including information related the identified size of the third region of the flexible display to the external electronic device through the communication circuit.

3. The electronic device of claim 2, wherein the at least one processor is further configured to cause the electronic device to:
identify, based on the third region being visible to the outside of the housing, a parameter related to the size of the third region.

4. The electronic device of claim 3, wherein the first information comprises a value of at least one of reference coordinates, a width, or a length, and
wherein the at least one processor is further configured to cause the electronic device to:
change, based on the identified parameter, at least one of the reference coordinates, the width, or the length to identify the second information about the third region comprising the first region and the second region.

5. The electronic device of claim 1, wherein the at least one processor is further configured to cause the electronic device to:
identify the first information based on the first content and the first region being visible to the outside of the housing,
obtain first video data corresponding to the first content displayed on the first region based on the identified first information,
transmit the obtained first video data to the external electronic device through the communication circuit,
identify the second information based on the second content and the third region being visible to the outside of the housing while a communication connection through the communication circuit between the electronic device and the external electronic device is maintained,
obtain second video data corresponding to the second content displayed on the third region based on the identified second information, and
transmit the obtained second video data to the external electronic device through the communication circuit.

6. The electronic device of claim 5, wherein the at least one processor is further configured to cause the electronic device to:
obtain the first video data corresponding to the first content based on a first value for at least one first parameter related to a quality of the first content, and
obtain the second video data corresponding to the second content based on a second value lower than the first value for the at least one first parameter.

7. The electronic device of claim 6, wherein the at least one first parameter related to a quality of the first content comprises at least one of resolution, a frame rate, or color depth.

8. The electronic device of claim 6, wherein the memory stores information about a plurality of formats each comprising a value for the at least one first parameter, and
wherein the at least one processor is further configured to cause the electronic device to:
select, based on the first region being visible to the outside of the housing, a first format corresponding to the first value for the at least one first parameter from among the plurality of formats,
obtain the first video data by encoding the first content based on the first format,
select, based on the third region being visible to the outside of the housing, a second format corresponding to the second value for at least one second parameter from among the plurality of formats, and
obtain the second video data by encoding the second content based on the second format.

9. The electronic device of claim 8, wherein the at least one processor is further configured to cause the electronic device to:
- transmit, based on the third region being visible to the outside of the housing, a message comprising information indicating the second value for the at least one second parameter corresponding to the selected second format to the external electronic device through the communication circuit, and
- obtain, by encoding the second content based on the second format, the second video data based on a response message received from the external electronic device through the communication circuit.

10. The electronic device of claim 6, wherein the at least one processor is further configured to cause the electronic device to:
- transmit, based on the first region being visible to the outside of the housing, based on a first value for a bit rate, the video data to the external electronic device through the communication circuit, and
- transmit, based on the third region being visible to the outside of the housing, based on a second value lower than the first value for the bit rate, the video data to the external electronic device through the communication circuit.

11. The electronic device of claim 10, wherein the at least one processor is further configured to cause the electronic device to:
- change a value for the at least one first parameter and the value for the bit rate, based on a size of the third region.

12. The electronic device of claim 5, wherein the at least one processor is further configured to cause the electronic device to:
- select at least a portion of the second content displayed on the third region,
- obtain third video data with respect to the selected at least a portion of the second content, and
- transmit the obtained third video data to the external electronic device through the communication circuit.

13. The electronic device of claim 12, wherein the second content comprises a plurality of portions, and each of the plurality of portions comprises a specific application execution screen or a specific view of an application execution screen, and
wherein the at least one processor is further configured to cause the electronic device to:
receive an input for selecting a first portion selected from among the plurality of portions of the second content, and
obtain the third video data with respect to the first portion.

14. The electronic device of claim 12, wherein the at least one processor is further configured to cause the electronic device to:
- obtain fourth video data with respect to a first portion of the second content, transmit, through the communication circuit, the fourth video data to a first external electronic device, and
- obtain fifth video data with respect to a second portion of the second content, transmit, through the communication circuit, the fifth video data to a second external electronic device.

15. The electronic device of claim 12, wherein the at least one processor is further configured to cause the electronic device to:
- display an object having a specific size on the second content, based on information related to a display of the external electronic device received from the external electronic device, the object being configured to be movable based on an input, and
- identify at least a portion of the second content corresponding to the position of the object.

16. The electronic device of claim 1, wherein the at least one processor is further configured to cause the electronic device to:
- based on the second region gradually moving from the inside of the housing to the outside of the housing, display the second content, which is continuously updated corresponding to the gradual moving of the second region, and transmit the second information to the external electronic device through the communication circuit so as to cause the external electronic device to display the second content to be continuously updated corresponding to the gradual moving of the second region.

17. The electronic device of claim 1, wherein the at least one processor is further configured to cause the electronic device to:
- based on the second region gradually moving from the inside of the housing to the outside of the housing, display the second content and third content on the third region continuously and transmit the second information and third information about the third content to the external electronic device continuously through the communication circuit so as to cause the external electronic device to display the second content and the third content continuously corresponding to the gradual moving of the second region.

18. The electronic device of claim 1, wherein the at least one processor is further configured to cause the electronic device to:
- control the flexible display to slide so that the second region of the flexible display moves between the inside of the housing and the outside of the housing, and
- identify a state related to the sliding of the flexible display, based on the at least one value from the at least one sensor.

19. A method for operating an electronic device, the method comprising:
- displaying first content on a first region of a flexible display, while a second region of the flexible display is located in a housing of the display, wherein the second region forms a substantially planar surface with the first region when the second region is moved from inside to outside of the housing according to a moving of at least a part of the housing;
- transmitting first information about the first content and the first region to an external electronic device through communication circuit so as to cause the external electronic device to display the first content in a first screen ratio corresponding to the first information at a center of a display of the external electronic device;
- identifying a distance of a movement of the second region by at least one sensor configured to detect at least one value related to the movement of the second region,
- displaying second content on a third region, visible to the outside of the housing based on the identified distance, comprising the first region and at least a portion of the second region; and
- transmitting second information about the second content and the third region to the external electronic device through the communication circuit so as to cause the external electronic device to display the second content in a second screen ratio corresponding to the second information at the center of the display of the external electronic device.

\* \* \* \* \*